: US009646568B2

(12) United States Patent
Oshima et al.

(10) Patent No.: US 9,646,568 B2
(45) Date of Patent: May 9, 2017

(54) DISPLAY METHOD

(71) Applicant: PANASONIC CORPORATION, Osaka (JP)

(72) Inventors: Mitsuaki Oshima, Kyoto (JP); Koji Nakanishi, Osaka (JP); Hideki Aoyama, Osaka (JP); Koji Aoto, Hyogo (JP); Akira Shiokawa, Osaka (JP); Toshiyuki Maeda, Hyogo (JP); Akihiro Ueki, Osaka (JP); Takashi Suzuki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 167 days.

(21) Appl. No.: 14/141,829

(22) Filed: Dec. 27, 2013

(65) Prior Publication Data

US 2014/0204129 A1    Jul. 24, 2014

Related U.S. Application Data

(60) Provisional application No. 61/910,158, filed on Nov. 29, 2013, provisional application No. 61/746,315, filed on Dec. 27, 2012.

(30) Foreign Application Priority Data

Dec. 27, 2012  (JP) .................................. 2012-286339
May 24, 2013   (JP) .................................. 2013-110445
(Continued)

(51) Int. Cl.
*G09G 5/10*    (2006.01)
*H04B 10/116*  (2013.01)
(Continued)

(52) U.S. Cl.
CPC ............. *G09G 5/10* (2013.01); *H04B 10/116* (2013.01); *G09G 3/2022* (2013.01); *G09G 3/342* (2013.01);
(Continued)

(58) Field of Classification Search
CPC ............. G09G 5/10; G09G 2320/0276; G09G 2360/16; G09G 2320/0626
(Continued)

(56) References Cited

U.S. PATENT DOCUMENTS 4,812,909 A  *  3/1989  Yokobayashi ......... H04N 5/278
                                                              348/584
5,484,998 A     1/1996  Benjar et al.
(Continued)

FOREIGN PATENT DOCUMENTS

AU    2007253450    11/2007
CN    2187863       1/1995
(Continued)

OTHER PUBLICATIONS

Office Action, mailed Aug. 25, 2014, in related U.S. Appl. No. 13/902,215.
(Continued)

*Primary Examiner* — Towfiq Elahi
(74) *Attorney, Agent, or Firm* — Greenblum & Bernstein, P.L.C.

(57) ABSTRACT

A display method is provided that reduces the probability of communication error without causing significant deterioration of picture quality. The method includes specifying, as a specified light emission period, a light emission period in which light emission is performed for greater than or equal to a time required for transmitting a block included in a visible light communication signal, out of one or more light emission periods in which light emission is performed for
(Continued)

displaying an image included in a video signal. The method also includes transmitting the block of the visible light communication signal by luminance changing in the specified light emission period.

10 Claims, 40 Drawing Sheets

(30) Foreign Application Priority Data

| Sep. 4, 2013 | (JP) | ................. | 2013-182714 |
| Nov. 22, 2013 | (JP) | ................. | 2013-242407 |
| Nov. 29, 2013 | (JP) | ................. | 2013-248709 |

(51) Int. Cl.
   G09G 3/20 (2006.01)
   G09G 3/34 (2006.01)
   G09G 3/36 (2006.01)

(52) U.S. Cl.
   CPC ............ *G09G 3/346* (2013.01); *G09G 3/3611* (2013.01); *G09G 2310/024* (2013.01); *G09G 2310/0235* (2013.01)

(58) Field of Classification Search
   USPC ........................................................ 345/690
   See application file for complete search history.

(56) References Cited

U.S. PATENT DOCUMENTS

| 5,734,328 | A | 3/1998 | Shinbori |
| 5,765,176 | A | 6/1998 | Bloomberg |
| 5,974,348 | A | 10/1999 | Rocks |
| 6,062,481 | A | 5/2000 | Storch et al. |
| 6,345,104 | B1 | 2/2002 | Rhoads |
| 6,347,163 | B2 | 2/2002 | Roustaei |
| 6,933,956 | B2 | 8/2005 | Sato et al. |
| 7,308,194 | B2 | 12/2007 | Iizuka et al. |
| 7,415,212 | B2 | 8/2008 | Matsushita et al. |
| 7,502,053 | B2 | 3/2009 | Kagawa et al. |
| 7,570,246 | B2 | 8/2009 | Maniam et al. |
| 7,715,723 | B2 | 5/2010 | Kagawa et al. |
| 7,728,893 | B2 | 6/2010 | Kagawa et al. |
| RE42,848 | E | 10/2011 | Sato et al. |
| 8,054,357 | B2 | 11/2011 | Tay |
| 8,093,988 | B2 | 1/2012 | Takene et al. |
| 8,256,673 | B1 | 9/2012 | Kim |
| 8,264,546 | B2 | 9/2012 | Witt |
| 8,331,724 | B2 | 12/2012 | Rhoads |
| 8,334,901 | B1 | 12/2012 | Ganick et al. |
| RE44,004 | E | 2/2013 | Sato et al. |
| 8,451,264 | B2 | 5/2013 | Yamaguchi et al. |
| 8,493,483 | B2 | 7/2013 | Nishihara |
| 8,493,485 | B2 | 7/2013 | Hirose |
| 8,550,366 | B2 | 10/2013 | Myodo et al. |
| 8,571,217 | B2 | 10/2013 | Ishii et al. |
| 8,587,680 | B2 | 11/2013 | Okumura et al. |
| 8,594,840 | B1 | 11/2013 | Chiappetta et al. |
| 8,634,725 | B2 | 1/2014 | Jang et al. |
| 8,648,911 | B2 | 2/2014 | Okumura |
| 8,690,335 | B2 | 4/2014 | Okumura et al. |
| 8,720,779 | B2 | 5/2014 | Asami |
| 8,749,470 | B2 | 6/2014 | Furihata et al. |
| 8,780,342 | B2 | 7/2014 | DiBernardo et al. |
| 8,823,852 | B2 | 9/2014 | Yamada et al. |
| 8,908,074 | B2 | 12/2014 | Oshima et al. |
| 8,913,144 | B2 | 12/2014 | Oshima et al. |
| 8,922,666 | B2 | 12/2014 | Oshima et al. |
| 8,953,072 | B2 | 2/2015 | Nishihara |
| 8,965,216 | B2 | 2/2015 | Oshima et al. |
| 8,994,841 | B2 | 3/2015 | Oshima et al. |
| 9,083,543 | B2 | 7/2015 | Oshima et al. |
| 9,083,544 | B2 | 7/2015 | Oshima et al. |
| 9,085,927 | B2 | 7/2015 | Oshima et al. |
| 9,087,349 | B2 | 7/2015 | Oshima et al. |
| 9,143,339 | B2 | 9/2015 | Oshima et al. |
| 9,166,810 | B2 | 10/2015 | Oshima et al. |
| 9,184,838 | B2 | 11/2015 | Oshima et al. |
| 9,258,058 | B2 | 2/2016 | Oshima et al. |
| 9,277,154 | B2 | 3/2016 | Nishihara |
| 9,300,845 | B2 | 3/2016 | Oshima et al. |
| 9,380,227 | B2 | 6/2016 | Oshima et al. |
| 2002/0167701 | A1 | 11/2002 | Hirata |
| 2002/0171639 | A1 | 11/2002 | Ben-David |
| 2003/0026422 | A1 | 2/2003 | Gerheim et al. |
| 2003/0058262 | A1 | 3/2003 | Sato et al. |
| 2003/0076338 | A1 | 4/2003 | Hashimoto |
| 2003/0171096 | A1 | 9/2003 | Ilan et al. |
| 2003/0193699 | A1 | 10/2003 | Tay |
| 2004/0101309 | A1 | 5/2004 | Beyette, Jr. et al. |
| 2004/0125053 | A1 | 7/2004 | Fujisawa |
| 2004/0161246 | A1 | 8/2004 | Matsushita et al. |
| 2005/0018058 | A1 | 1/2005 | Aliaga et al. |
| 2005/0162584 | A1* | 7/2005 | Yamamoto et al. ............ 349/68 |
| 2005/0190274 | A1 | 9/2005 | Yoshikawa et al. |
| 2005/0265731 | A1 | 12/2005 | Keum et al. |
| 2006/0056855 | A1 | 3/2006 | Nakagawa et al. |
| 2006/0171360 | A1 | 8/2006 | Kim et al. |
| 2006/0239675 | A1 | 10/2006 | Iizuka et al. |
| 2006/0239689 | A1 | 10/2006 | Ashdown |
| 2006/0242908 | A1 | 11/2006 | McKinney |
| 2007/0024571 | A1 | 2/2007 | Maniam et al. |
| 2007/0046789 | A1 | 3/2007 | Kirisawa |
| 2007/0058987 | A1 | 3/2007 | Suzuki |
| 2007/0070060 | A1 | 3/2007 | Kagawa et al. |
| 2007/0091055 | A1* | 4/2007 | Sakuda ................ G09G 3/3413 345/102 |
| 2007/0092264 | A1 | 4/2007 | Suzuki et al. |
| 2007/0222743 | A1* | 9/2007 | Hirakata ....................... 345/102 |
| 2008/0007512 | A1 | 1/2008 | Honbo |
| 2008/0018751 | A1 | 1/2008 | Kushida |
| 2008/0023546 | A1 | 1/2008 | Myodo et al. |
| 2008/0044188 | A1 | 2/2008 | Kagawa et al. |
| 2008/0048968 | A1 | 2/2008 | Okada et al. |
| 2008/0055041 | A1 | 3/2008 | Takene et al. |
| 2008/0063410 | A1 | 3/2008 | Irie |
| 2008/0122994 | A1 | 5/2008 | Cernasov |
| 2008/0180547 | A1 | 7/2008 | Hirose |
| 2008/0205848 | A1 | 8/2008 | Kobayashi |
| 2008/0290988 | A1 | 11/2008 | Crawford |
| 2008/0297360 | A1 | 12/2008 | Knox et al. |
| 2008/0297615 | A1 | 12/2008 | Kagawa et al. |
| 2009/0002265 | A1 | 1/2009 | Kitaoka et al. |
| 2009/0033757 | A1 | 2/2009 | Shimada |
| 2009/0052902 | A1 | 2/2009 | Shinokura |
| 2009/0066689 | A1 | 3/2009 | Yamaguchi et al. |
| 2009/0129781 | A1 | 5/2009 | Irie et al. |
| 2009/0135271 | A1 | 5/2009 | Kurane |
| 2009/0274381 | A1 | 11/2009 | Kirenko |
| 2009/0297156 | A1 | 12/2009 | Nakagawa et al. |
| 2009/0297157 | A1 | 12/2009 | Nakagawa |
| 2009/0297166 | A1 | 12/2009 | Nakagawa et al. |
| 2009/0297167 | A1 | 12/2009 | Nakagawa et al. |
| 2009/0310976 | A1 | 12/2009 | Nakagawa et al. |
| 2009/0317088 | A1 | 12/2009 | Niiho et al. |
| 2010/0020970 | A1 | 1/2010 | Liu et al. |
| 2010/0034540 | A1 | 2/2010 | Togashi |
| 2010/0107189 | A1 | 4/2010 | Steelberg et al. |
| 2010/0111538 | A1 | 5/2010 | Arita et al. |
| 2010/0116888 | A1 | 5/2010 | Asami |
| 2010/0129087 | A1 | 5/2010 | Kim et al. |
| 2010/0157121 | A1 | 6/2010 | Tay |
| 2010/0164922 | A1* | 7/2010 | Nose et al. .................... 345/207 |
| 2010/0315395 | A1 | 12/2010 | Kang et al. |
| 2010/0328359 | A1 | 12/2010 | Inoue et al. |
| 2011/0007160 | A1 | 1/2011 | Okumura |
| 2011/0007171 | A1 | 1/2011 | Okumura et al. |
| 2011/0025730 | A1 | 2/2011 | Ajichi |
| 2011/0052214 | A1 | 3/2011 | Shimada et al. |
| 2011/0063510 | A1 | 3/2011 | Lee et al. |
| 2011/0064416 | A1 | 3/2011 | Rajagopal et al. |

(56) References Cited

U.S. PATENT DOCUMENTS

| | | |
|---|---|---|
| 2011/0069971 A1 | 3/2011 | Kim et al. |
| 2011/0080510 A1 | 4/2011 | Nishihara |
| 2011/0105134 A1 | 5/2011 | Kim et al. |
| 2011/0164881 A1 | 7/2011 | Rajagopal et al. |
| 2011/0221779 A1 | 9/2011 | Okumura et al. |
| 2011/0227827 A1 | 9/2011 | Solomon et al. |
| 2011/0229147 A1 | 9/2011 | Yokoi |
| 2011/0243325 A1 | 10/2011 | Ishii et al. |
| 2011/0299857 A1 | 12/2011 | Rekimoto |
| 2012/0076509 A1 | 3/2012 | Gurovich et al. |
| 2012/0080515 A1 | 4/2012 | van der Merwe |
| 2012/0133815 A1 | 5/2012 | Nakanishi et al. |
| 2012/0155889 A1 | 6/2012 | Kim et al. |
| 2012/0169605 A1 | 7/2012 | Lin et al. |
| 2012/0188442 A1 | 7/2012 | Kennedy |
| 2012/0206648 A1 | 8/2012 | Casagrande et al. |
| 2012/0220311 A1 | 8/2012 | Rodriguez et al. |
| 2012/0224743 A1 | 9/2012 | Rodriguez et al. |
| 2012/0257082 A1 | 10/2012 | Kato et al. |
| 2012/0281987 A1 | 11/2012 | Schenk et al. |
| 2012/0320101 A1* | 12/2012 | Goden et al. ............ 345/690 |
| 2012/0328302 A1 | 12/2012 | Iizuka et al. |
| 2013/0136457 A1 | 5/2013 | Park et al. |
| 2013/0141555 A1 | 6/2013 | Ganick et al. |
| 2013/0169663 A1* | 7/2013 | Seong et al. ............ 345/589 |
| 2013/0170695 A1 | 7/2013 | Anan et al. |
| 2013/0201369 A1 | 8/2013 | Hirose |
| 2013/0251374 A1 | 9/2013 | Chen et al. |
| 2013/0251375 A1 | 9/2013 | Ozaki et al. |
| 2013/0256422 A1 | 10/2013 | Osbourne et al. |
| 2013/0271631 A1 | 10/2013 | Tatsuzawa et al. |
| 2013/0272717 A1 | 10/2013 | Deguchi et al. |
| 2013/0299677 A1 | 11/2013 | Nishihara |
| 2013/0329440 A1 | 12/2013 | Tsutsumi et al. |
| 2013/0330088 A1 | 12/2013 | Oshima et al. |
| 2013/0335592 A1 | 12/2013 | Yamada et al. |
| 2013/0337787 A1 | 12/2013 | Yamada et al. |
| 2014/0010549 A1 | 1/2014 | Kang |
| 2014/0022547 A1 | 1/2014 | Knox et al. |
| 2014/0037296 A1 | 2/2014 | Yamada et al. |
| 2014/0055420 A1 | 2/2014 | Yokoi et al. |
| 2014/0117074 A1 | 5/2014 | Kim |
| 2014/0125852 A1 | 5/2014 | Baer et al. |
| 2014/0184883 A1 | 7/2014 | Shimamoto |
| 2014/0184914 A1 | 7/2014 | Oshima et al. |
| 2014/0185860 A1 | 7/2014 | Oshima et al. |
| 2014/0186026 A1 | 7/2014 | Oshima et al. |
| 2014/0186047 A1 | 7/2014 | Oshima et al. |
| 2014/0186048 A1 | 7/2014 | Oshima et al. |
| 2014/0186049 A1 | 7/2014 | Oshima et al. |
| 2014/0186050 A1 | 7/2014 | Oshima et al. |
| 2014/0186052 A1 | 7/2014 | Oshima et al. |
| 2014/0186055 A1 | 7/2014 | Oshima et al. |
| 2014/0192185 A1 | 7/2014 | Oshima et al. |
| 2014/0192226 A1 | 7/2014 | Oshima et al. |
| 2014/0193162 A1 | 7/2014 | Iizuka et al. |
| 2014/0205136 A1 | 7/2014 | Oshima et al. |
| 2014/0207517 A1 | 7/2014 | Oshima et al. |
| 2014/0212145 A1 | 7/2014 | Oshima et al. |
| 2014/0212146 A1 | 7/2014 | Oshima et al. |
| 2014/0232896 A1 | 8/2014 | Oshima et al. |
| 2014/0232903 A1 | 8/2014 | Oshima et al. |
| 2014/0270793 A1 | 9/2014 | Bradford |
| 2014/0286644 A1 | 9/2014 | Oshima et al. |
| 2014/0290138 A1 | 10/2014 | Oshima et al. |
| 2014/0294397 A1 | 10/2014 | Oshima et al. |
| 2014/0294398 A1 | 10/2014 | Oshima et al. |
| 2014/0307155 A1 | 10/2014 | Oshima et al. |
| 2014/0307156 A1 | 10/2014 | Oshima et al. |
| 2014/0307157 A1 | 10/2014 | Oshima et al. |
| 2014/0314420 A1 | 10/2014 | De Brujin et al. |
| 2014/0321859 A1 | 10/2014 | Guo et al. |
| 2014/0376922 A1 | 12/2014 | Oshima et al. |
| 2015/0023673 A1 | 1/2015 | Iizuka et al. |
| 2015/0030335 A1 | 1/2015 | Son et al. |
| 2015/0050027 A1 | 2/2015 | Oshima et al. |
| 2015/0071439 A1 | 3/2015 | Liu et al. |
| 2015/0108330 A1 | 4/2015 | Nishihara |
| 2015/0160175 A1 | 6/2015 | Knox et al. |
| 2015/0263807 A1 | 9/2015 | Yamasaki |
| 2016/0028478 A1 | 1/2016 | Rietman et al. |

FOREIGN PATENT DOCUMENTS

| | | |
|---|---|---|
| CN | 1702984 | 11/2005 |
| CN | 100340903 | 10/2007 |
| CN | 101088295 | 12/2007 |
| CN | 101099186 | 1/2008 |
| CN | 101105920 | 1/2008 |
| CN | 101159799 | 4/2008 |
| CN | 101350669 | 1/2009 |
| CN | 101355651 | 1/2009 |
| CN | 101358846 | 2/2009 |
| CN | 101395901 | 3/2009 |
| CN | 101432997 | 5/2009 |
| CN | 101490985 | 7/2009 |
| CN | 101710890 | 5/2010 |
| CN | 101751866 | 6/2010 |
| CN | 101959016 | 1/2011 |
| CN | 101960508 | 1/2011 |
| CN | 102006120 | 4/2011 |
| CN | 102036023 | 4/2011 |
| CN | 102224728 | 10/2011 |
| CN | 102654400 | 9/2012 |
| CN | 102679200 | 9/2012 |
| CN | 102684869 | 9/2012 |
| CN | 102739940 | 10/2012 |
| CN | 102842282 | 12/2012 |
| CN | 102843186 | 12/2012 |
| EP | 1912354 | 4/2008 |
| EP | 2503852 | 9/2012 |
| JP | 07-200428 | 8/1995 |
| JP | 2002-144984 | 5/2002 |
| JP | 2002-290335 | 10/2002 |
| JP | 2003-179556 | 6/2003 |
| JP | 2004-072365 | 3/2004 |
| JP | 2004-306902 | 11/2004 |
| JP | 2005-160119 | 6/2005 |
| JP | 2006-020294 | 1/2006 |
| JP | 2006-092486 | 4/2006 |
| JP | 2006-121466 | 5/2006 |
| JP | 2006-227204 | 8/2006 |
| JP | 2006-319545 | 11/2006 |
| JP | 2006-340138 | 12/2006 |
| JP | 2007-19936 | 1/2007 |
| JP | 2007-036833 | 2/2007 |
| JP | 2007-043706 | 2/2007 |
| JP | 2007-049584 | 2/2007 |
| JP | 2007-060093 | 3/2007 |
| JP | 2007-082098 | 3/2007 |
| JP | 2007-096548 | 4/2007 |
| JP | 2007-124404 | 5/2007 |
| JP | 2007-189341 | 7/2007 |
| JP | 2007-201681 | 8/2007 |
| JP | 2007-221570 | 8/2007 |
| JP | 2007-228512 | 9/2007 |
| JP | 2007-248861 | 9/2007 |
| JP | 2007-295442 | 11/2007 |
| JP | 2007-312383 | 11/2007 |
| JP | 2008-015402 | 1/2008 |
| JP | 2008-033625 | 2/2008 |
| JP | 2008-057129 | 3/2008 |
| JP | 2008-124922 | 5/2008 |
| JP | 2008-187615 | 8/2008 |
| JP | 2008-252466 | 10/2008 |
| JP | 2008-252570 | 10/2008 |
| JP | 2008-282253 | 11/2008 |
| JP | 2008-292397 | 12/2008 |
| JP | 2009-88704 | 4/2009 |
| JP | 2009-130771 | 6/2009 |
| JP | 2009-206620 | 9/2009 |
| JP | 2009-212768 | 9/2009 |
| JP | 2009-232083 | 10/2009 |
| JP | 2009-538071 | 10/2009 |

(56) References Cited

FOREIGN PATENT DOCUMENTS

| | | |
|---|---|---|
| JP | 2009-290359 | 12/2009 |
| JP | 2010-103746 | 5/2010 |
| JP | 2010-117871 | 5/2010 |
| JP | 2010-152285 | 7/2010 |
| JP | 2010-226172 | 10/2010 |
| JP | 2010-232912 | 10/2010 |
| JP | 2010-258645 | 11/2010 |
| JP | 2010-268264 | 11/2010 |
| JP | 2010-278573 | 12/2010 |
| JP | 2010-287820 | 12/2010 |
| JP | 2011/023819 | 2/2011 |
| JP | 2011-29871 | 2/2011 |
| JP | 2011-119820 | 6/2011 |
| JP | 4736397 | 7/2011 |
| JP | 2011-250231 | 12/2011 |
| JP | 2011-254317 | 12/2011 |
| JP | 2012-010269 | 1/2012 |
| JP | 2012-043193 | 3/2012 |
| JP | 2012-95214 | 5/2012 |
| JP | 2012-169189 | 9/2012 |
| JP | 2012-205168 | 10/2012 |
| JP | 2012-244549 | 12/2012 |
| JP | 2013-042221 | 2/2013 |
| JP | 2013-197849 | 9/2013 |
| JP | 2013-223043 | 10/2013 |
| JP | 2013-223047 | 10/2013 |
| JP | 2013-223209 | 10/2013 |
| JP | 2013-235505 | 11/2013 |
| JP | 5393917 | 1/2014 |
| JP | 5395293 | 1/2014 |
| JP | 5405695 | 2/2014 |
| JP | 5521125 | 6/2014 |
| JP | 5541153 | 7/2014 |
| WO | 94/26063 | 11/1994 |
| WO | 96/36163 | 11/1996 |
| WO | 00/07356 | 2/2000 |
| WO | 01/93473 | 12/2001 |
| WO | 03/036829 | 5/2003 |
| WO | 03-281482 | 10/2003 |
| WO | 2005/001593 | 1/2005 |
| WO | 2006/013755 | 2/2006 |
| WO | 2007/004530 | 1/2007 |
| WO | 2007/032276 | 3/2007 |
| WO | 2007/135014 | 11/2007 |
| WO | 2008/133303 | 11/2008 |
| WO | 2009/113415 | 9/2009 |
| WO | 2009/113416 | 9/2009 |
| WO | 2009/144853 | 12/2009 |
| WO | 2010/071193 | 6/2010 |
| WO | 2011/034346 | 3/2011 |
| WO | 2011/086517 | 7/2011 |
| WO | 2011/155130 | 12/2011 |
| WO | 2012/026039 | 3/2012 |
| WO | 2012/120853 | 9/2012 |
| WO | 2012/123572 | 9/2012 |
| WO | 2012/127439 | 9/2012 |
| WO | 2013/171954 | 11/2013 |
| WO | 2013/175803 | 11/2013 |

OTHER PUBLICATIONS

Office Action, mailed Sep. 18, 2014, in related U.S. Appl. No. 14/142,372.

Office Action, mailed Oct. 1, 2014, in related U.S. Appl. No. 14/302,913.

Office Action, mailed Oct. 14, 2014, in related U.S. Appl. No. 14/087,707.

Gao et al., "Understanding 2D-BarCode Technology and Applications in M-Commerce-Design and Implementation of a 2D Barcode Processing Solution", IEEE Computer Society 31$^{st}$ Annual International Computer Software and Applications Conference (COMPSAC 2007), Aug. 2007.

U.S. Appl. No. 14/315,509, filed Jun. 26, 2014.

U.S. Appl. No. 14/315,867, filed Jun. 26, 2014.

U.S. Appl. No. 14/315,792, filed Jun. 26, 2014.

U.S. Appl. No. 14/315,732, filed Jun. 26, 2014.

U.S. Appl. No. 14/302,966, filed Jun. 12, 2014.

U.S. Appl. No. 14/302,913, filed Jun. 12, 2014.

U.S. Appl. No. 14/142,413, filed Dec. 27, 2013.

U.S. Appl. No. 14/142,372, filed Dec. 27, 2013.

International Search Report, mailed Feb. 4, 2014, in International Application No. PCT/JP2013/006858.

International Search Report, mailed Feb. 4, 2014, in International Application No. PCT/JP2013/006861.

International Search Report, mailed Feb. 4, 2014, in International Application No. PCT/JP2013/006863.

International Search Report, mailed Feb. 10, 2014, in International Application No. PCT/JP2013/006859.

International Search Report, mailed Feb. 10, 2014, in International Application No. PCT/JP2013/006860.

International Search Report, mailed Feb. 18, 2014, in International Application No. PCT/JP2013/006871.

Written Opinion of the International Search Authority, mailed Feb. 4, 2014, in International Application No. PCT/JP2013/006857 (English language translation).

International Search Report, mailed Jun. 18, 2013, in International Application No. PCT/JP2013/003319.

Office Action, mailed Nov. 8, 2013, in corresponding U.S. Appl. No. 13/902,436.

Written Opinion of the International Searching Authority, mailed Jun. 18, 2013, in International Application No. PCT/JP2013/003319 (English language translation).

International Search Report, mailed Feb. 4, 2014, in International Application No. PCT/JP2013/006857.

Takao Nakamura et al., "Fast Watermark Detection Scheme from Analog Image for Camera-Equipped Cellular Phone", IEICE Transactions, D-II, vol. J87-D-11, No. 12, pp. 2145-2155, Dec. 2004 (together with English language translation).

International Search Report, mailed Feb. 10, 2014, in International (PCT) Application No. PCT/JP2013/007684.

International Search Report, mailed Feb. 25, 2014, in International Application No. PCT/JP2013/006895.

Written Opinion of the International Search Authority, mailed Feb. 25, 2014, in International Application No. PCT/JP2013/006895 (English Language Translation).

Office Action, mailed Jan. 29, 2014, in corresponding U.S. Appl. No. 13/902,393.

Office Action, mailed on Jun. 20, 2014, for the corresponding U.S. Appl. No. 14/087,635.

Dai Yamanaka et al., "An investigation for the Adoption of Subcarrier Modulation to Wireless Visible Light Communication using Imaging Sensor", The Institute of Electronics, Information and Communication Engineers IEICE Technical Report, Jan. 4, 2007, vol. 106, No. 450, pp. 25-30 (with English language translation).

International Search Report, mailed Jun. 18, 2013, in International Application No. PCT/JP2013/003318.

Written Opinion of the International Searching Authority, mailed Feb. 4, 2014, in International Application No. PCT/JP2013/006894 (English language translation).

International Search Report, mailed Feb. 10, 2014, in International Application No. PCT/JP2013/006869.

International Search Report, mailed Feb. 10, 2014, in International Application No. PCT/JP2013/006870.

Written Opinion of the International Searching Authority, mailed Feb. 10, 2014, in International Application No. PCT/JP2013/006870 (English language translation).

International Search Report, mailed Mar. 11, 2014, in International Application No. PCT/JP2013/007709.

Written Opinion of the International Searching Authority, mailed Mar. 11, 2014, in International Application No. PCT/JP2013/007709 (English language translation).

International Search Report, mailed Feb. 10, 2014, in International Application No. PCT/JP2013/007708.

International Search Report, mailed Mar. 11, 2014, in International Application No. PCT/JP2013/007675.

(56) References Cited

OTHER PUBLICATIONS

Written Opinion of the International Searching Authority, mailed Mar. 11, 2014, in International Application No. PCT/JP2013/007675 (English language translation).
International Search Report, mailed Feb. 4, 2014, in International Application No. PCT/JP2013/006894.
Written Opinion of the International Searching Authority, mailed Feb. 18, 2014, in International Application No. PCT/JP2013/006871 (English language translation).
Written Opinion of the International Searching Authority, mailed Feb. 4, 2014, in International Application No. PCT/JP2013/006858 (English language translation).
Written Opinion of the International Searching Authority, mailed Feb. 10, 2014, in International Application No. PCT/JP2013/006860 (English language translation).
Written Opinion of the International Searching Authority, mailed Feb. 4, 2014, in International Application No. PCT/JP2013/006861 (English language translation).
Written Opinion of the International Searching Authority, mailed Feb. 10, 2014, in International Application No. PCT/JP2013/006869 (English language translation).
USPTO Office Action, mailed Nov. 21, 2014, in related U.S. Appl. No. 14/261,572.
USPTO Office Action, mailed Jan. 30, 2015, in related U.S. Appl. No. 14/539,208.
USPTO Office Action, mailed Mar. 6, 2015, in related U.S. Appl. No. 14/087,707.
International Search Report, mailed Feb. 3, 2015, in International Application No. PCT/JP2014/006448.
USPTO Office Action, mailed Apr. 28, 2015, in related U.S. Appl. No. 14/141,833.
Extended European Search Report, mailed May 21, 2015, from the European Patent Office in European Patent Application No. 13793716.5.
Extended European Search Report, mailed Jun. 1, 2015, from the European Patent Office in European Patent Application No. 13793777.7.
Jiang Liu et al., "Foundational Analysis of Spatial Optical Wireless Communication Utilizing Image Sensor", Imaging Systems and Techniques (IST), 2011 IEEE International Conference on Imaging Systems and Techniques, IEEE, May 17, 2011, pp. 205-206, XP031907193.
USPTO Office Action, mailed Jun. 23, 2015, in related U.S. Appl. No. 14/142,413.
Christos Danakis et al., "Using a CMOS Camera Sensor for Visible Light Communication", 2012 IEEE Globecom Workshops, U.S., Dec. 3, 2012, pp. 1244-1248.
Japan Office Action, mailed Jul. 28, 2015, for Japanese Patent Application No. 2015-129247.
Office Action, mailed on May 22, 2014, for the corresponding U.S. Appl. No. 14/087,645.
Office Action, mailed on Jul. 3, 2014, for the corresponding U.S. Appl. No. 14/141,833.
Office Action, mailed on Apr. 14, 2014, in related U.S. Appl. No. 13/911,530.
Office Action, mailed on Apr. 16, 2014, in related U.S. Appl. No. 13/902,393.
Office Action, mailed on Aug. 4, 2014, in related U.S. Appl. No. 14/210,688.
Office Action, mailed on Feb. 4, 2014, in related U.S. Appl. No. 13/911,530.
Office Action, mailed on Jul. 2, 2014, in related U.S. Appl. No. 14/087,619.
Office Action, mailed on Jul. 2, 2014, in related U.S. Appl. No. 14/261,572.
Office Action, mailed on Jul. 29, 2014, in related U.S. Appl. No. 14/087,639.
Office Action, mailed on Aug. 5, 2014, in related U.S. Appl. No. 13/902,393.
Office Action, mailed on Aug. 5, 2014, in related U.S. Appl. No. 13/911,530.
Office Action, mailed on Aug. 8, 2014, in related U.S. Appl. No. 14/315,509.
USPTO Office Action, mailed Jan. 4, 2016, in related U.S. Appl. No. 14/711,876.
USPTO Office Action, mailed Jan. 14, 2016, in related U.S. Appl. No. 14/526,822.
USPTO Office Action, mailed Mar. 11, 2016, in related U.S. Appl. No. 14/087,605.
USPTO Office Action, mailed Jul. 22, 2016, in related U.S. Appl. No. 14/582,751.
USPTO Office Action, mailed Aug. 22, 2016, in related U.S. Appl. No. 15/161,657.
Extended European Search Report, mailed Nov. 10, 2015, in related European Application No. 13869757.8.
Extended European Search Report, mailed Nov. 10, 2015, in related European Application No. 13868814.8.
Extended European Search Report, mailed Nov. 10, 2015, in related European Application No. 13868307.3.
Extended European Search Report, mailed Nov. 10, 2015, in related European Application No. 13868118.4.
USPTO Office Action, mailed Nov. 16, 2015, in related U.S. Appl. No. 14/142,413.
Extended European Search Report, mailed Nov. 10, 2015, in related European Application No. 13867350.4.
Extended European Search Report, mailed Nov. 23, 2015, in related European Application No. 13867905.5.
Extended European Search Report, mailed Nov. 23, 2015, in related European Application No. 13866705.0.
Extended European Search Report, mailed Nov. 23, 2015, in related European Application No. 13869275.1.
Extended European Search Report, mailed Nov. 27, 2015, in related European Application No. 13869196.9.
Intellectual Property Office of Singapore (IPOS) Office Action (Written Opinion and Search Report), mailed Apr. 20, 2016, in related Singapore Patent Application No. 11201505027U.
Extended European Search Report, mailed May 19, 2016, from the European Patent Office (EPO) in related European Patent Application No. 13868645.6.
China Office Action, mailed May 27, 2016, in Chinese Patent Application 201380002141.0.
USPTO Office Action, mailed Jun. 2, 2016 in related U.S. Appl. No. 15/086,944.
USPTO Office Action, mailed Jun. 10, 2016 in related U.S. Appl. No. 14/087,605.
USPTO Office Action, mailed Jul. 6, 2016 in related U.S. Appl. No. 14/957,800.
Intellectual Property Office of Singapore (IPOS) Office Action (Written Opinion and Search Report), mailed Jun. 29, 2016, in related Singapore Patent Application No. 11201504980T.
USPTO Office Action, mailed Jul. 15, 2016 in related U.S. Appl. No. 14/973,783.
Intellectual Property Office of Singapore (IPOS) Office Action (Written Opinion and Search Report), mailed Jul. 8, 2016, in related Singapore Patent Application No. 11201504985W.
Chinese Office Action with Search Report (including English language translation of Search Report) from the State Intellectual Property Office (SIPO), mailed Feb. 4, 2017, for the corresponding Chinese Patent Application No. 201380067173.9.

\* cited by examiner (a) Visible light communication signal
(b) Backlight control signal
(c) Backlight control signal + visible light communication signal FIG. 5
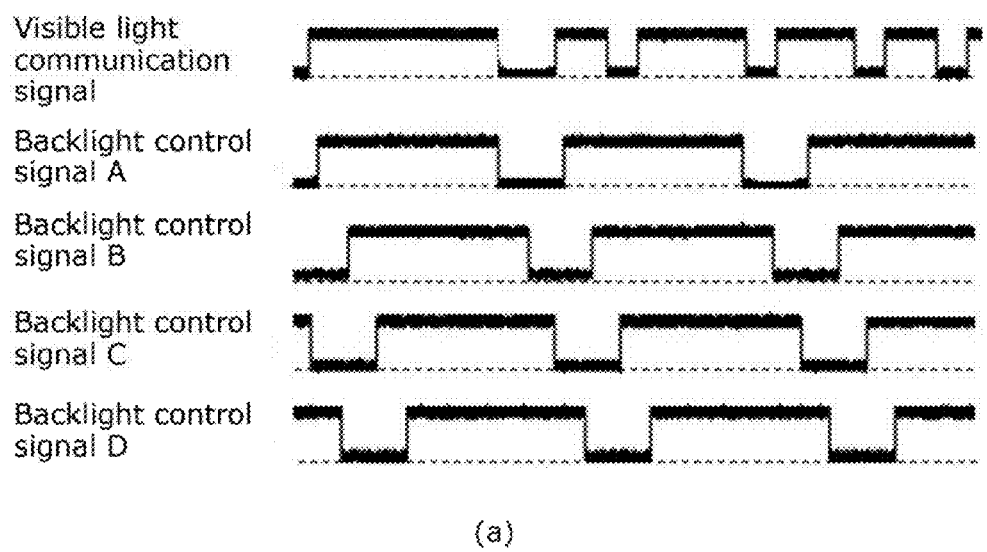
(a)
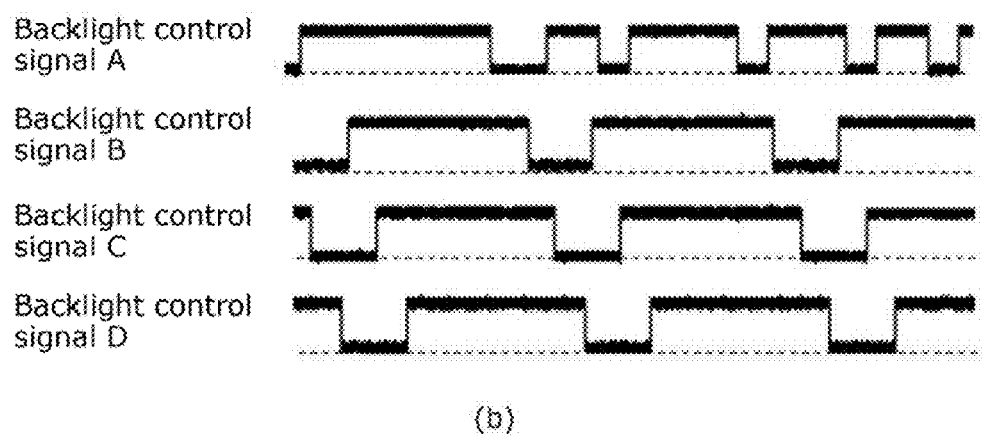
(b)

(a) Visible light communication signal (b) Visible light communication signal

Visible light communication signal

Backlight control signal

Period 1 | Period 2 | Period 3 | Period 4

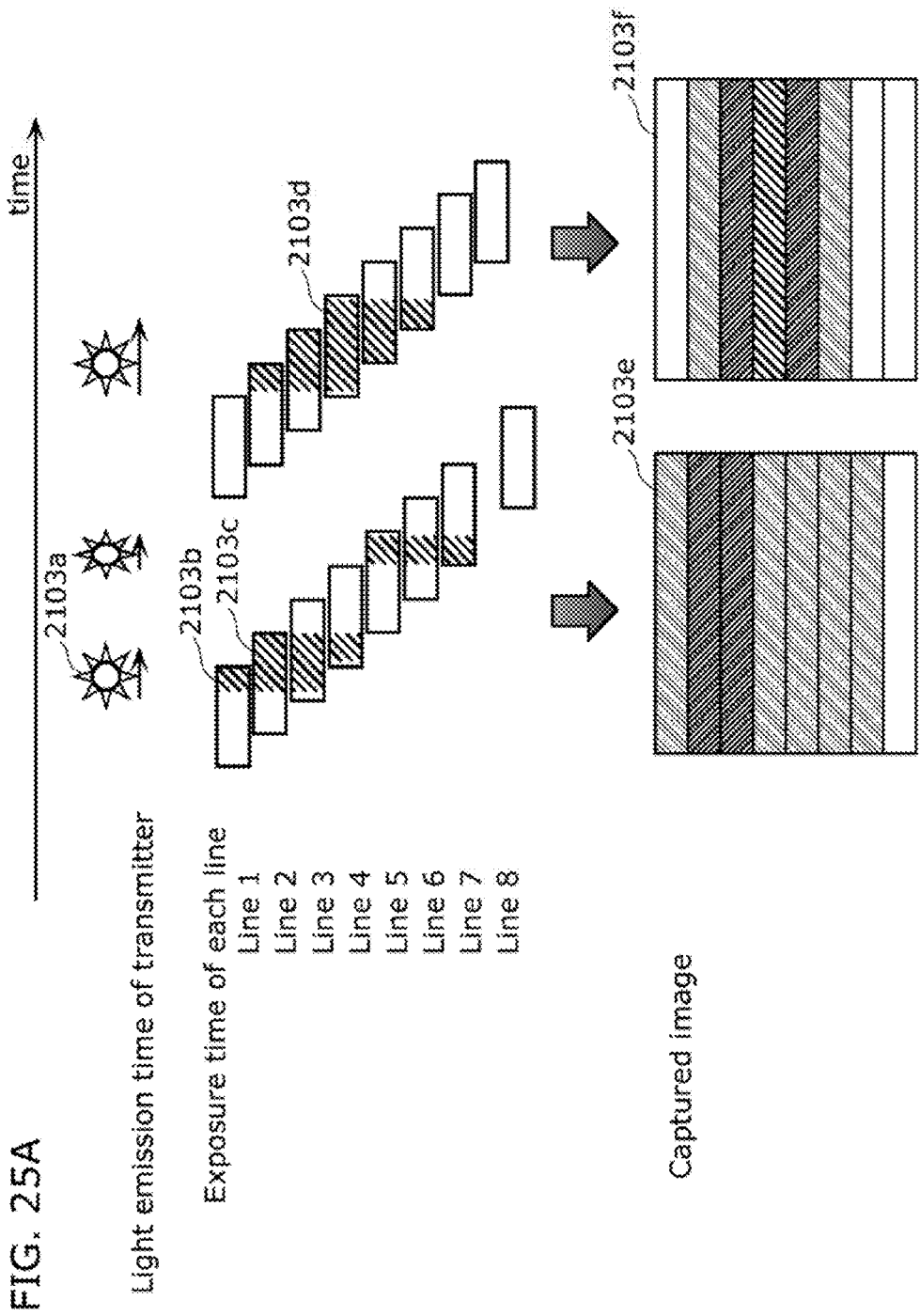

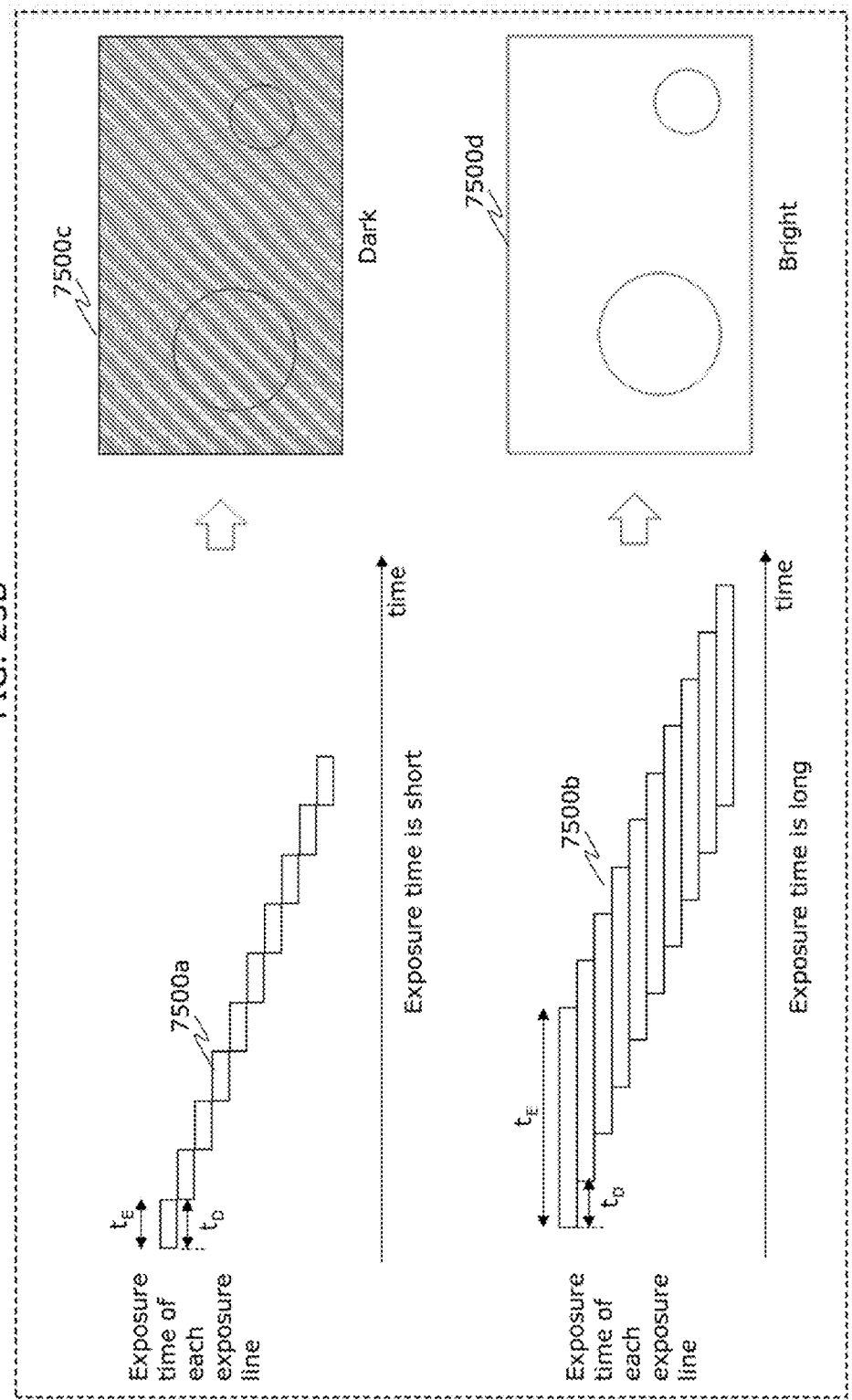

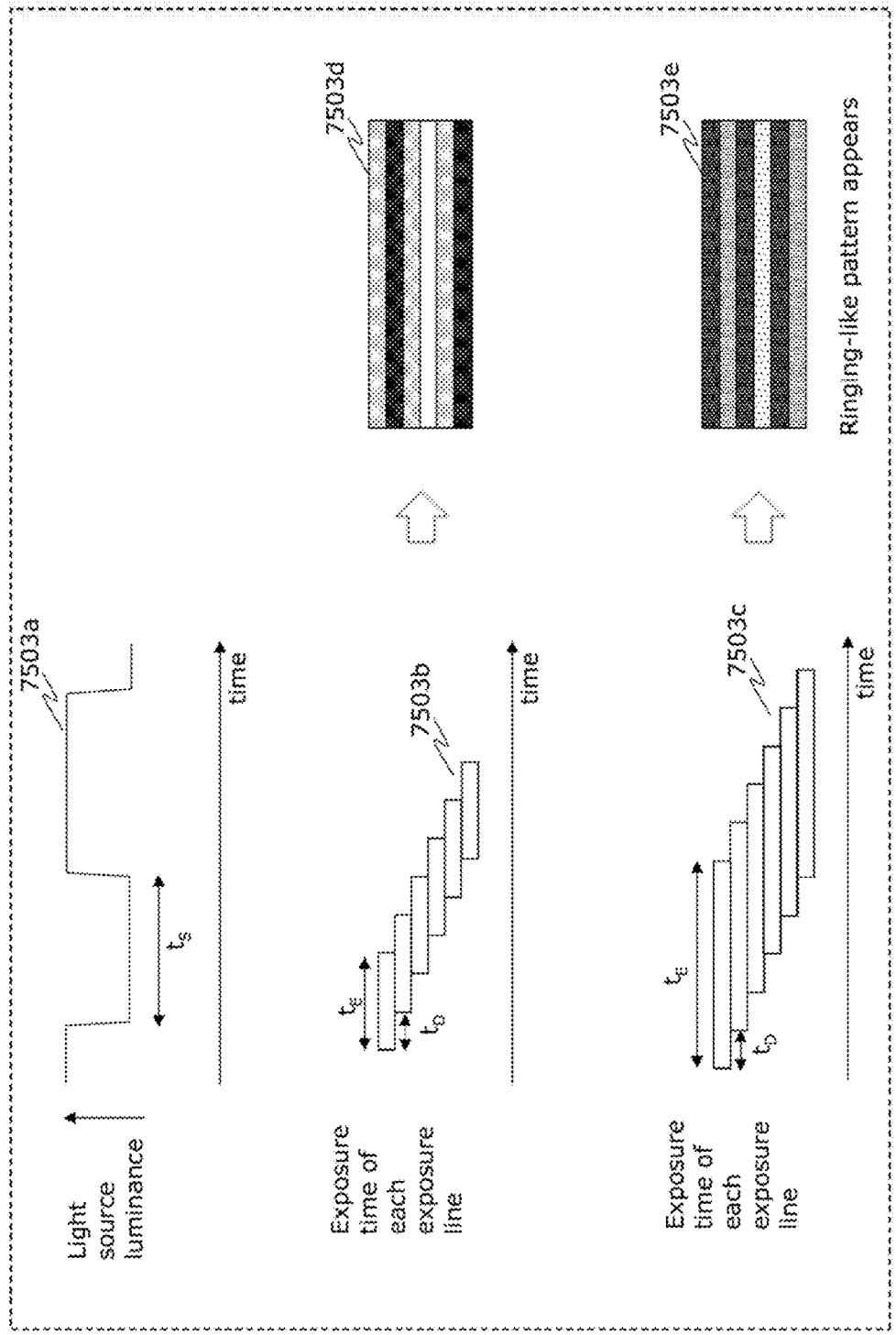

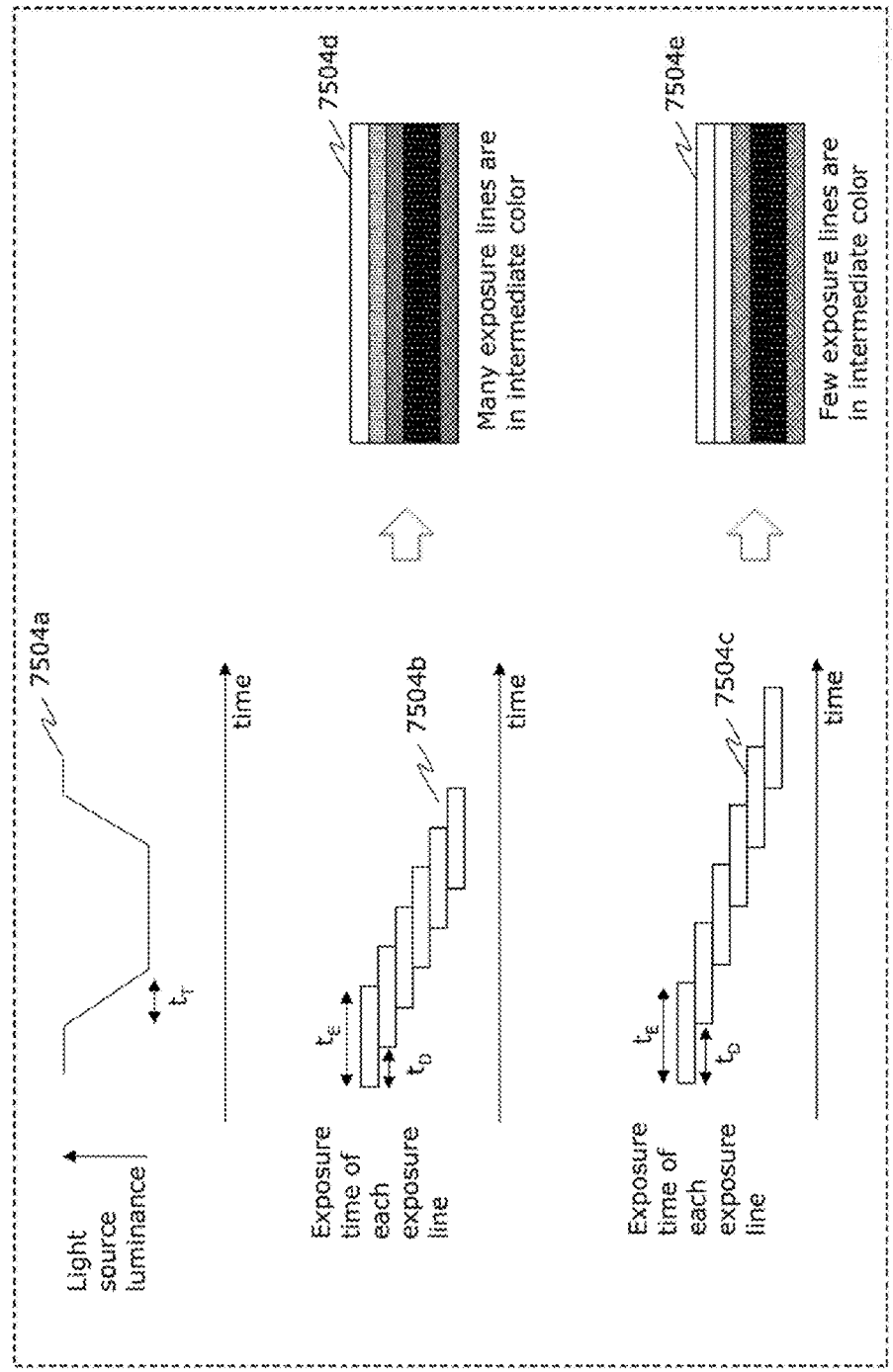

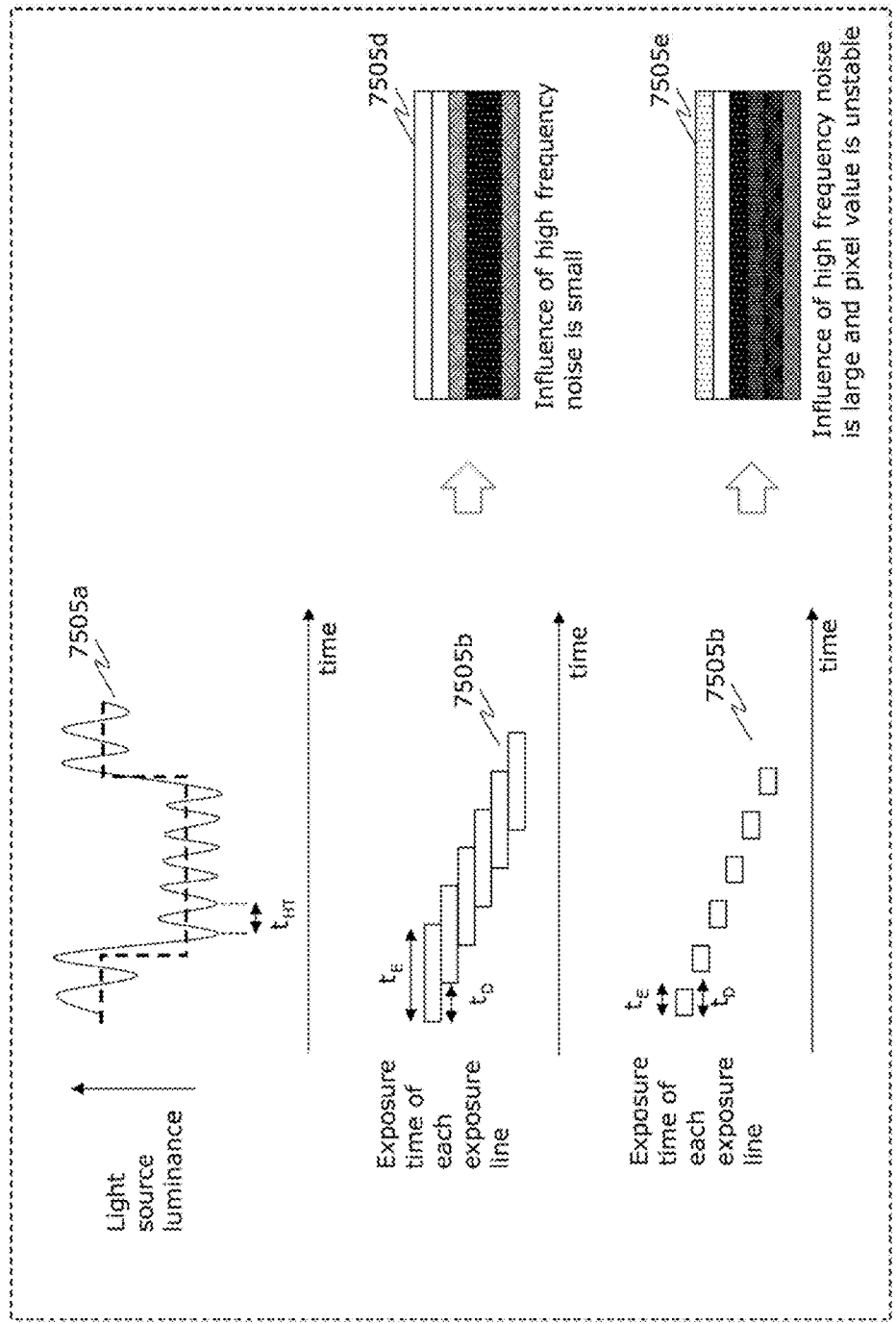

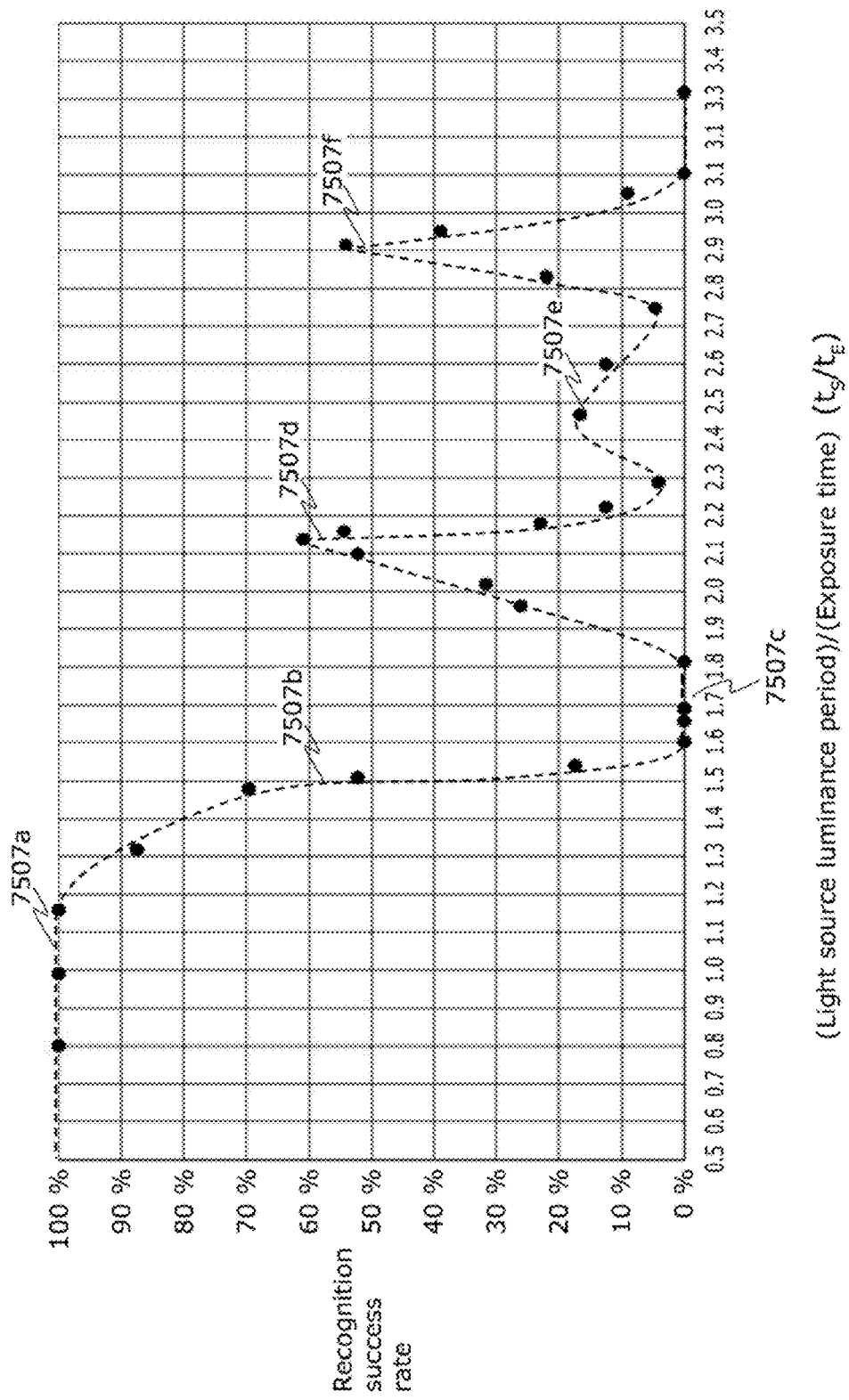

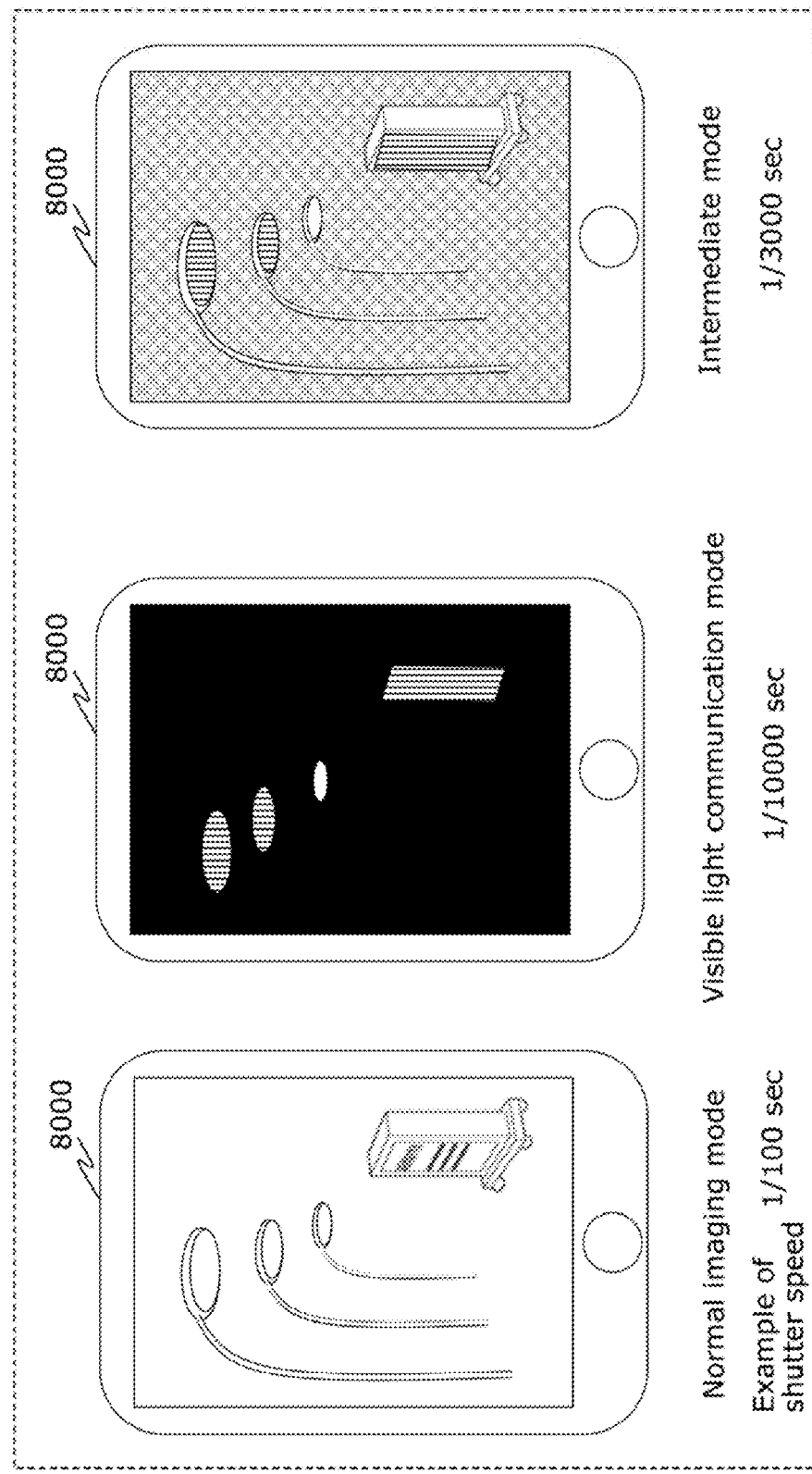

DISPLAY METHOD

CROSS REFERENCE TO RELATED APPLICATION(S)

The present application claims the benefit of U.S. Provisional Patent Application No. 61/746,315 filed on Dec. 27, 2012, Japanese Patent Application No. 2012-286339 filed on Dec. 27, 2012, Japanese Patent Application No. 2013-110445 filed on May, 24, 2013, Japanese Patent Application No. 2013-182714 filed on Sep. 4, 2013, Japanese Patent Application No. 2013-242407 filed on Nov. 22, 2013, U.S. Provisional Patent Application No. 61/910,158 filed on Nov. 29, 2013, and Japanese Patent Application No. 2013-248709 filed on Nov. 29, 2013. The entire disclosures of the above-identified applications, including the specifications, drawings and claims are incorporated herein by reference in their entirety.

FIELD

The present disclosure relates to a display method for displaying an image included in a video signal.

BACKGROUND

Communication techniques using visible light have been proposed. For example, as in Patent Literature 1 and 2, there are proposed techniques for superimposing communication information onto normal video using visible light, in a display device including a display, a projector, and so on.

CITATION LIST

Patent Literature

[Patent Literature 1] Japanese Unexamined Patent Application Publication No. 2007-43706
[Patent Literature 2] Japanese Unexamined Patent Application Publication No. 2009-212768

SUMMARY

Technical Problem

However, in the conventional display methods, there is the problem that it is difficult to reduce the probability of communication error without causing deterioration of image quality.

In view of this, the present disclosure provides a display method, and so on, capable of (i) transmitting a visible light communication signal without causing significant deterioration of image quality of an image to be displayed, and (ii) reducing probability of communication error occurring during the transmission.

Solution to Problem

A display method according to the present disclosure is a display method for representing, when an image included in a video signal is displayed on a per frame basis, a tone level of luminance of the image by controlling a light emission period in a frame, the light emission period being a period in which light emission is performed, the display method including: specifying, as a specified light emission period, a light emission period in which light emission is performed for greater than or equal to a time required for transmitting a signal unit included in a visible light communication signal, out of one or more light emission periods in which light emission is performed for displaying the image included in the video signal; and transmitting the signal unit included in the visible light communication signal by luminance changing in the specified light emission period.

Advantageous Effects

According to the present disclosure, the probability of communication error in visible light communication can be reduced without causing significant deterioration of image quality.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 is a schematic diagram illustrating an example of backlight control according to Embodiment 1.

FIG. 25A is a diagram illustrating an example of a method of observing luminance of a light emitting unit in Embodiment 2.

FIG. 25B is a diagram illustrating an example of a method of observing luminance of a light emitting unit in Embodiment 2.

FIG. 25E is a diagram illustrating an example of a method of observing luminance of a light emitting unit in Embodiment 2.

FIG. 25F is a diagram illustrating an example of a method of observing luminance of a light emitting unit in Embodiment 2.

FIG. 25G is a diagram illustrating an example of a method of observing luminance of a light emitting unit in Embodiment 2.

FIG. 25I is a diagram illustrating an example of a method of observing luminance of a light emitting unit in Embodiment 2.

FIG. 26 is a diagram illustrating an example of each mode of a receiver in Embodiment 2.

DESCRIPTION OF EMBODIMENT

A display method according to the present disclosure is a display method for representing, when an image included in a video signal is displayed on a per frame basis, a tone level of luminance of the image by controlling a light emission period in a frame, the light emission period being a period in which light emission is performed, the display method including: specifying, as a specified light emission period, a light emission period in which light emission is performed for greater than or equal to a time required for transmitting a signal unit included in a visible light communication signal, out of one or more light emission periods in which light emission is performed for displaying the image included in the video signal; and transmitting the signal unit included in the visible light communication signal by luminance changing in the specified light emission period.

Figure 10:
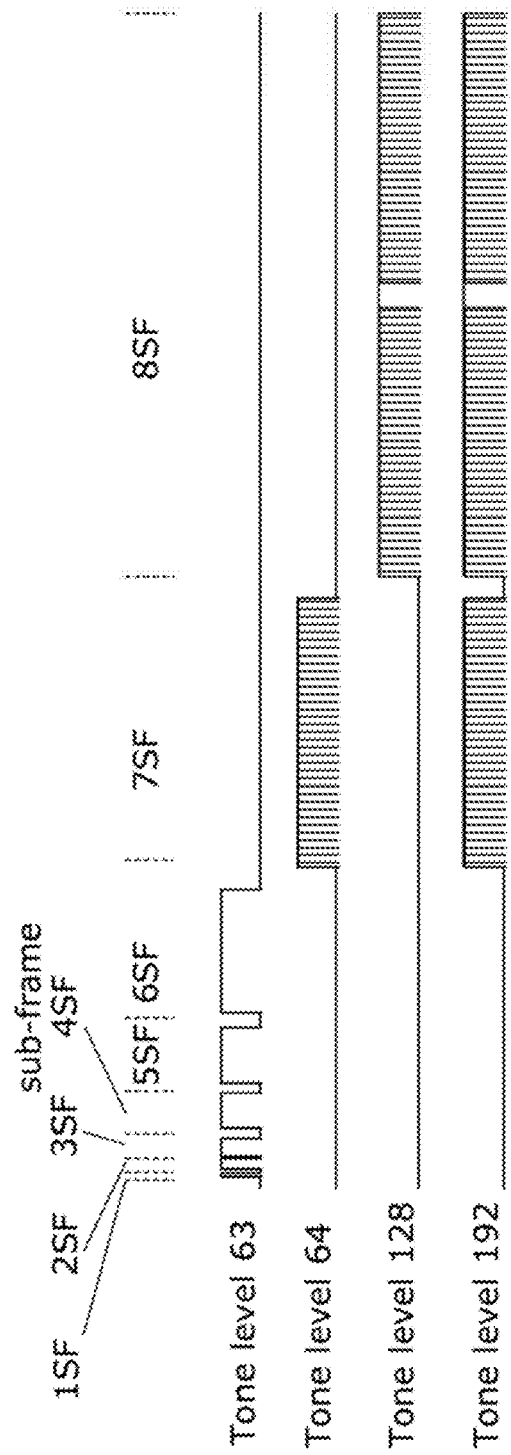
FIG. 10 is a schematic diagram illustrating superimposition between a video signal and a visible light communication signal according to Embodiment 2.

Accordingly, as illustrated in FIG. 10 to be described later, a specified light emission period greater than or equal to a time (period) required for the transmission of a signal unit (for example, a block) of a visible light communication signal is specified out of light emission periods which are for example several sub-frames, and the signal unit is superimposed on the image displayed in the specified light emission period. Therefore, the block is not divided and the signal included in such block can be transmitted continuously, and the probability of communication error can be reduced. In addition, even if luminance changing is performed in the specified light emission period for transmitting the signal unit, it is possible to suppress the changing of the light emission period required for displaying the image within the frame, and thus significant picture quality deterioration can be prevented.

For example, in the transmitting, in the case where the specified light emission period is greater than or equal to a time required for transmitting a plurality of signal units including the signal unit, the signal units of the visible light communication signal may be transmitted by luminance changing in the specified light emission period.

For example, the display method may further include calculating a whole number in a quotient obtained by dividing each of the one or more light emission periods by the time required for transmitting the signal unit, wherein, in the specifying, a light emission period for which the whole number portion of the quotient is 1 or more may be specified as the specified light emission period, and in the transmitting, signal units equivalent in number to the whole number may be transmitted in the specified light emission period.

Furthermore, in the case where the luminance of the image is controlled through each of colors for representing the image, the transmitting for a first color among the colors and the transmitting for a second color among the colors may be performed in parallel.

Figure 11:
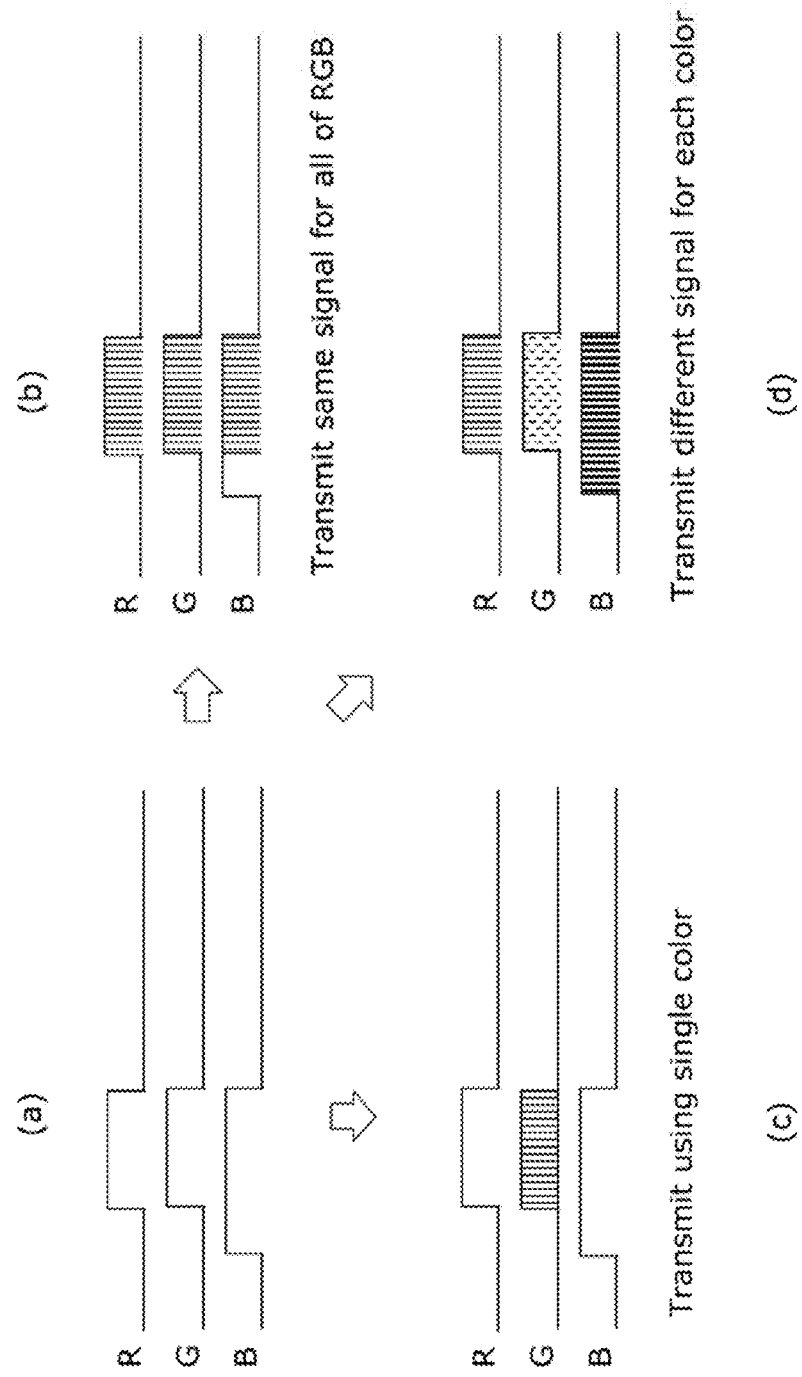
FIG. 11 is a schematic diagram of an example of signal transmission according to Embodiment 2.

Accordingly, as illustrated in FIG. 11 to be described later, communication error can be reduced while suppressing picture quality deterioration, even in the so-called 3-chip type.

Furthermore, in the case where the luminance of the image is controlled for each of colors for representing the image: in the specifying, a period which is greater than or equal to the time required for transmitting the signal unit may be specified as the specified light emission period, the period including a light emission period for a first color among the colors and a light emission period for a second color among the colors consecutive to the light emission period for the first color; and, in the transmitting, part of the signal unit may be transmitted by luminance changing in the light emission period for the first color, and the remaining part of the signal unit may be transmitted by luminance changing in the light emission period for the second color.

Figure 12:
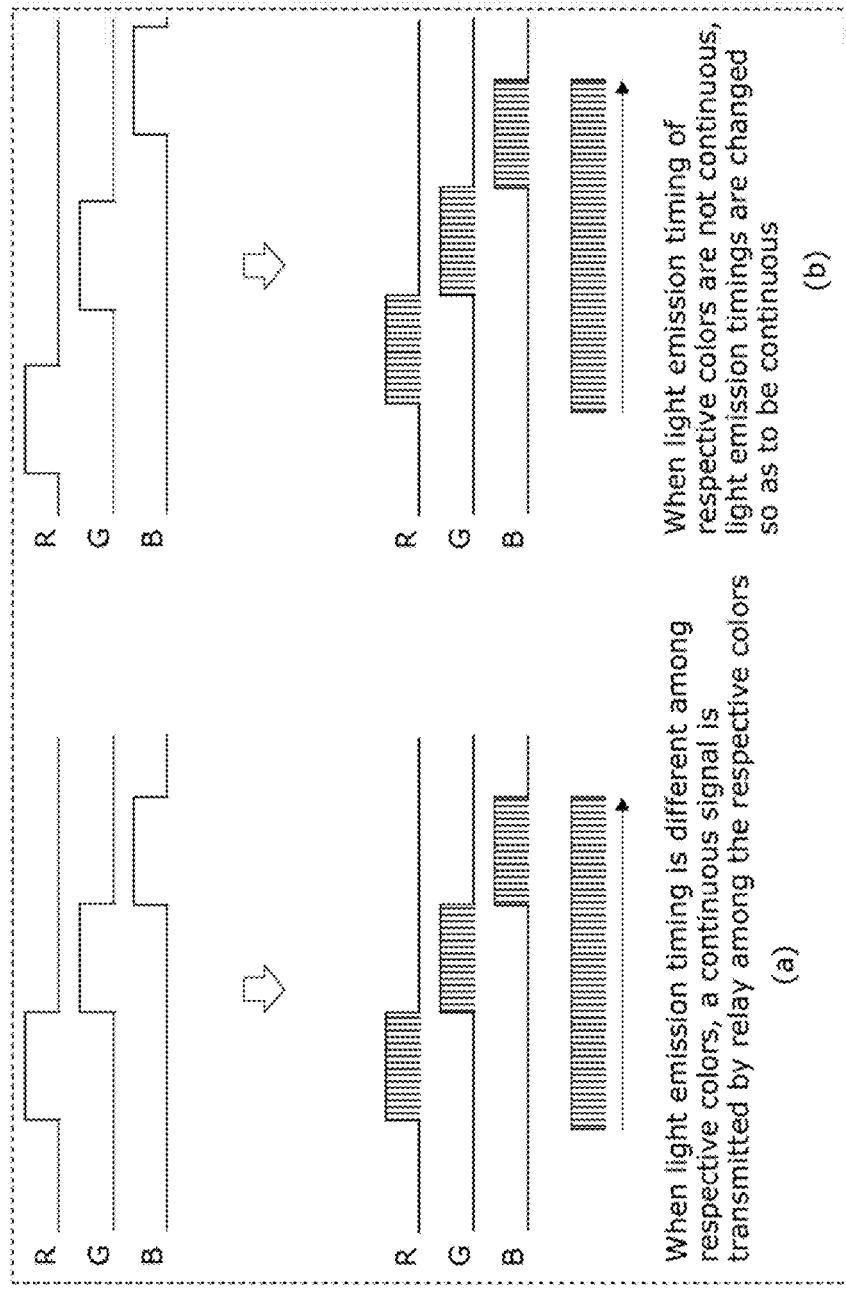
FIG. 12 is a schematic diagram of an example of signal transmission according to Embodiment 2.

Accordingly, as illustrated in FIG. 12 to be described later, since the signal unit of the visible light communication signal is transmitted by relay using the consecutive respective light emission periods of RGB for example.

Furthermore, the display method may further include changing a light emission timing for the first color or the second color to make the light emission period for the first color and the light emission period for the second color consecutive, when the light emission period for the first color and the light emission period for the second color are not consecutive.

Accordingly, as illustrated in FIG. 12 to be described later, since respective light emission periods of RGB are consecutively arranged for example, the adaptable range for the timing for transmitting the signal unit of the visible light communication signal can be widened.

Furthermore, the display method may further include matching, in the case the luminance is controlled for each of pixels for representing the image, a start point of a light emission period for a first pixel among the pixels and a start point of a light emission period for a second pixel adjacent to the first pixel among the pixels, when the start points do not match, wherein, in the specifying, a period in which the light emission period for the first pixel and the light emission period for the second pixel overlap may be specified as the specified light emission period, and, in the transmitting, the signal unit may be transmitted by luminance changing by the first pixel and the second pixel in the specified light emission period.

Figure 13:
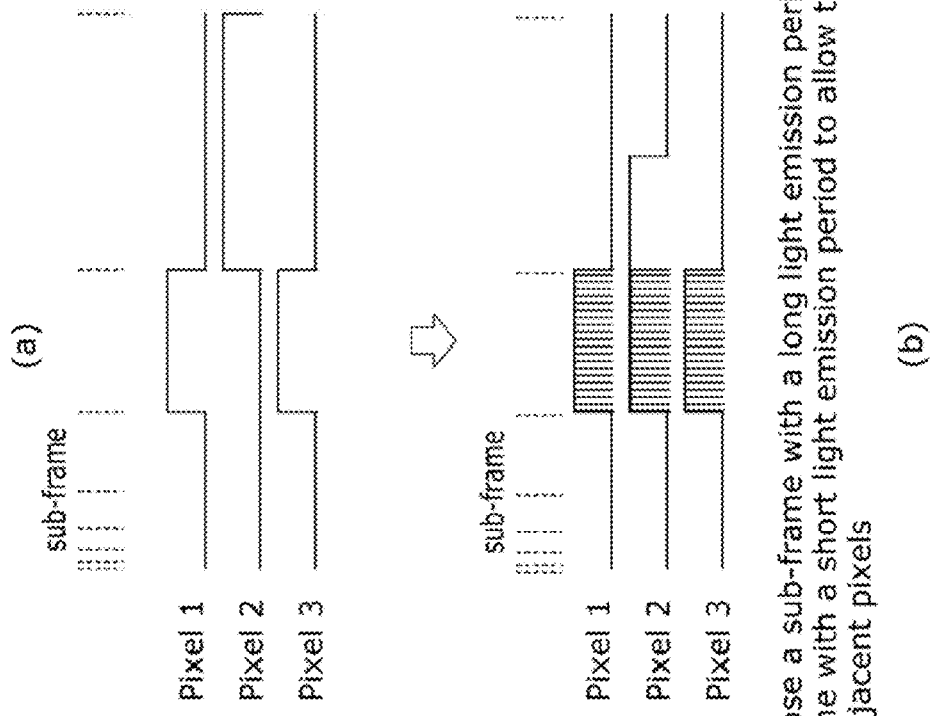
FIG. 13 is a schematic diagram of an example of signal transmission according to Embodiment 2.
Figure 14:
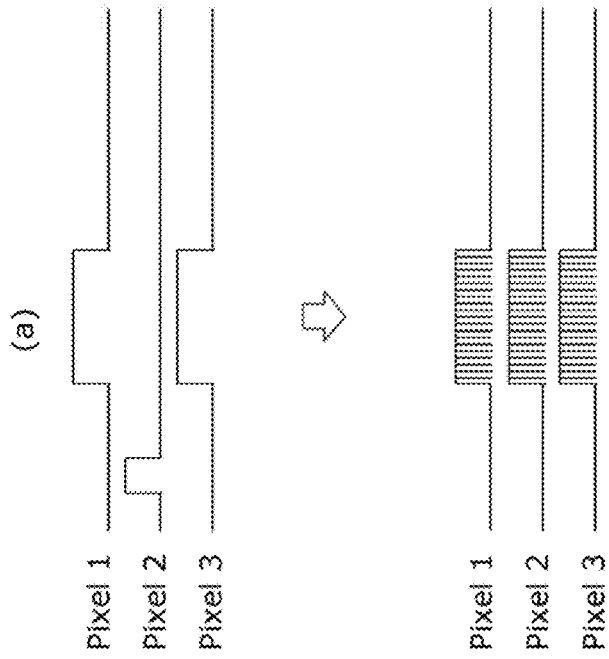
FIG. 14 is a schematic diagram of an example of signal transmission according to Embodiment 2.

Accordingly, as illustrated in FIG. 13 and FIG. 14 to be described later, since luminance changing is performed by mutually adjacent pixels, the luminance changing can be made clear, and the possibility of communication error can be reduced.

Furthermore, when the frame consists of sub-frames, in the specifying, a period including two consecutive sub-frames in which light emission is performed may be created by moving at least one of two non-consecutive sub-frames in which light emission is performed for displaying the image included in the video signal, and the period may be specified as the specified light emission period.

Figure 15:
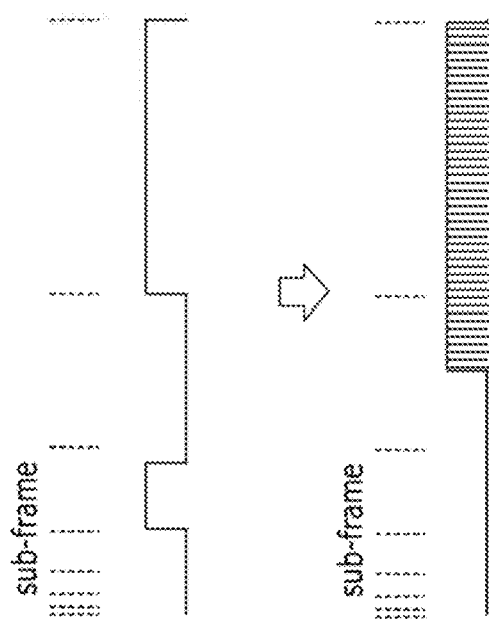
FIG. 15 is a schematic diagram of an example of signal transmission according to Embodiment 2.

Accordingly, as illustrated in FIG. 15 to be described later, even when the respective sub-frames are short, the specified light emission period is created by making the sub-frames consecutive, and thus the adaptable range for the timing for transmitting the signal unit of the visible light communication signal can be widened.

Furthermore, the display method may further include, in the case where the frame consists of sub-frames, and each of the one or more light emission periods is any one sub-frame among the sub-frames, causing light emission in a sub-frame in which light emission is not performed for displaying the image included in the video signal, and which has a period corresponding to a duty ratio of the signal unit. Furthermore, the display method may further include lengthening the specified light emission period for as long as a period in which light emission is suppressed for transmitting the signal unit.

Figure 17:
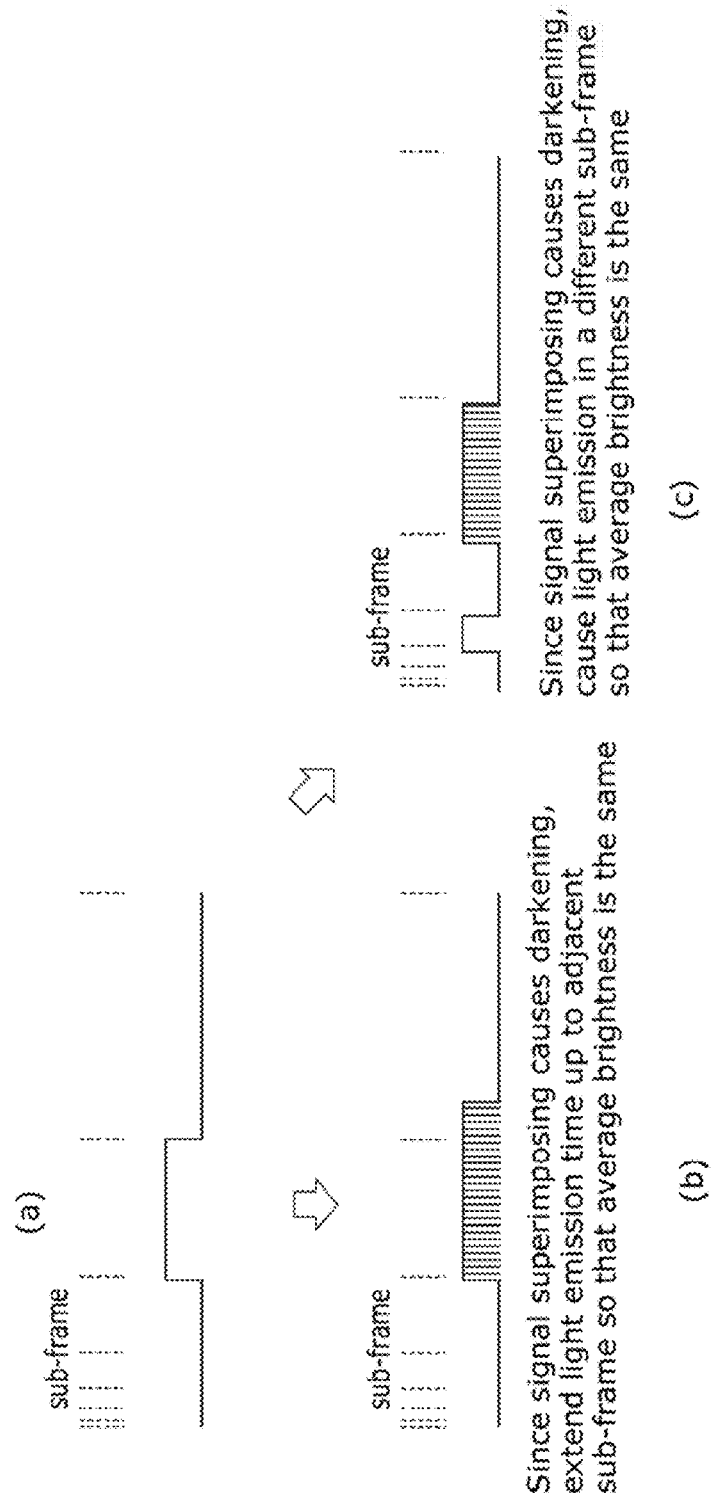
FIG. 17 is a schematic diagram of an example of signal transmission according to Embodiment 2.
Figure 19:
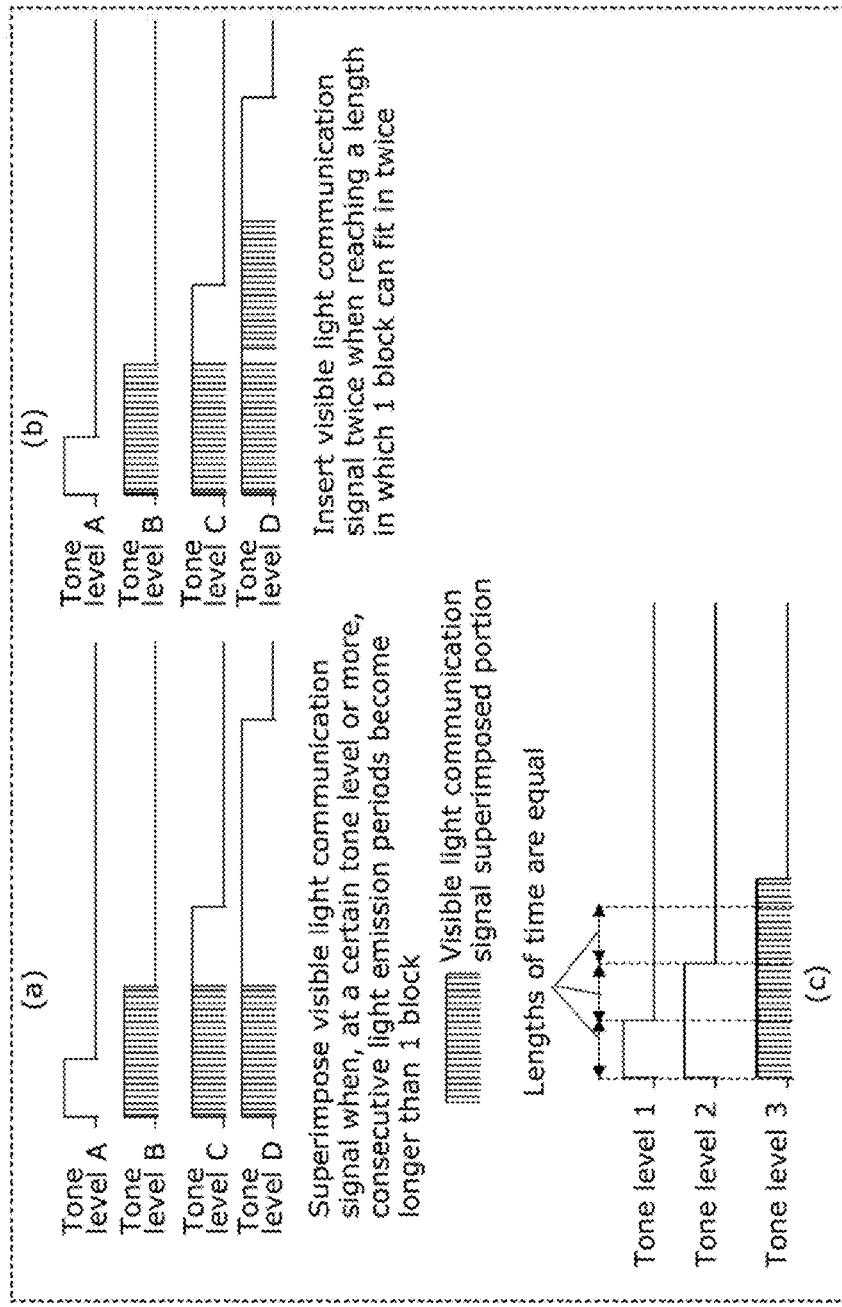
FIG. 19 is a schematic diagram of an example of signal transmission according to Embodiment 2.

Accordingly, as illustrated in FIG. 17 or FIG. 19 to be described later, since the total light emission period for 1 frame becomes long, the deterioration of brightness for displaying an image caused by luminance changing can be suppressed.

Here, in recent display devices, particularly display devices such as liquid-crystal displays, and projectors using liquid crystals, a technique called backlight scanning is being adopted for improving picture quality. Backlight scanning is a technique of dividing a display surface into regions and controlling light emission of backlights so that the backlights are sequentially turned on in the respective regions on a regular basis.

Visible light communication adopts a method of superimposing the visible light communication through the blinking of backlights, as disclosed in Patent Literature 1. As such, since a visible light communication signal cannot be transmitted during the time in which the backlight is off, and such shutoff period becomes a cause for signal transmission error, there is no other way but to stop backlight scanning and perform communication with reduced picture quality.

In view of this, a display device according to the present disclosure is a display device capable of outputting a visible light communication signal, which includes: a display panel having a display surface for displaying an image; a display control unit which performs control so as to display a video on the display surface of the display panel based on a video signal; a backlight having a light emission surface for illuminating the display panel; a backlight control unit which divides the light emission surface of the backlight into plural regions, and controls the light emission in the respective regions of the divided light emission surface, based on the video signal and/or the visible light communication signal. In the case where the video signal and the visible light communication signal are inputted to the backlight control unit and when at least one of the regions out of the divided light emission surface is adopted as a visible light communication region, the backlight control unit performs, in the visible light communication region, light emission control based on the visible light communication signal, and controls the backlight such that light emission control based on the video signal is not performed.

Accordingly, the visible light communication signal is transmitted without causing significant deterioration of image quality of the image to be displayed, and the probability of communication error occurring during the transmission can be reduced.

Furthermore, the display control unit may control the display panel so that display of video based on the video signal is performed, for the region corresponding to the visible light communication region out of the display surface of the display panel.

Furthermore, the display control unit may control the display panel so that luminance is brighter than when the video signal is inputted, for the region corresponding to the visible light communication region out of the display surface of the display panel.

Furthermore, the backlight control unit may, (i) when the video signal is inputted, control the backlight so that light emission control is performed at a different timing for the respective regions of the divided light emission surface, and, (ii) when the video signal and the visible light communication signal are inputted, control the backlight based on the visible light communication signal for the visible light communication region, and control the backlight so that light emission and non-light emission are performed at different timings for the respective regions other than the visible light communication region.

Furthermore, for two adjacent regions among the respective regions of the divided light emission surface, the duty ratios of the respective regions may be changed according to the difference between the duty ratios of the adjacent regions.

Hereinafter, embodiments shall be described in detail with reference to the drawings as necessary. However, there are instances where unnecessarily detailed description shall be omitted. For example, there are instances where detailed description of already well-known matter as well as overlapping description of substantially identical configurations shall be omitted. This is to prevent the subsequent description from becoming unnecessarily verbose, and to facilitate understanding by a person of skill in the art.

It should be noted that the drawings and subsequent description are provided by the Applicant in order for a person of ordinary skill in the art to sufficiently understand the present disclosure, and are not intended to limit the scope of the subject matter recited in the Claims.

Embodiment 1

Figure 1:
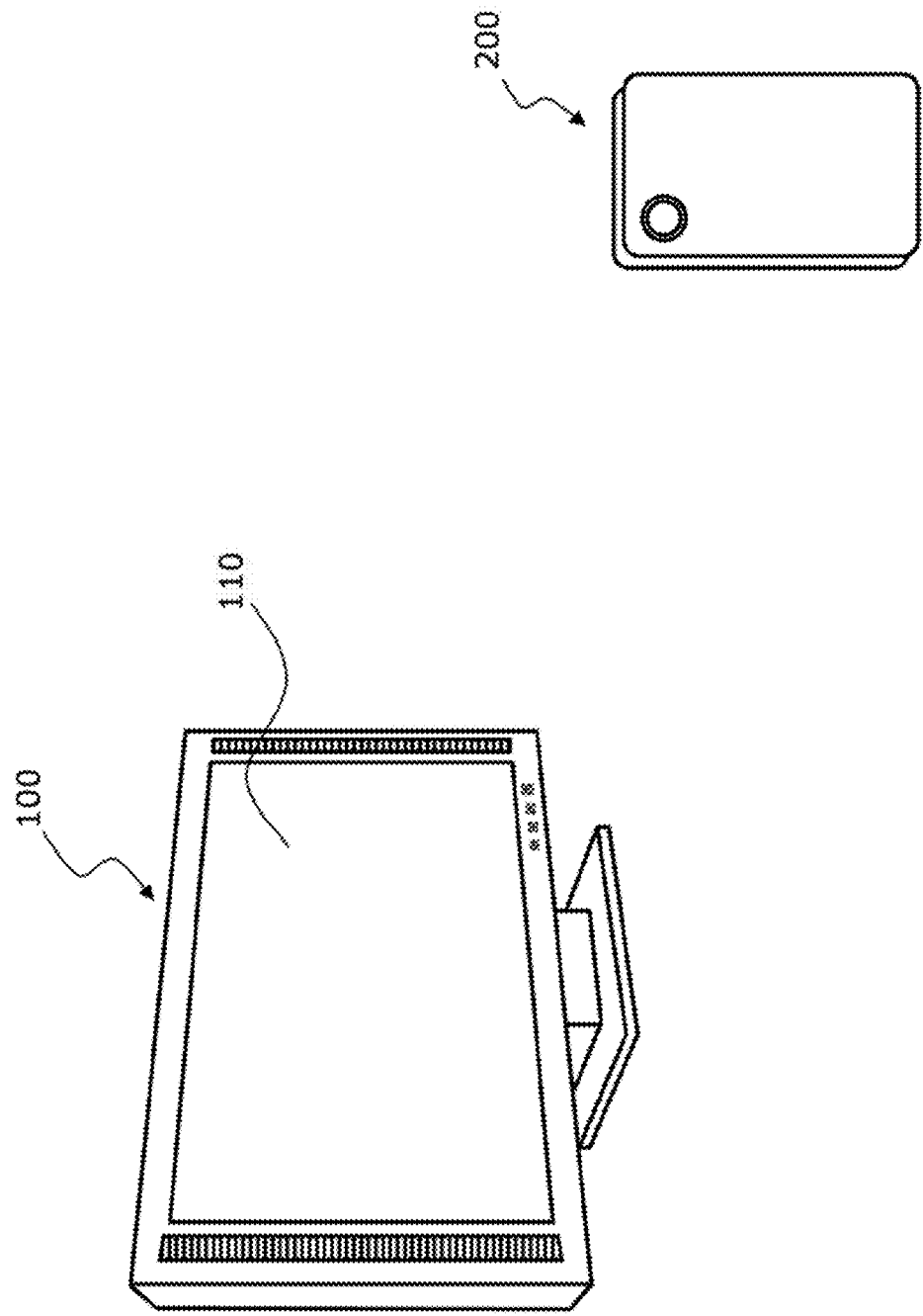
FIG. 1 is a schematic diagram illustrating a visible light communication system according to Embodiment 1.

FIG. 1 is a schematic diagram illustrating a visible light communication system according to Embodiment 1.

A display device is capable of displaying video on a display surface 110. Furthermore, a visible light communication signal is also superimposed in the display surface 110. The visible light communication signal transmitted from the display device 100 is received by, for example, a smartphone 200. With this, a user can receive information, and so on, related to the video displayed on the display device 100.

It should be noted that although the display device 100 is exemplified in this embodiment by a television which displays a video, a device which projects a video, such as a projector, is also acceptable. Furthermore, although the electronic device which receives the visible light communication signal is exemplified by the smartphone 200, the device is not limited to a smartphone as long as it is an electronic device capable of receiving a visible light communication signal.

Figure 2:
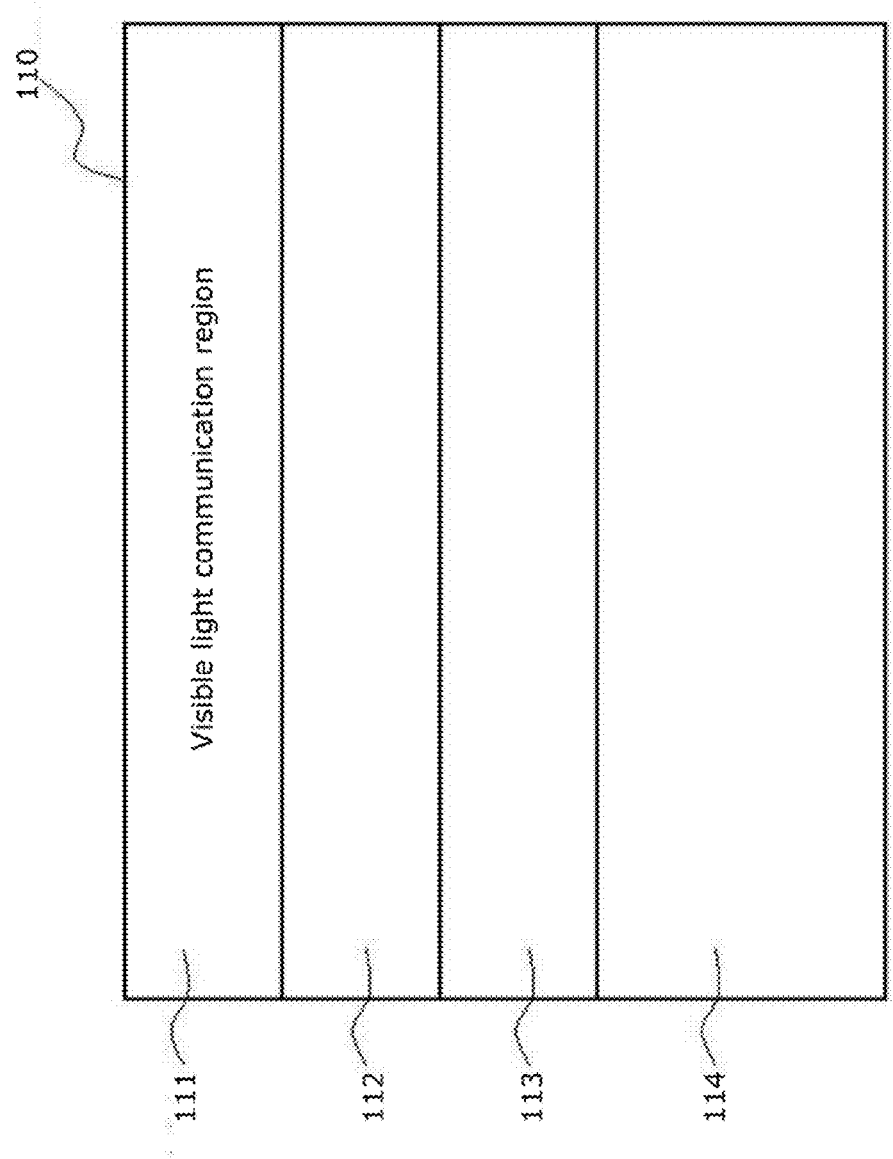
FIG. 2 is a schematic diagram illustrating a display surface according to Embodiment 1.

FIG. 2 is a schematic diagram illustrating the display surface 110 according to Embodiment 1. During the display of video on the display surface 110, light emission of a backlight is controlled for each of plural regions by backlight scanning. In FIG. 2, a state in which the display surface 110 is divided into four regions, namely, regions 111 to 114. Although details will be described later, in this embodiment, region 111, which is one of the plural regions, is used as a region in which visible light communication-based light emission is preferentially performed.

Figure 3:
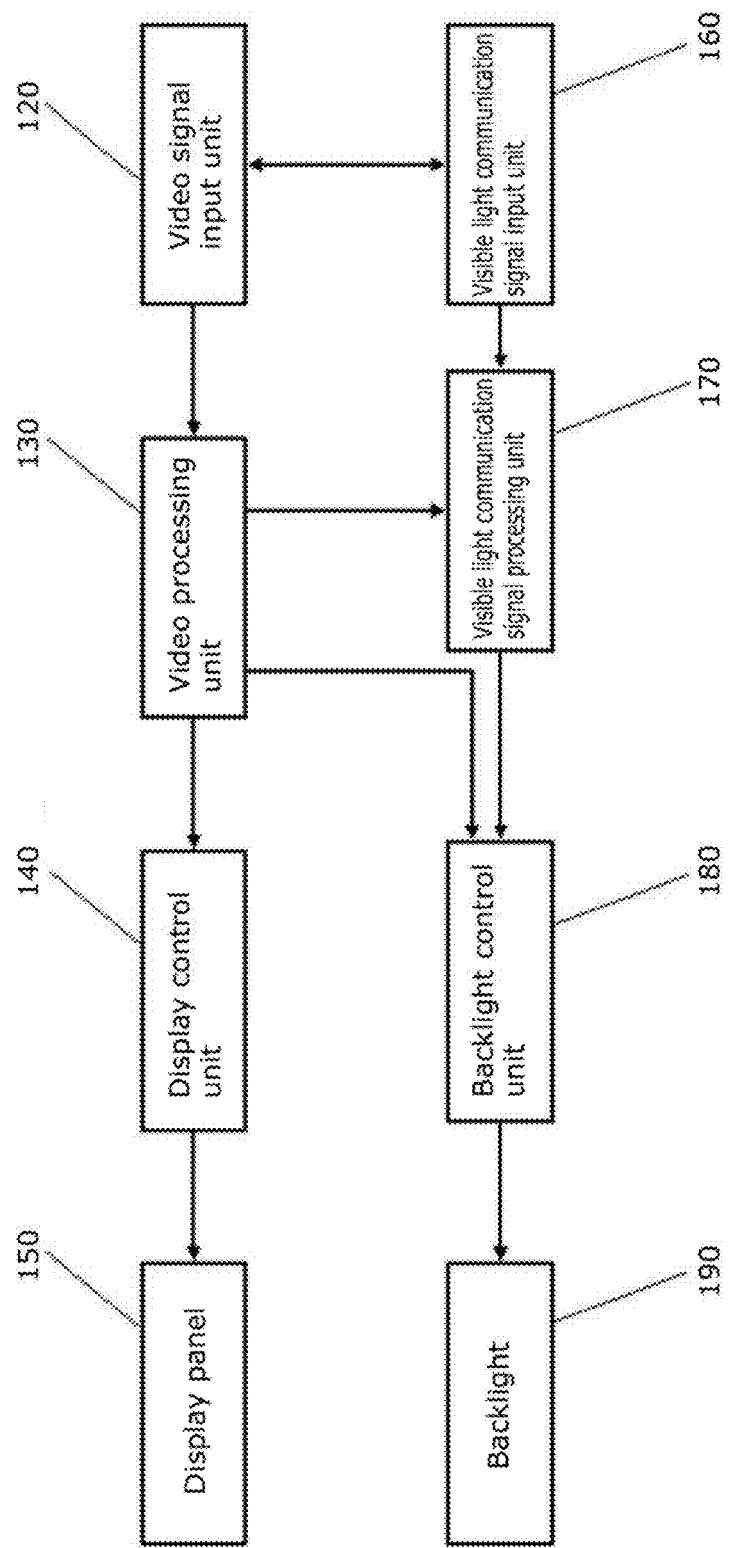
FIG. 3 is a block diagram illustrating an outline configuration of a display device according to Embodiment 1.

FIG. 3 is a block diagram illustrating an outline configuration of the display device 100 according to Embodiment 1. As illustrated in FIG. 3, the display device 100 includes a video signal input unit 120, a video processing unit 130, a display control unit 140, a display panel 150, a visible light communication signal input unit 160, a visible light communication signal processing unit 170, a backlight control unit 180, and a backlight 190.

A video signal regarding a video to be displayed on the display panel 150 is inputted to the video signal input unit 120. This video signal is transmitted to the video processing unit 130 and undergoes typical image processing such as image quality processing. The video signal on which the video processing unit 130 has performed image processing is transmitted to the display control unit 140.

The display control unit 140 performs control so that video is displayed on the display panel 150, based on the video signal transmitted from the video processing unit 130. The display panel 150 is for example a liquid-crystal panel. The display control unit 140 controls the opening of liquid-crystals, and so on, based on the video signal transmitted from the video processing unit 130.

A signal to be used in visible light communication is inputted to the visible light communication signal input unit 160. The inputted visible light communication signal is transmitted to the visible light communication signal processing unit 170, and coding of the visible light communication signal, duty ratio processing, and so on, are performed. Furthermore, the video signal is also transmitted from the video processing unit 130 to the visible light communication signal processing unit 170. Information on the brightness of the video, and so on, is included in this video signal. The visible light communication signal processing unit 170 determines which region from among the plural regions illustrated in FIG. 2 is to be used as a visible light communication region. For example, the region in the display surface 110 in which the brightest image is displayed may be set as the visible light communication region. Subsequently, the coded visible light communication signal, information on the visible light communication region, and the video signal are transmitted to the backlight control unit 180.

It should be noted that in the case where the location of the visible light communication region is predetermined, the process regarding the determination of the visible light communication region by the visible light communication signal processing unit 170 as described above need not be performed. In this case, the video signal may be transmitted directly from the video processing unit 130 to the backlight control unit 180.

The backlight control unit 180 controls the luminance and timing of the backlight 190 based on the video signal transmitted from the video processing unit 130 or the visible light communication signal processing unit 170. Furthermore, the backlight control unit 180 controls the light emission of the backlight 190 based on the video signal transmitted from the visible light communication signal processing unit 170.

The backlight 190 emits light to the display panel 150 from the back side. With this, a viewer can view the video displayed on the display panel 150.

The light emitting surface of the backlight 190 is divided into plural regions, and backlight scanning can be implemented by performing light emission control sequentially on each of the regions.

Although details will be described later, in this embodiment, at least one region among the plural regions is used as a visible light communication region. In this visible light communication region, light emission is performed based on the visible light communication signal, but light emission based on the video signal is not performed. In other words, since the visible light communication signal is not superimposed onto the video signal, the visible light communication signal can be transmitted without loss.

It should be noted that the display panel 150 also displays video in the visible light communication region. Although light emission based on the video signal is not performed in the visible light communication region, light emission based on the visible light communication signal is performed. In other words, the video displayed in the visible light communication region is illuminated by light based on the visible light communication signal. As such, the viewer can view the video on the entirety of the display surface 110 of the display panel 150.

However, since the video displayed in the visible light communication region is illuminated by light based on the visible light communication signal, there is the possibility that the video is not displayed with the appropriate luminance, and only that region is dark. In the case of a liquid-crystal panel, luminance can be adjusted by controlling the opening of the liquid crystals. Using this, the display control unit 140 may control the display panel 150 so that the luminance at the visible light communication region is higher than when the video signal is inputted.

Figure 4:
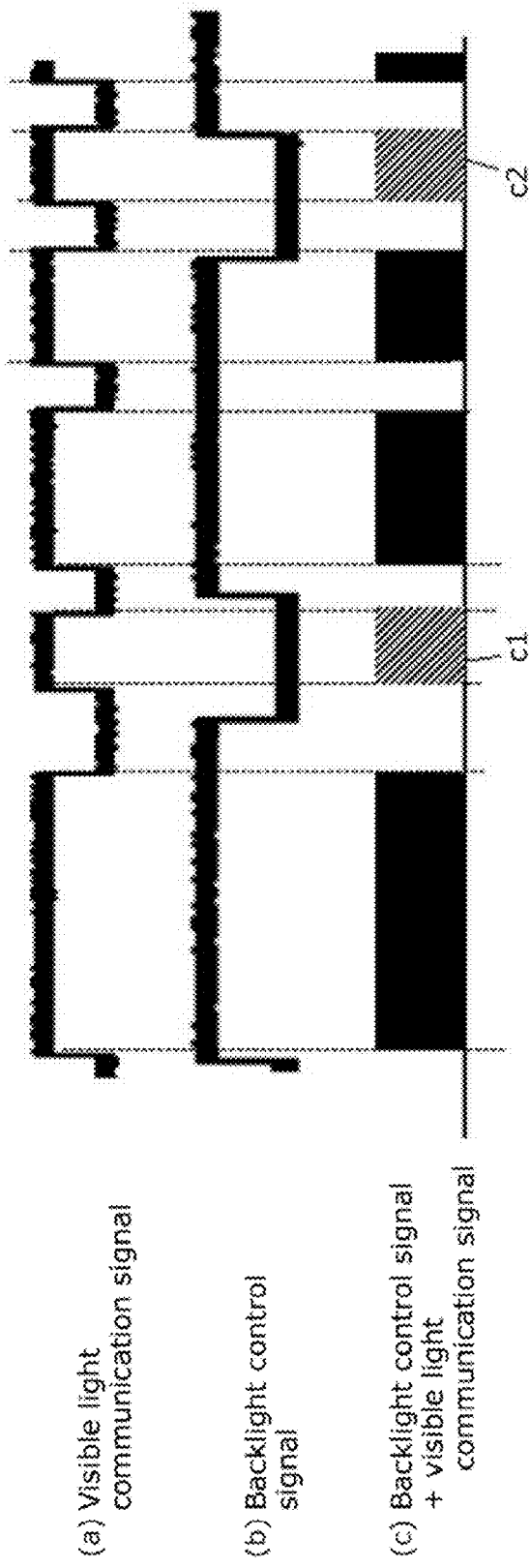
FIG. 4 is a schematic diagram illustrating an example of a state in which a visible light communication signal is superimposed onto a backlight signal for video display, according to Embodiment 1.

Next, backlight control shall be described. FIG. 4 is a schematic diagram illustrating an example of the state in which a visible light communication signal is superimposed onto a backlight signal for video display.

In FIG. 4, (a) is an example of a visible light communication signal conforming to, for example, JEITA CP-1222, (b) is an example of a backlight control signal, and (c) illustrates the case in which the visible light communication signal in (a) is superimposed onto the backlight control signal in (b).

As illustrated in FIG. 4, in the case where the visible light communication signal illustrated in (a) is superimposed onto the backlight control signal illustrated in (b), signals c1 and c2 cannot be superimposed onto the backlight control signal and are thus lost in periods in which the backlight control signal is not transmitted, that is, periods in which the backlight is off, as illustrated in (c). As a result, there is a possibility that visible light communication is not performed properly.

In view of this, in this embodiment, a region in which visible light communication is preferentially performed is set. FIG. 5 is a schematic diagram for describing signal control according to Embodiment 1.

In FIG. 5, (a) illustrates an example of a visible light communication signal and a backlight control signal according to Embodiment 1. In Embodiment 1, in order to perform backlight scanning, the backlight is controlled by being divided into the four regions 111 to 114, as illustrated in FIG. 2. In (a) in FIG. 5, backlight control signals A to D are the backlight control signals for regions 111 to 114, respectively. As illustrated in the figure, the respective backlight control signals are for performing control for sequentially turning the backlight ON/OFF at different timings.

In FIG. 5, (b) illustrates backlight control according to Embodiment 1. In FIG. 5, (b) illustrates backlight scanning for the case where region 111 is selected as the visible light communication region. As illustrated in (b) in FIG. 5, in region 111, the visible light communication signal is not superimposed onto the backlight control signal A, and thus only backlight light emission control based on the visible light communication signal is performed and backlight light emission control based on the video signal is not performed. On the other hand, in regions 112 to 114, backlight scanning using the backlight control signals B to D corresponding to the respective regions is performed.

Accordingly, in region 111, even in a period in which the backlight is normally turned off due to backlight scanning, the visible light communication signal is preferentially outputted, and driving is performed for turning on the backlight in a period in which the visible light communication signal is transmitted and turning off the backlight in a period in which the visible light communication signal is not transmitted.

Specifically, since the high and low of the visible light communication signal is to be set as the light-on and light-off outputs, this can be achieved by introducing the signal, as is, to the control system which controls the backlight.

It should be noted that using a light source that uses an LED as the light source of the backlight allows for faster rising from an ON state to an OFF state. Furthermore, since turning on from a non-lit state or turning off from a lighted state takes time when using a conventionally-used cold-cathode tube or the like, high and low may be distinguished by increasing/decreasing the amount of current to the cold-cathode tube instead of responding by turning ON-OFF. Alternatively, since a cold-cathode tube is driven at a high frequency, it is also possible to respond by changing the frequency. In order to realize such a function, the display device 100 in this embodiment includes, independently, the visible light communication signal processing unit 170 which creates a modulating signal for the visible light communication signal, and the backlight control unit 180 which controls backlight scanning.

It should be noted that the visible light communication signal may be outputted constantly or outputted in one or more specified periods. When outputting in a specified period, a device for generating signals conveying the start and end of the specified period may be provided. The visible light communication signal processing unit 170 and the backlight control unit 180 may include a mechanism for switching to switch to visible light communication signal transmission control upon receiving a signal conveying the start of the specified period, and switching to normal backlight control upon receiving a signal conveying the end of the predetermined period, switch Specifically, taking into consideration the rise, and so on, in switching, it is preferable to use an element capable of switching using a solid-state semiconductor element.

Furthermore, although in this embodiment, the visible light communication signal is preferentially outputted in region 111 corresponding to the top portion of the display surface 110, it is sufficient that the region in which the visible light communication signal is preferentially outputted is at least one of the regions of the display surface 110. Furthermore, it is preferable that such region be set to be wide in the case where signal transfer accuracy is to be prioritized, and set to be the narrowest region among the smallest units for backlight scanning in the case where image quality is to be prioritized. Furthermore, taking into consideration the fact that people tend to gaze at the vicinity of the center of the display surface 110, it would be preferable to use the regions at both end portions of the display surface 110. In order to receive these signals, there is a method of receiving the signal using a receiving device conforming to JEITA-CP1222 or an ordinary portable terminal or smartphone, and decoding the signal to obtain information. In addition, with regard to the information transfer scheme, a standard such as JEITA-CP-1223 currently being created or the already-created IEEE-P802.15, and a receiving device corresponding thereto may be used.

In addition, although the case of transmitting one visible light communication signal in one region is described in this embodiment, it is also possible to independently transmit a different visible light communication signal in plural regions, preferably, non-consecutive plural regions. Here, two or more circuits for generating modulating signals for visible light communication signals are included, and timing is matched with the control circuit for the backlight scanning of regions to which the respective visible light communication signals are to be transmitted.

It should be noted that although one visible light communication signal is set in Embodiment 1, the number of visible light communication signal is not limited to such, and more than one visible light communication signal may be provided and plural visible light communication signals may be superimposed in the respective regions. Here, the video signal passes video related to each of the visible light communication signals, and by transmitting video suggesting transmission of the visible light communication signal, it is possible to obtain the effect of reducing misinterpretation, and thus it is possible to reduce handling of plural signals and user error. By using, as a video related to a visible light communication signal, a video having the highest opening rate possible which allows for a good signal SN ratio, that is, a signal indicating a high white luminance, communication error is drastically reduced. With this, it is possible to display the region of the display surface from which the visible light communication signal is to be transmitted, it is possible to guide a receiver to face the displayed region, which leads to further improvement in communication precision.

By performing control such as that described above, improvement of image quality and communication accuracy can be realized.

It should be noted that, in order to further improve image quality, the subsequent control may be performed.

Specifically, the backlight for the region in which visible light communication is prioritized (for example, region 111 in FIG. 2) and an adjacent region (for example, region 112 in FIG. 2) are controlled in the manner described below.

Since the luminance in a region in which visible light communication is prioritized is for causing a certain amount of light emission even in a blanking period, a powdering phenomenon is seen during low tone level display. In addition, the average difference in luminance between adjacent regions becomes large, and there are instances in which this results in video in which borders are visible. This can be solved by performing, when a visible light communication signal is superimposed in a blanking period, control for approaching a state in which the visible light communication signal is not superimposed, by raising the average duty of an adjacent region in this period, or maintaining the duty of an adjacent region as is and lowering the average duty of the region in which visible light communication is prioritized.

Figure 6A:
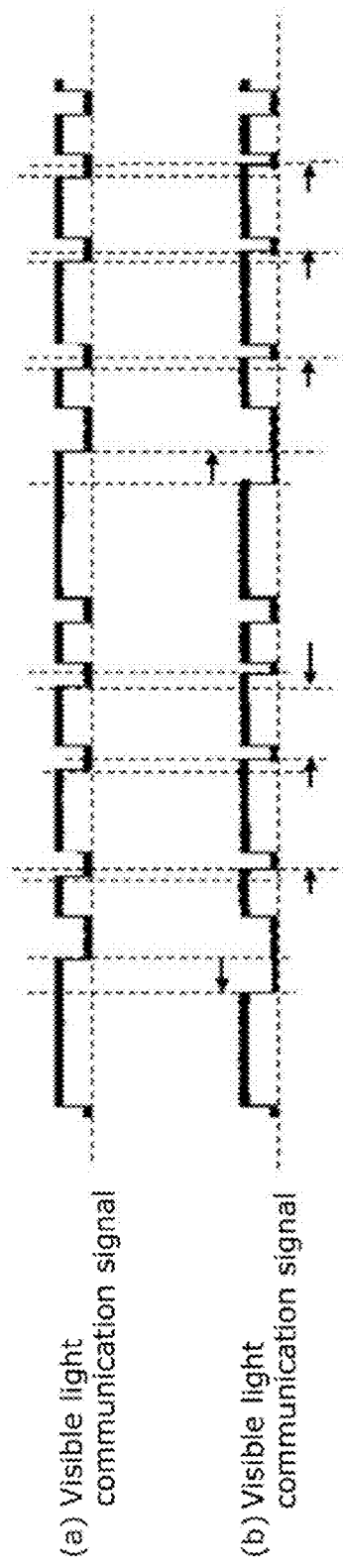
FIG. 6A is a schematic diagram illustrating an example of a visible light communication signal when duty ratio is changed, according to Embodiment 1.
Figure 6B:
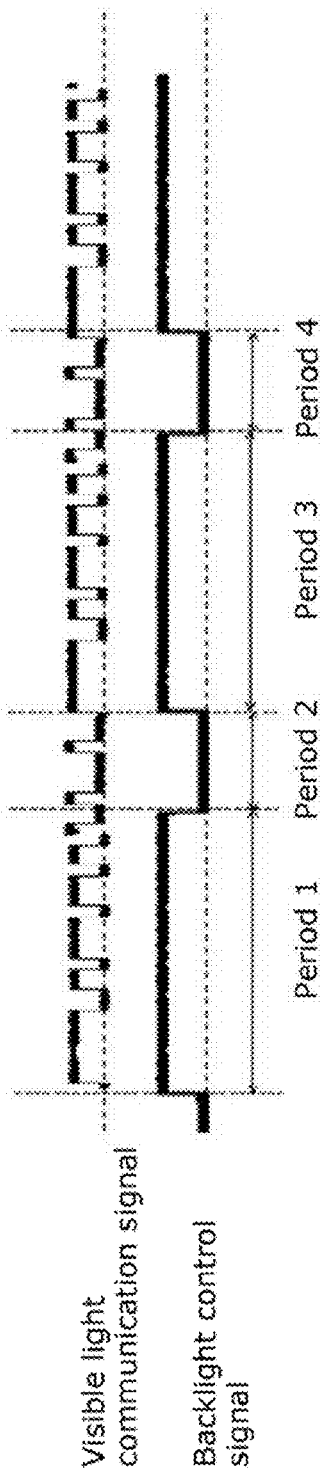
FIG. 6B is a schematic diagram illustrating an example of a visible light communication signal and a backlight control signal according to Embodiment 1.

Control for changing duty ratio shall be described using FIG. 6A and FIG. 6B. Here, (a) in FIG. 6A is a schematic diagram illustrating a visible light communication signal, and (b) in FIG. 6A is a schematic diagram illustrating a state in which the duty ratio of the visible light communication signal is changed. The duty ratio can be changed by advancing or delaying the signal rise timing of the visible light communication signal illustrated in (a) in FIG. 6A, in the manner illustrated in (b) in FIG. 6A. Furthermore, as illustrated in FIG. 6B, control may be performed so that a visible light communication signal having a large duty ratio is inputted in period 1 and period 3 in which the backlight control signal is in the ON state, and a visible light communication signal having a small duty ratio is inputted in period 2 and period 3 in which the backlight control signal is in the OFF state. The duty ratio can also be changed with such control.

In addition, the duty ratio can also be changed with the subsequently described control.

For example, in the receiver-side, aside from being able to receive, as is, the ON/OFF signal that is regularly transmitted on a slot basis in a fixed period, the slot periods are made fixed and not changed as a timing. On that basis, only the rise or fall of a pulse is detected, and the equivalent position of such timing in terms of the original slot time is judged. With this, it is possible to judge whether the equivalent slot is an ON signal or an OFF signal. This shall be described using FIG. 7.

Figure 7:
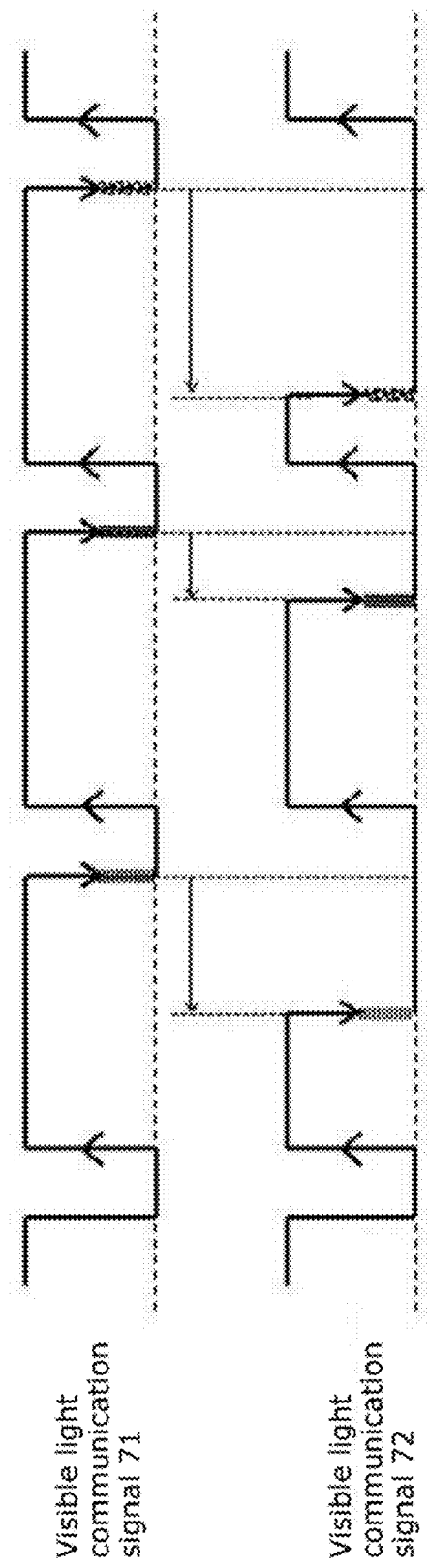
FIG. 7 is a schematic diagram for describing a signal when timing for the fall of a visible light communication signal is changed, according to Embodiment 1.

FIG. 7 is a schematic diagram for describing a signal when timing for the fall of a visible light communication signal is changed. As illustrated in FIG. 7, for example, when only the rise is considered, light emission is not continued, as is, in the turned on state for 1 slot but is turned off along the way, thus duty can be lowered and a more natural change can be made when the light-on rate of the adjacent region is small. In FIG. 7, the visible light communication signal 72 illustrates the case where control for advancing the fall timing of the visible light communication signal 71. As illustrated in FIG. 7, the light-off periods for the visible light communication signal 72 become longer than the light-off periods for the visible light communication signal 71. Furthermore, due to the same response even in the time span normally equivalent to the blanking period, the image quality of the video to be displayed can approximate the image quality of the original video in which a signal is not transmitted.

Inversely, in a period corresponding to a time span in which the light-on rate of adjacent blocks is high, duty can be raised by advancing the rise timing by, conversely, detecting only the fall, and thus the luminance difference between adjacent regions can be reduced. With such a method, it is possible to perform control such that the average luminance does not change drastically for each block. Furthermore, by using these methods, discontinuous regions caused by the entry of a control signal, which are visible when looking at the entire screen are reduced, and natural images can be provided.

In this manner, the luminance difference between adjacent regions can be reduced by making the visible light communication signal rise or fall timing shorter or longer than normal depending on whether the light emitting intensity of an adjacent region is stronger or weaker than the light emitting intensity of the visible light communication region.

In order to realize control such as that described above, it is sufficient to use the method described below.

First, the video of the region in which visible light communication is prioritized and the adjacent region, and the luminance according to backlight scanning and the visible light communication signal are calculated on a screen frame basis. Then, in view of the difference with the adjacent region, an average duty which does not cause unnatural discontinuity is further calculated, and the average duty between the region in which visible light communication is prioritized and the adjacent region is determined. Then, the time for which the light-on time is to be lengthened or shortened is calculated from one duty, and control is performed to forcibly cause the signal to rise to the ON state or fall to the OFF state according to the passing of such time. By including a mechanism for implementing such an operation, it is possible to provide a monitor capable of providing a communication signal different from the video signal, without reducing signal transfer accuracy and without significant deterioration in image quality.

(Modification)

As described above, Embodiment 1 is described as an example of an implementation of the present disclosure. However, the present disclosure is not limited to such, additional effects can be expected by adding a method such as further superimposition with an image signal, responding by changing the backlight scanning sequence, and so on.

Figure 8:
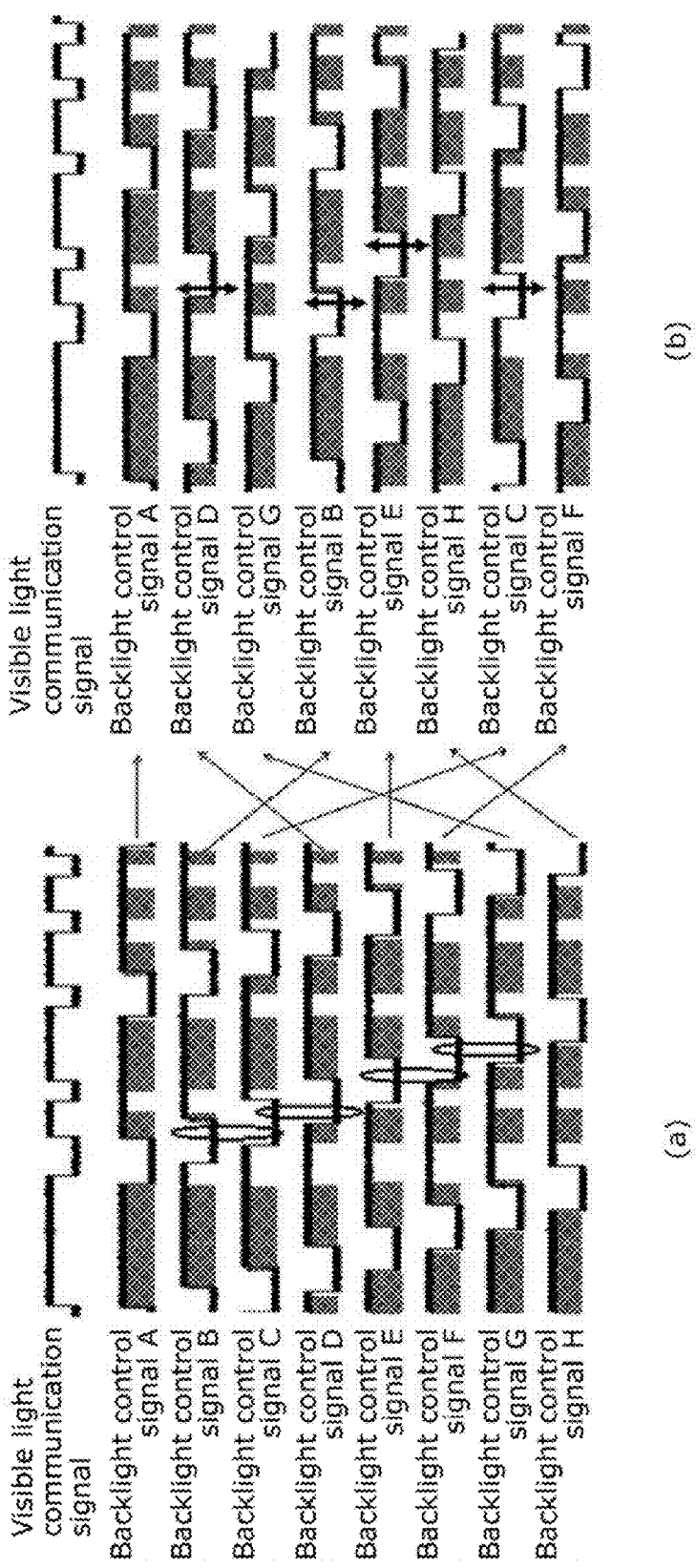
FIG. 8 is a schematic diagram illustrating another example of a backlight control signal according to Embodiment 1.

FIG. 8 illustrates an operation according to a modification of Embodiment 1. FIG. 8 is a diagram for describing a method of backlight scanning in the case where the display surface is divided into eight regions. In FIG. 8, backlight control signals A to H represent backlight control signals corresponding to a different one of the regions.

Originally, in backlight scanning, an unnecessary time span during writing of image data is divided into blocks, and, to improve contrast, the backlight is turned off in such time. However, in actuality, there is significant leaked light from an adjacent region. As such, it is possible to use the leaked light from the adjacent region and complement the blanking period of backlight scanning. However, in the case of sequential scanning, as indicated by the portions surrounded by a circle in (a) in FIG. 8, when blanking periods of adjacent regions are consecutive, loss of visible light communication signals occurs. As such, there arise problems such as the association with slot partitions in the transfer of visible light communication signals becoming unclear, and so on.

As such, as illustrated in (b) in FIG. 8, as indicated by the double-headed arrows, a backlight control signal is necessarily present at least for an adjacent region, and it is also possible to respond so that blanking periods do not become consecutive, by changing the image data scanning sequence. Although an effect is recognizable for the modification even on its own, the effect is sufficiently produced even when combined with the foregoing embodiment.

Although each single coded signal is described in the foregoing embodiment as a single signal, light may be further emitted as an aggregate of high-frequency pulses of two or more sub-carriers in a single signal in order to reduce flicker when seen with the human eye. Furthermore, in such case, the duty ratio of the sub-carriers may be changed as necessary. In addition, instead of having lights off, it is acceptable that a dark period in a sub-carrier is a light-emitting state which is darker than during light-on.

Furthermore, as a characteristic of a typical display, gamma correction is performed, and there are cases of correction by a value of 2.2 or, in the case of a digital broadcast signal, a value of 2.4. However, in the superimposing of the visible light communication signal indicated in the embodiment in particular, it is also possible to aim for the effect of reducing signal transmission error by setting the gamma correction value to about a higher 2.4 to 2.8 so that the brightness of the visible light communication signal is higher in the intermediate tone level. Specifically, it is acceptable to adopt a method of controlling the gamma correction value automatically according to an Average Picture Level (APL) or according to a predetermined setting. In addition, when the video signal itself is dark and it is predicted that, even when the signal is transmitted, an error will occur due to deficiency in performance on receiving side, a countermeasure such as temporarily interrupting the signal may be taken. With regard to signals, taking into account that one-way communication is performed regardless of the properties of the screen, adopting a countermeasure of repeatedly transmitting the same signal two or more times and avoiding errors occurring during receiving is also effective.

As described above, an embodiment perceived by the Applicant as the best mode and a modification thereof are provided using drawings and detailed descriptions. These are provided to exemplify the subject matter recited in the Claims to a person of ordinary skill in the art by referring to a particular embodiment. Therefore, various changes, substitutions, additions, omissions, and so on, can be performed on the above-described embodiment within the scope of the Claims or equivalents thereof.

Embodiment 2

Figure 9:
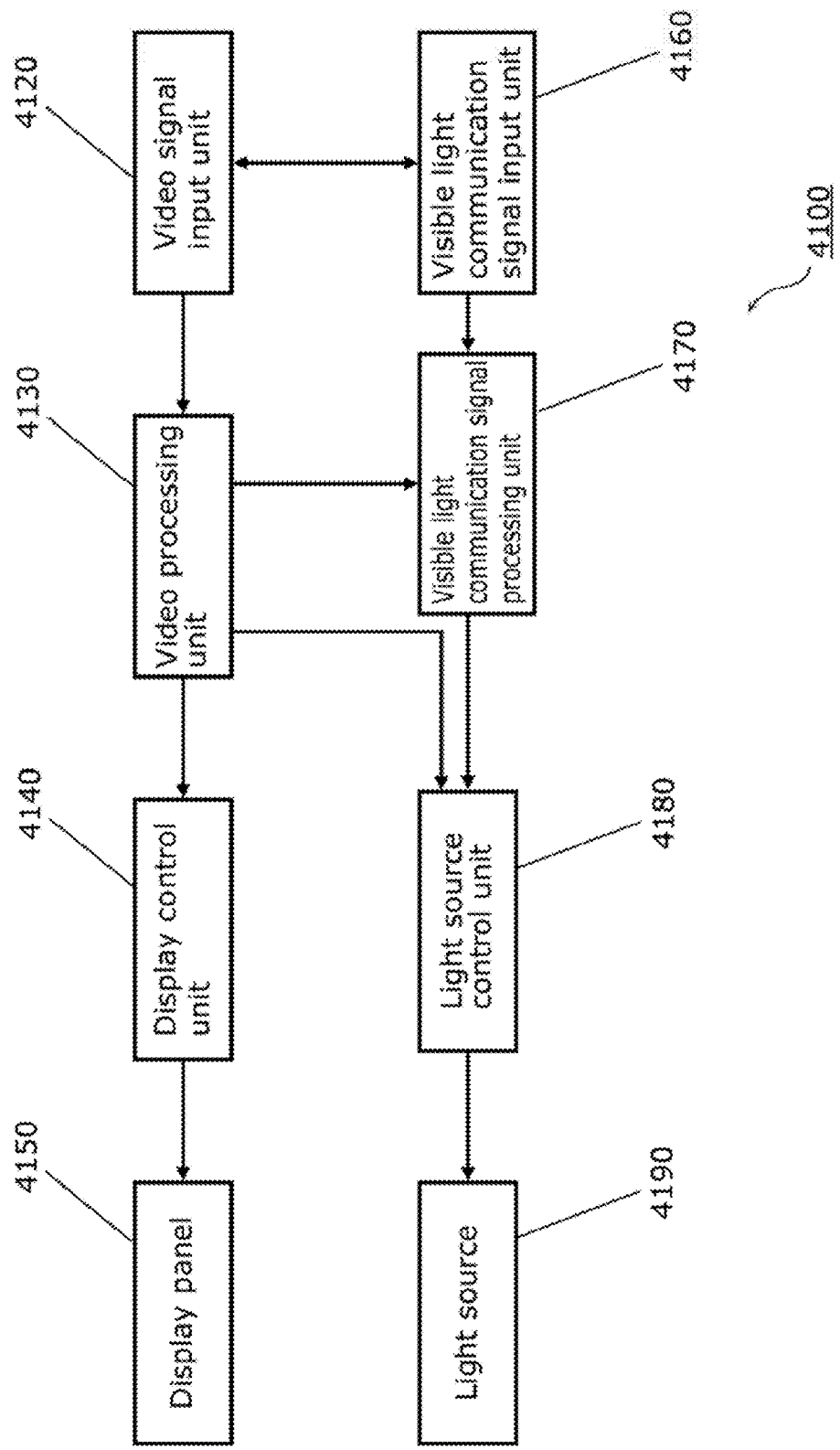
FIG. 9 is a block diagram illustrating an outline configuration of a display device according to Embodiment 2.

FIG. 9 is a block diagram illustrating an outline configuration of a display device 4100 according to Embodiment 2. The basic configuration shall be described using FIG. 9.

As illustrated in FIG. 9, the display device 4100 includes a video signal input unit 4120, a video processing unit 4130, a display control unit 4140, a display unit 4150, a visible light communication signal input unit 4160, a visible light communication signal processing unit 4170, a light source control unit 4180, and a light source 4190.

A video signal regarding a video to be displayed on the display unit 4150 is inputted to the video signal input unit 4120. This video signal is transmitted to the video processing unit 4130 and undergoes typical image processing such as image quality processing. The video signal on which the video processing unit 4130 has performed image processing is transmitted to the display control unit 4140.

The display control unit 4140 performs control so that video is displayed on the display unit 4150, based on the video signal transmitted from the video processing unit 4130. The display unit 4150 is for example a digital mirror device (DMD) of a projector. The display control unit 4140 performs DMD control and so on based on the video signal transmitted from the video processing unit 4130.

A signal (visible light communication signal) to be used in visible light communication is inputted to the visible light communication signal input unit 4160. The inputted visible light communication signal is transmitted to the visible light communication signal processing unit 4170, and the visible light communication signal processing unit 4170 performs coding, duty ratio processing, and so on, on the visible light communication signal. Furthermore, the video signal is also transmitted from the video processing unit 4130 to the visible light communication signal processing unit 4170. Information on the brightness of the video, and so on, is included in this video signal. Subsequently, the coded visible light communication signal, information on the visible light communication region, and the video signal are transmitted to the light source control unit 4180.

The light source control unit 4180 controls the blinking and timing of the light source 4190 based on the video signal transmitted from the video processing unit 4130 or the visible light communication signal processing unit 4170. Furthermore, the light source control unit 4180 controls the light emission of the light source 4190 based on the visible light communication signal transmitted from the visible light communication signal processing unit 4170.

The light source 4190 emits light to the display unit 4150. With this, a viewer can view the video reflected on the display unit, via a lens, a screen, and so on.

Hereinafter, specific description shall be carried out with the description being divided between the case of using weighted sub-frames and the case of using pulse width modulation (PWM).

First, the case of using weighted sub-frames shall be described. A sub-frame, which is also called a sub-field, is a unit of time equivalent to one section obtained by partitioning one frame for displaying a single image included in a video signal. In a liquid-crystal display which allows adjustment of per unit time light emission energy or a variable-resistance electro-luminescence (EL) display, and so on, luminance can be changed without dividing into sub-frames, by adjusting the per unit time light emission energy. However, when this is insufficient, it is possible to divide one frame into several sub-frames to increase the number of representable luminances (number of cases; number of tone levels). Furthermore, there are also cases in which tone level representation is performed in combination with the control of light emission in each sub-frame. Furthermore, tone level representation is performed using only the light emission time for a type of display that does not allow the per unit time light emission energy to be adjusted and for which primary colors are separated according to the cell arrangement, that is, a plasma display or a fixed-resistance EL display, or some DMD-type projectors or a display using micro electro mechanical systems (MEMS). Furthermore, in these devices, and so on, basically, weighted sub-frames are created, light emission is turned ON or OFF for the entire period of each sub-frame, and the total of the weights of the sub-frames that are ON is expressed as the tone level. In the lowest case, for example, for 8 bits, the numerical values 0 to 255 can be represented without redundancy using the combination of 2 to the nth power (n=0 to 7).

However, in an actual display, for a video where, for example, temporal switching between tone levels 127 and 128 is repeated, there are instances where a different video is falsely seen due to the configuration of the video in conjunction with a person's eye movement. In view of this, there are many instances where measures are taken to intentionally create redundancy to avoid such an extreme change in the combination of sub-frames. Here, in order to simplify description, description shall be made for the case of performing 8-bit tone level display without redundancy, that is, the case where the nth sub-frame is represented by the combination of 2 to the (n−1)th power (n=1 to 8), and the nth sub-frame shall be referred to as nSF. It should be noted that the present method is very effective for display devices of the type which has a light source or backlight, and allows for independent driving of tone level representation and separate light source or backlight blinking operation, and not the self-luminous type such as a projector or display using MEMS.

For example, specific description shall be carried out exemplifying the case of having an independent DMD for each of the three primary colors RGB. As described earlier, since a frame is divided into several sub-frames of different lengths, the light from a light source is not necessarily derived continuously for a period of at least one unit (hereafter referred to as 1 block) for transmitting a visible light communication signal.

As an example, a schematic diagram illustrating the superimposing of a video signal and a visible light communication signal according to this embodiment is illustrated in FIG. 10. The case where the length (period) of a signal for 1 block is greater than 6SF and less than or equal to 7SF shall be described. Since a signal is not transmitted when the tone level of the luminance outputted by the DMD is from tone level 0 to tone level 63, and light emission is surely performed for 7SF when the tone level is from tone level 64 to tone level 127, the light source control unit 4180 superimposes the visible light communication signal onto the light of the light source in the period of 7SF (that is, the video to be reflected in the 7SF). In other words, the light source control unit 4180 specifies, as a specified light emission period, a light emission period (for example, 7SF) in which light emission is performed for at least the time required for the transmission of a signal unit (block) making up the visible light communication signal, among at least one light emission periods in which light emission is performed in order to display an image included in the video signal. Then, the light source control unit 4180 transmits the block, which is a signal unit of the visible light communication signal, by causing the light source 4190 to change luminance in the specified light emission period.

From tone level 128 to tone level 191, the visible light communication signal is superimposed in the period of 8SF. From tone level 192 and above, when the visible light communication signal is superimposed onto the light of the light source 4190 in either or both the periods of 7SF and 8SF, transmission of the signal becomes possible. Here, when the signal is to be superimposed in 7SF or 8SF, time adjustment may be performed in 7SF or 8SF so that the desired weight is achieved in the superimposed state. In other words, by setting the period obtained by multiplying the original sub-frame period by the reciprocal of the duty ratio of the coded visible light communication signal, as the sub-frame period in which the transmission of the visible light communication signal is performed, the signal can be transmitted without disturbing the original weight.

In the same manner, when the signal length (the period in which changing of luminance is performed for transmitting the visible light communication signal) for an arbitrary sub-frame is within such sub-frame period, it is also possible to set the sub-frame as a signal superimposing sub-frame, and transmit the signal only when emitting light in such sub-frame.

As in a projector using a DMD, in the case where a residual image of a discreetly emitted light creates an image when seen by the human eye, there is a phenomenon where a different color is seen or cases where a different image is falsely seen when the change in light emission is synchronized due to the movement of the line of sight. In order to avoid this, aside from simply dividing one frame into eight sub-frames, there are cases where, after one frame is divided into several sub-frames, further division into sub-frames is performed. In such a case, the period of each sub-frame becomes extremely short, and it is conceivable that frames in which the signal can be transmitted will be very limited. As examples of countermeasures, aside from dividing sub-frames other than large sub-frames, there are methods which reduce side-effects by rationalizing the sub-frame configuration or adopting a sub-frame configuration with redundancies. Furthermore, upon dividing, the order of the largest sub-frame among the sub-frames obtained in the dividing and which are to be turned on is changed so that the sub-frames to be turned on are consecutive.

It should be noted that the signal length of the visible light communication signal is different depending on the transmission rate, and, for example, when attempting to obtain a signal using a sequential exposure-type image sensor as in the current state, there are certain restriction on exposure time. When receiving light using a dedicated photo-sensor, sufficient light-receiving is possible even when using a high-speed transmission rate of several hundred MHz to several GHz. As such, it is also possible to adopt a method which copes by raising the transmission rate.

Next, the case of using PWM control shall be described. The concept is to control the tone level according to the light emission time, in the same manner as the case of controlling the tone level by distinguishing light emission and non-light emission on a per weighted sub-frame basis described earlier. Here, description shall be carried out for the case in which, for the sake of simplification, each frame is not divided, light-on is started simultaneously as one, and light-off is performed after the passing of the light emission time for carrying out a predetermined tone level representation.

In each frame, a period determined according to the tone level is divided according to the signal length of the visible light communication signal, and, when the quotient is less than 1, the signal is simply not transmitted. When the quotient is greater than or equal to 1, the signal is transmitted by repeating the signal transmission for a number of times equivalent to the whole number portion of the quotient. Here, since transmitting the signal causes the period for light emission to be shortened by a percentage obtained by subtracting the duty ratio of the visible light communication signal from 1, extending the light emission period makes it possible to accurately output the tone level. Conversely, in a period equivalent to the value of the quotient obtained by dividing the signal length by the duty ratio, the period determined by the tone level may be divided and the signal outputted for as many times as the whole number portion of the quotient. This makes it possible to increase the frames in which the signal can be transmitted, without deterioration of tone level performance.

Even in the case of PWM control, the same operation may be performed in the case of dividing a single frame and avoiding a falsely-seen color or image that is different from that represented by the signal and which occurs due to line of sight movement. Furthermore, as mentioned earlier, it is described here that light emission is begun at the start of each frame or unit period obtained by dividing each frame and ends at a period determined by the tone level. However, as long as the periods are the same, any position inside the frame may be used, and a signal may be transmitted by changing the position of the periods inside the frame so that the light-on periods of mutually adjacent frames are consecutive. These controls can be implemented by having the light source control unit calculate the timing, and transmitting a timing signal to the light source control unit.

Although a method and device for transmitting a visible light communication signal for each of a method using sub-frames and a method using PWM has been described thus far, hereinafter, a method for transmitting more signals or raising the accuracy of transmission shall be described.

FIG. 11 is a schematic diagram of an example of signal transmission according to this embodiment.

In the case of displaying video using DMDs corresponding to each of the three primary colors RGB, the same visible light communication signal may be superimposed on the videos of all colors, or the visible light communication signal may be superimposed only on video of one color. Furthermore, a different visible light communication signal may be superimposed for each color. In the case of capturing an image using an image sensor and performing decoding, since color separation is also possible, the visible light communication signal can also be changed for each color.

FIG. 12 is a schematic diagram of an example of signal transmission according to this embodiment. In the case of displaying video using DMDs corresponding to each of the three primary colors RGB, a single continuous visible light communication signal (one block) may be continuously superimposed in the light emission of the respective colors when the light emission periods of the respective colors are different and consecutive as in (a). Specifically, a single continuous visible light communication signal can be displayed divided among the respective colors, by obtaining the product (obtaining the AND) of a single coded visible light communication signal and the light emission waveform of each color. Furthermore, it is also possible to perform the operation in (a) after changing the light emission periods in such a way that they become consecutive so that a visible light communication signal can be transmitted continuously for the respective colors as illustrated in (b).

FIG. 13 is a schematic diagram of an example of signal transmission according to this embodiment. Description shall be carried out for a method of adapting the method described in FIG. 12 in the case of performing tone level control according to a method using sub-frames. In the case of tone level control using sub-frames, there are many instances where the order of the respective weighted sub-frames is determined in advance, and the sub-frame configurations for the respective primary colors match. This is because, in a plasma display panel (PDP), EL panel, or the like, it is necessary that light-on be performed after the drive pattern is input to memory while scanning two-dimensional data. Therefore, the scanning timings must be made to match. Furthermore, in the case of using DMDs or MEMS and using a device capable of driving for the respective colors in parallel, the sub-frame configuration of the respective colors can be controlled independently. Therefore, the sub-frame configurations may be controlled as illustrated in FIG. 14. Accordingly, by matching the light-on start timings and superimposing the same visible light communication signal in the light emission of the three colors, more reliable signal transmission can be realized.

FIG. 14 is a schematic diagram of an example of signal transmission according to this embodiment. In the case where adjacent pixels start light emission at different timings and the lengths of the light emission periods are also different, the light emission timings are changed so that light emission starts at the same time, or the light emission start timings are made to match by changing the sub-frame configurations, as described using FIG. 12 and FIG. 13. Next, for a pixel having a short light emission period, lengthening the light emission period is also possible. Since this process entails picture quality deterioration, it is acceptable for processing to be performed only on areas that are less noticeable when seen with the human eye. In other words, the process can be performed exclusively within a portion near the edge of an image or a portion with low degree of attention in a saliency map (a portion with low luminance, a portion with minimal edge, a portion with minimal motion). It should be noted that a saliency map is a map that numerically represents the visual prominence of each region in an image.

FIG. 15 is a schematic diagram of an example of signal transmission according to this embodiment. In the case of performing tone level control according to a method using sub-frames, there are cases where the light emitting timing is discreetly-separated even in 1 frame. As described earlier, in the case of a device using DMDs or MEMS, the order of sub-frames can be freely changed in the respective colors, and thus the light emitting sub-frames can be arranged to be as consecutive as possible. Aside from the respective colors, the order of the sub-frames can also be changed on a pixel basis when the respective primary colors are driven independently. Therefore, as illustrated in FIG. 15, by joining together separated sub-frames, that is, by changing the light emission timings so that the sub-frames emit light consecutively, the method can be adapted even in the case where the signal amount of the visible light communication signal is large.

Figure 16:
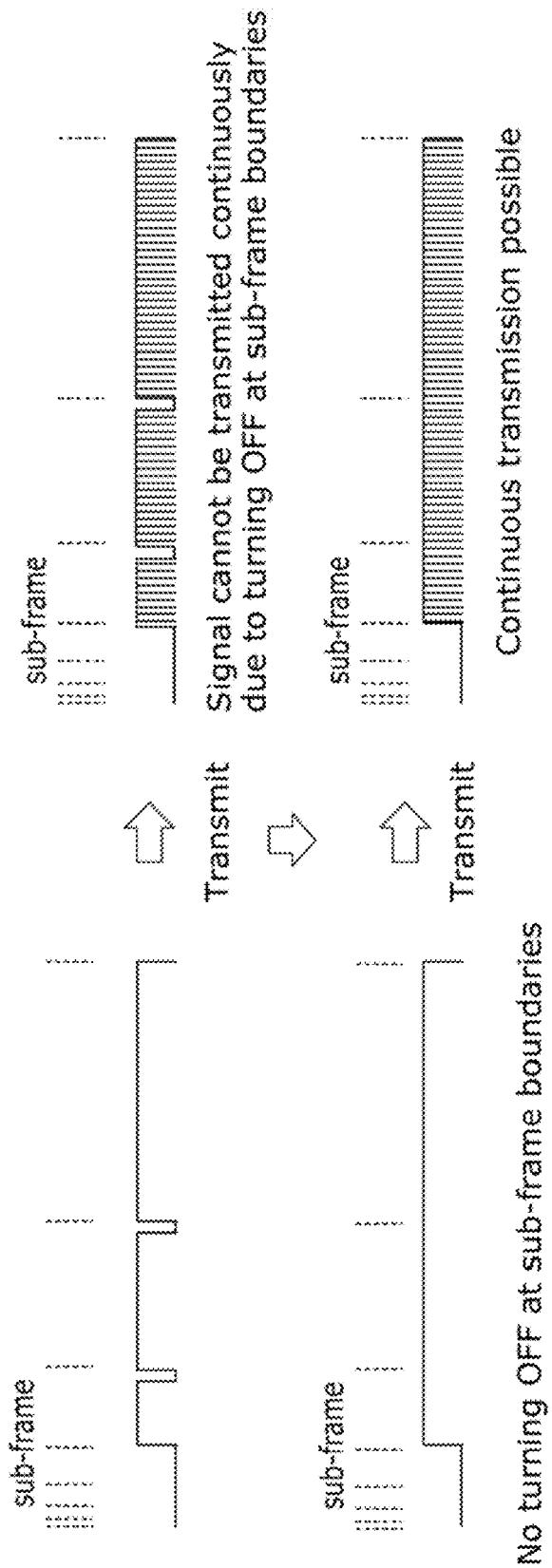
FIG. 16 is a schematic diagram of an example of signal transmission according to Embodiment 2.

FIG. 16 is a schematic diagram of an example of signal transmission according to this embodiment. In the case of performing tone level control according to a method using sub-frames, there are cases where there are portions, in the connecting portions of consecutive sub-frames, in which light is not emitted (OFF), when the light emission timings are made consecutive using the method described in FIG. 15 or when the light emission timings of sub-frames are consecutive by chance. As described earlier, in the case of a device using DMDs or MEMS, the order of sub-frames can be freely changed in the respective colors, and thus, by arranging the light emitting sub-frames to be as consecutive as possible, the non light emitting portions can be eliminated. Aside from the respective colors, the order of the sub-frames may be changed on a pixel basis, and the respective primary colors may be independently driven.

FIG. 17 is a schematic diagram of an example of signal transmission according to this embodiment. As described earlier, in the case of performing tone level control according to a method using sub-frames, when a visible light communication signal is superimposed, the light emission period is reduced by as much as the portion corresponding to the duty ratio of the visible light communication signal, and this reduction requires correction. As a method of correction, aside from a method of extending the light emission time of a sub-frame as illustrated in (b) in FIG. 17, there is a method of causing light-on in another sub-frame equivalent to the reduced period, that is, (1−duty ratio)×the sub-frame period as illustrated in (c) in FIG. 17.

Figure 18:
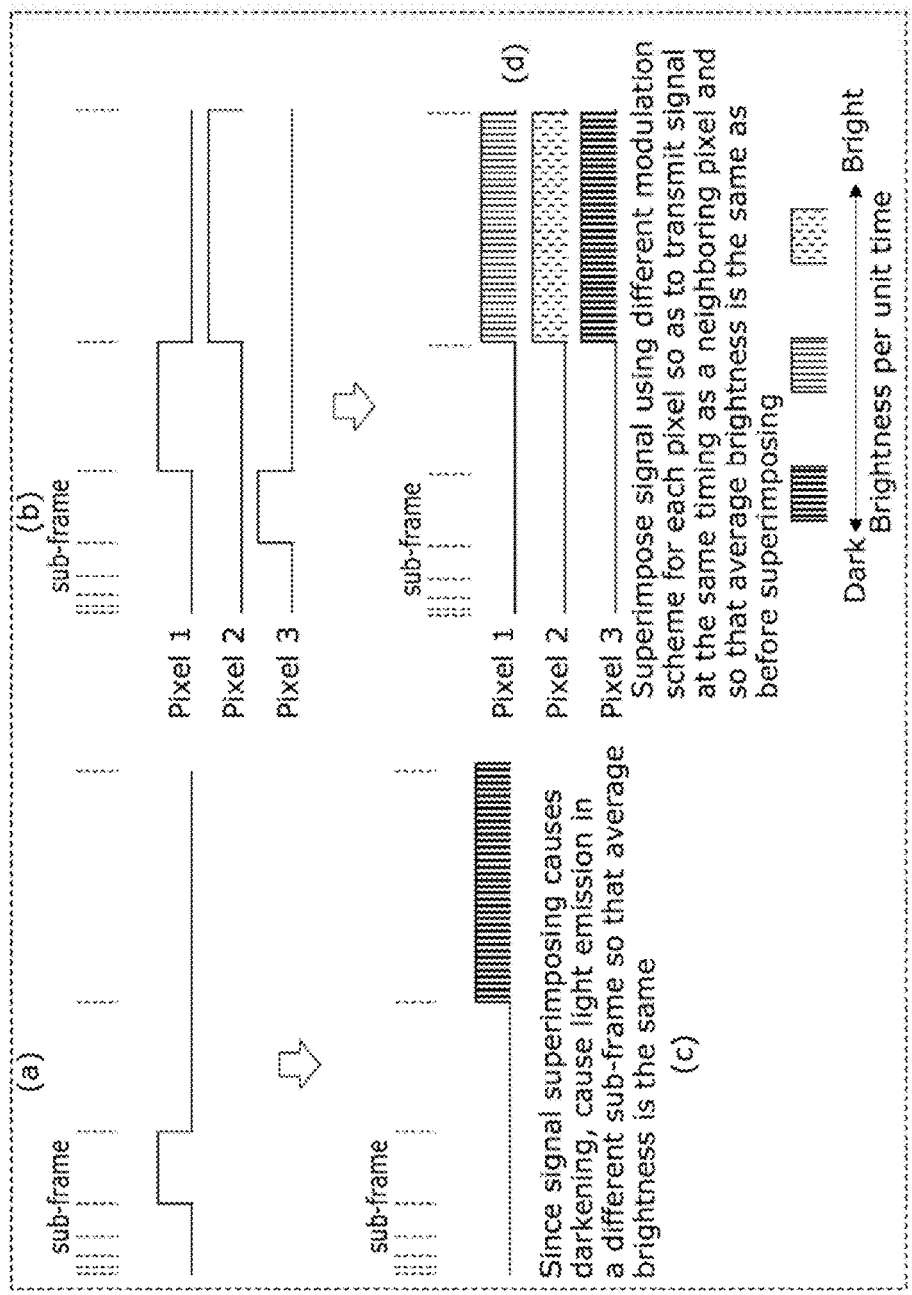
FIG. 18 is a schematic diagram of an example of signal transmission according to Embodiment 2.

FIG. 18 is a schematic diagram of an example of signal transmission according to this embodiment. It should be noted that FIG. 18 supplements the description made using FIG. 17. Although the light emission was caused in a sub-frame for displaying video in the description for FIG. 17, it is acceptable to cause light emission in another sub-frame as illustrated in (c) in FIG. 18. Specifically, in the case where light emission is performed in a sub-frame for displaying video and the case where a visible light communication signal is superimposed in another sub-frame, the aforementioned other sub-frame is specified so that the same light emission period is secured and the average brightness is the same. In addition, in place of the sub-frame for displaying the video, light emission shall be performed in this specified other sub-frame. Furthermore, as illustrated in (b) and (d) in FIG. 18, the visible light communication signal may be superimposed using different modulation schemes among the respective pixels so that the visible light communication signal is transmitted at the same timing with a nearby pixel and the average brightness is equal to that prior to the superimposing of the visible light communication signal. With this, the tone level characteristics of the video can be maintained before and after superimposing the visible light communication signal.

FIG. 19 is a schematic diagram of an example of signal transmission according to this embodiment.

As illustrated in (a) in FIG. 19, that is, as described earlier, lengths of the light emission period representing a certain tone level and the 1 block period of the visible light communication signal are compared, and the transmission of the visible light communication signal is stopped in a light emission period representing a tone level that is shorter than 1 block period. Furthermore, as illustrated in (b) in FIG. 19, when the light emission period is greater than or equal to twice the 1 block period of the visible light communication signal, the visible light communication signal may be transmitted repeatedly for a maximum integral number of times that does not exceed the light emission period. Furthermore, as illustrated in (c) in FIG. 19, correction for the portion by which light emission is shortened due to the superimposing of the visible light communication signal may be performed. In other words, when the ratio of the respective brightness of tone level 1, tone level 2, and tone level 3 is 1:2:3, the ratio of the respective lengths (periods) of tone level 1, tone level 2, and tone level 3 is also 1:2:3. However, when the visible light communication signal is to be superimposed only for tone level 3 for example, the brightness of tone level 3 is reduced by as much as the superimposing of the visible light communication signal. In view of this, the time of tone level 3 for which the visible light communication signal is superimposed is corrected (adjusted) to be lengthened so that the original brightness ratio for tone level 3 is maintained even when the visible light communication signal is superimposed.

As described above, the display method according to this embodiment has been described for the case where DMDs or MEMS are independently provided for each of the three primary colors (the case of the so-called 3-chip type). However, the display method according to this embodiment can also be applied to a case where there is one DMD, or the like, and color separation is implemented by time-division. In other words, when there is one DMD, or the like, and color separation is performed by time-division, the display method according to this embodiment can be applied in the case where image is represented using sub-frames and in the case where video is represented using PWM.

(Visible Light Communication Method and Device Using Blinking in a Single-Chip DMD Projector)

Here, description is carried out for an example of the application of the display method according to this embodiment in the case where there is a single DMD, or the like, and color separation is implemented using time-division (the case of the so-called single-chip type or 1-chip type).

Figure 20:
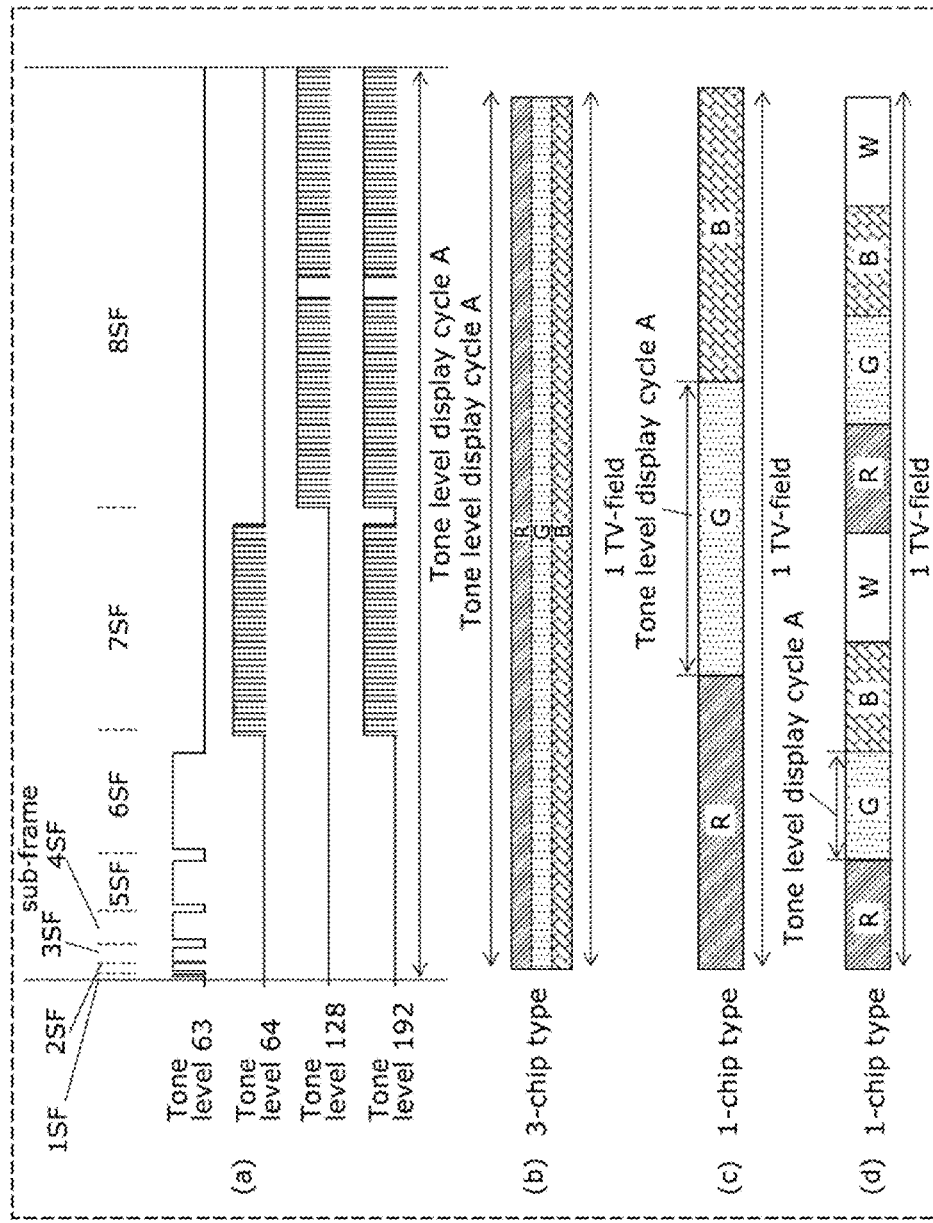
FIG. 20 is a schematic diagram of an example of signal transmission according to Embodiment 2.

FIG. 20 is diagram illustrating an example of an application of the display method according to this embodiment. Hereinafter, an example for the case of the 1-chip type shall be described in comparison with the case of the 3-chip type, using FIG. 20.

In FIG. 20, (b) is a schematic diagram for the display method in the case of controlling on a per color basis for the three primary colors RGB using the 3-chip type, that is, three DMDs, described up to this point. In FIG. 20, a unit displayed as a tone level display cycle A of each color indicates the period in which the hitherto described series of operations for tone level display is performed, and corresponds to a tone level display cycle A in (a) of FIG. 20. It should be noted that (a) in FIG. 20 corresponds to FIG. 10.

In FIG. 20, (c) is a schematic diagram for the display method for a single-chip device. In the 3-chip type illustrated in (b) in FIG. 20, each of the three primary colors RGB are controlled in parallel, whereas, in the single-chip type, each of RGB is controlled by simply performing time-division as illustrated in (c) in FIG. 20. In FIG. 20, (d) is another schematic diagram for the display method for a single-chip device. Here, (d) in FIG. 20 illustrates an example in which the single-chip type, and more specifically, time-division is performed. This example illustrates an example in which the colors of the three primary colors RGB and W (white: light obtained by combining RGB) are displayed each being repeated twice in 1 frame. In the case of simple color separation, in order to avoid the phenomenon in which an undisplayed image or color is falsely seen due to the movement of the viewer's line of sight, 1 frame is shown by being divided as finely as possible as shown in (d) in FIG. 20. Furthermore, in raising the luminance, a segment for W is provided because providing a period in which all of RGB is outputted allows for higher luminance than when the entire 1 frame is segmented for RGB. It should be noted that since tone level representation is possible even without the W portion, the W portion is not an essential condition. Furthermore, aside from that, colors other than the three primary colors RGB, for example, complementary colors to the primary colors, such as yellow, magenta, or cyan may be used.

Description shall be carried out for the case where tone level representation is performed in the state in (c) in FIG. 20. The color in each of the units obtained from time-division indicates the color of the light source incident on the DMD. It should be noted that the color of the light incident on the DMD is sequentially changed according to, for example, the light-on and non light-on of respective light sources having various light chromaticity. Furthermore, by causing the light from a single light source to enter the DMD through a color filter and synchronizing the color changing of the color filter with the DMD control, the color of the light incident on the DMD is sequentially changed. With regard to the tone level representation of respective colors, the period of the tone level representation cycle A in FIG. 20 is divided into weighted sub-frames as shown in (a) in FIG. 20, and the tone level displayed in that period is quantized. In addition, light-on or non light-on is determined for each of the sub-frames, and a signal indicating a determination result is transmitted to the DMD. In addition, video is displayed by performing, on a per pixel basis, control of (i) a sub-frame corresponding to a non light-on in which light is transmitted to the damper side so that the light is not outputted and (ii) a sub-frame corresponding to a light-on in which light is transmitted to an output lens system and emitted from the display device as light output.

In the case where only the respective frames for RGB are present, the tone level for each of the colors RGB is quantized and distributed to the respective sub-frames. In the case where a color such as W is present, for example, in the case of (c) in FIG. 20 in which W is present, the tone level which allows common light emission for RGB is the tone level having the smallest values for RGB. The information generated by quantizing such tone level as the tone level of W may be allocated to the respective sub-frames in the W slot, the difference between the tone level of each of RGB and the tone level allotted to W may be quantized, and the result may be allotted to the sub-frames of each color. Of course, the balance between W and RGB may be changed in order to reduce the false change in the image when viewed by a person. An example thereof shall be described briefly using FIG. 21.

Figure 21:
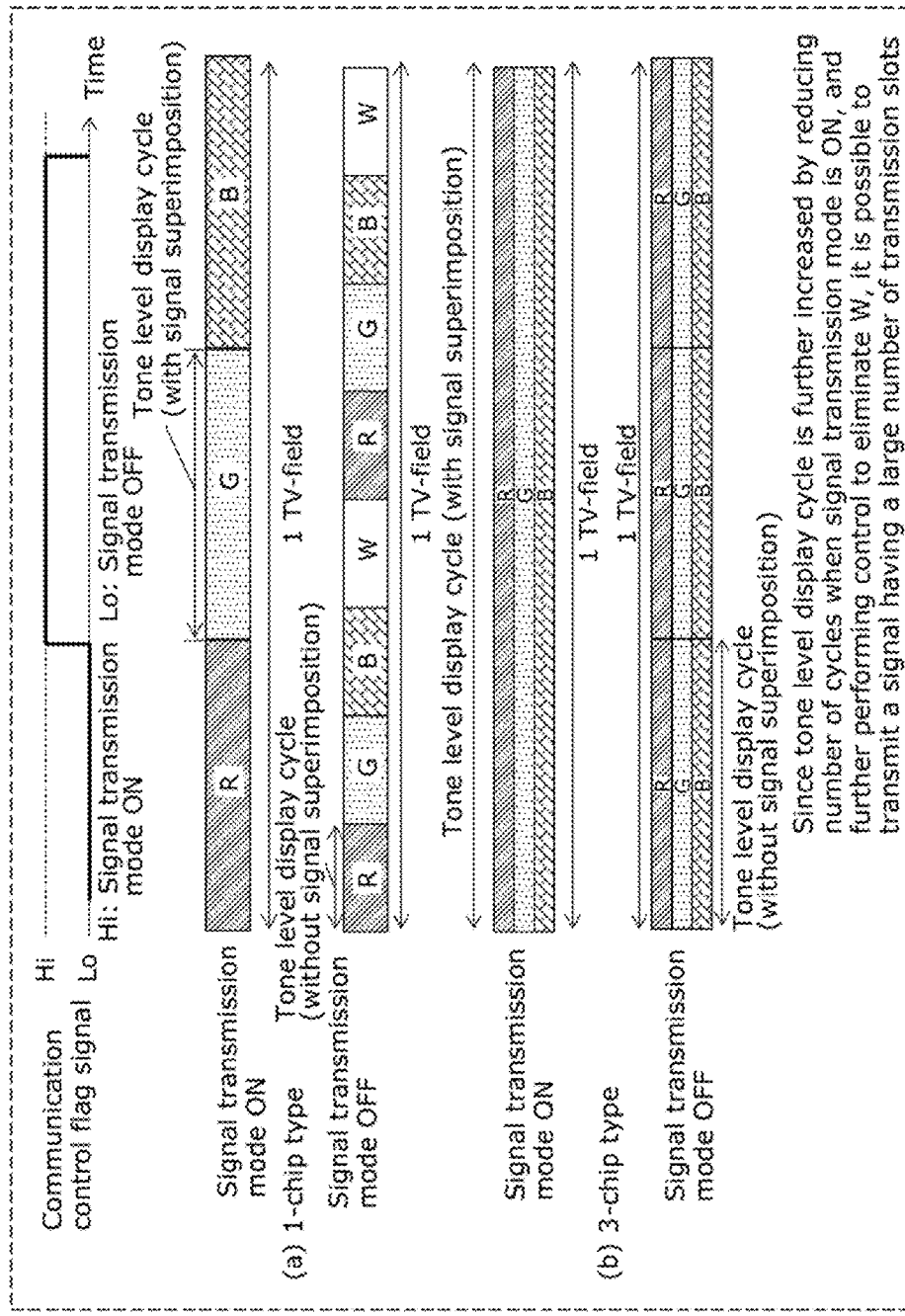
FIG. 21 is a schematic diagram illustrating a method of adaptively switching signal transmission modes during transmission of a visible light communication signal using an element such as a single-panel DMD or the like, according to Embodiment 2.

FIG. 21 is a schematic diagram illustrating a method of adaptively switching signal transmission modes during transmission of a visible light communication signal using an element such as a single-chip DMD. In a display device using normal DMDs or MEMS, instead of just simply performing time-division on 1 frame on a per color basis as described earlier, a single unit of time obtained from the time-division of 1 frame is further divided and arranged in the 1 frame, and a color other than the primary colors, such as white, is also used, so that the same color does not appear consecutively in the 1 frame. With this, it is possible to prevent the occurrence of false patterns caused by the movement of the viewer's line of sight, and so on. However, by performing such measures, the period of the respective tone level representation cycles A is further shortened, and length of the visible light communication signal that can be transmitted becomes limited. In other words, when performing visible light communication, there is a tradeoff between picture quality and the amount of signal transmission for visible light communication. In such a case, it is possible to secure, in the input, or the like, to the display device, a signal region corresponding to a flag for transmitting a visible light communication signal, secure at least a certain signal period using only a simple color separation time-division only in a period in which the flag is raised, and secure an amount of signal that can be transmitted. Although the same response can be adopted even with the 3-chip type, since picture quality deterioration accompanying line of sight movement appears more noticeably in the single-chip type, the above method is considered to be more effective with the single-chip type.

Description shall be carried out for a method of adapting visible light communication in a display device using a single-chip DMD, or the like, which performs tone level representation as those described above. Here, since the same processing is performed in the respective tone level display cycles A, the visible light communication signal can be transmitted following the same concept. However, when one television frame is further color separated and this is further divided as in the tone level display cycle A for displaying, the time is very short in each segment, and the time for which the visible light communication signal can be transmitted continuously becomes short. Therefore, since there are also methods which can and cannot be adapted, or are difficult to adapt among the methods described from FIG. 11 to FIG. 19, a brief description shall be carried out.

Since the methods described using FIG. 11 and FIG. 12 cannot be adapted here, description shall be omitted.

When adapting the method described using FIG. 13 and FIG. 14, it is not possible to have a form in which the RGB cells of a PDP or EL panel are divided. In the case of using DMDs or MEMS, simple adaptation is possible since synchronization with other elements need not be considered, and more reliable signal transmission can be realized by outputting the same signal across a certain pixel range. Here, the range to be adapted is only for a single color, and the impact on the image is less compared to the case of the 3-chip type.

In the case of adapting the methods described using FIG. 15 and FIG. 16, it is also absolutely unnecessary to consider the synchronization with other color components. Therefore, whether or not transmission is possible may be determined by adaptively changing the order of sub-frames, bringing together the sub-frames for light emission, and comparing the total period thereof and the signal length. Furthermore, for example, for respective light emission sub-frames of consecutive color periods, the light emission sub-frames are gathered towards the back in the preceding period, and the light emission sub-frames are gathered towards the front in the subsequent period. In this manner, by performing control so that the respective sub-frames of plural periods are also consecutive, the method can also be adapted to a relatively long signal length.

In the case of adapting the methods described using FIG. 17 to FIG. 19, although description shall be omitted since there is absolutely no difference when the tone level display cycle A is adopted as a reference in the method for the single-chip type and the method for the 3-chip type, the methods can be adapted in absolutely the same manner.

As described above, forms of a method of transmitting a visible light communication signal and a device thereof, which can be adapted even in the case of the single-chip type have been described.

Embodiment 3

The following describes Embodiment 3.
(Observation of Luminance of Light Emitting Unit)

Figure 22:
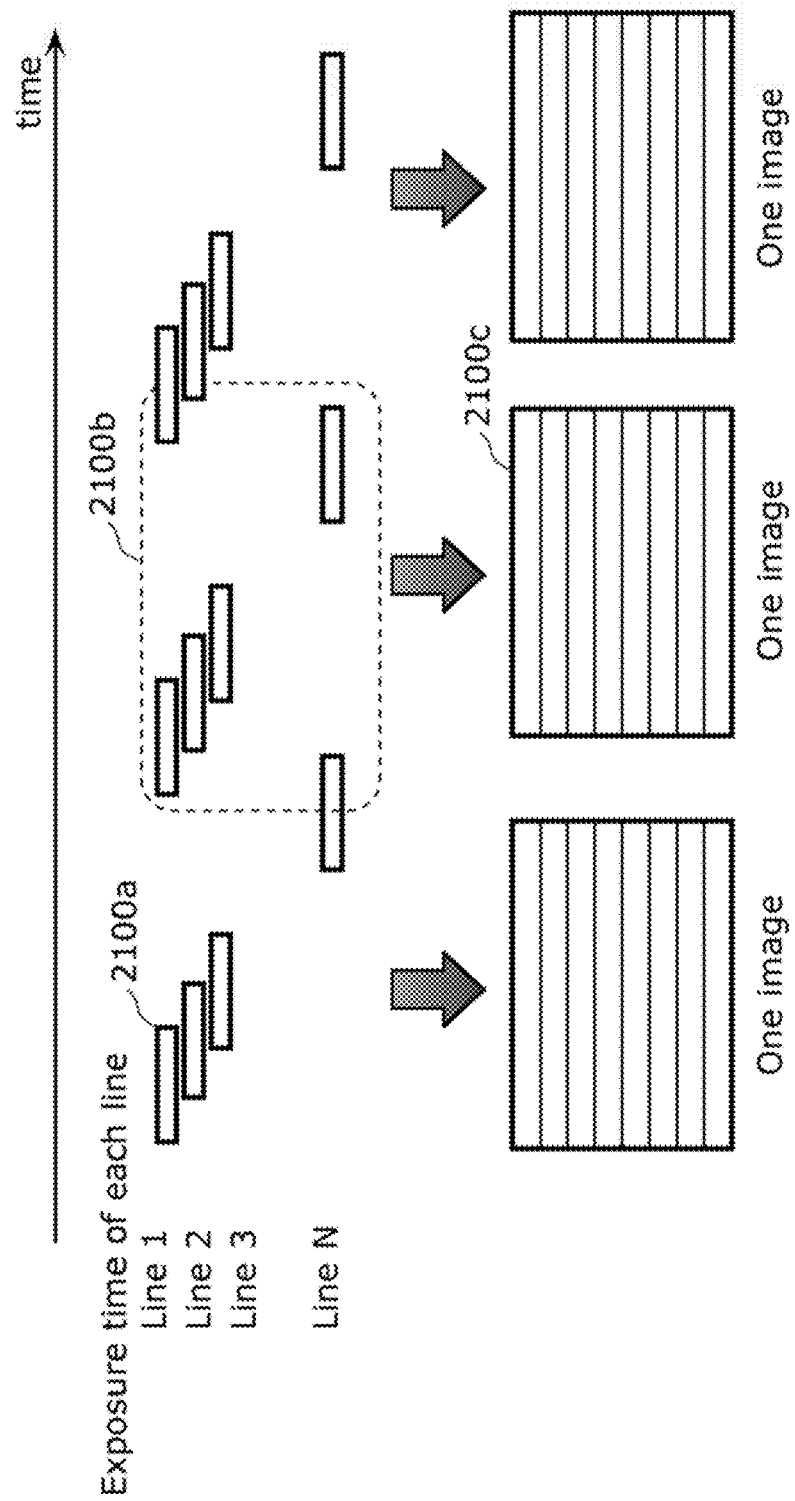
FIG. 22 is a diagram illustrating an example of a method of observing luminance of a light emitting unit in Embodiment 2.

The following proposes an imaging method in which, when capturing one image, all imaging elements are not exposed simultaneously but the times of starting and ending the exposure differ between the imaging elements. FIG. 22 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

In the case of capturing a blinking light source shown on the entire imaging elements using this imaging method, bright lines (lines of brightness in pixel value) along exposure lines appear in the captured image as illustrated in FIG.

23. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1 millisecond. In the case where the number of exposure lines whose exposure times do not overlap each other is 1000, it is possible to recognize a luminance change in a period of $\frac{1}{30000}$ second (about 33 microseconds). Note that the exposure time is set to less than 10 milliseconds, for example.

Figure 23:
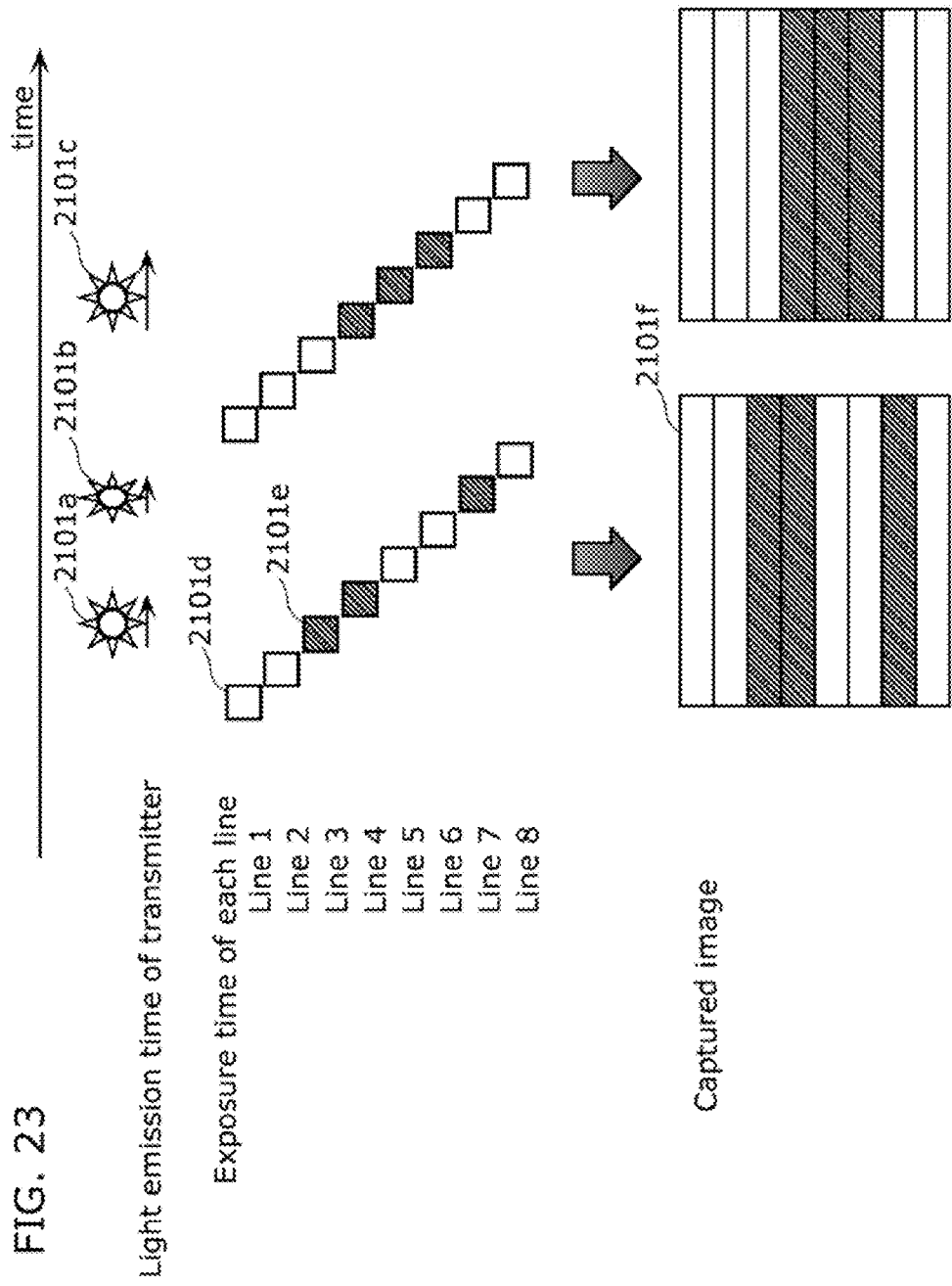
FIG. 23 is a diagram illustrating an example of a method of observing luminance of a light emitting unit in Embodiment 2.

FIG. 23 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 24:
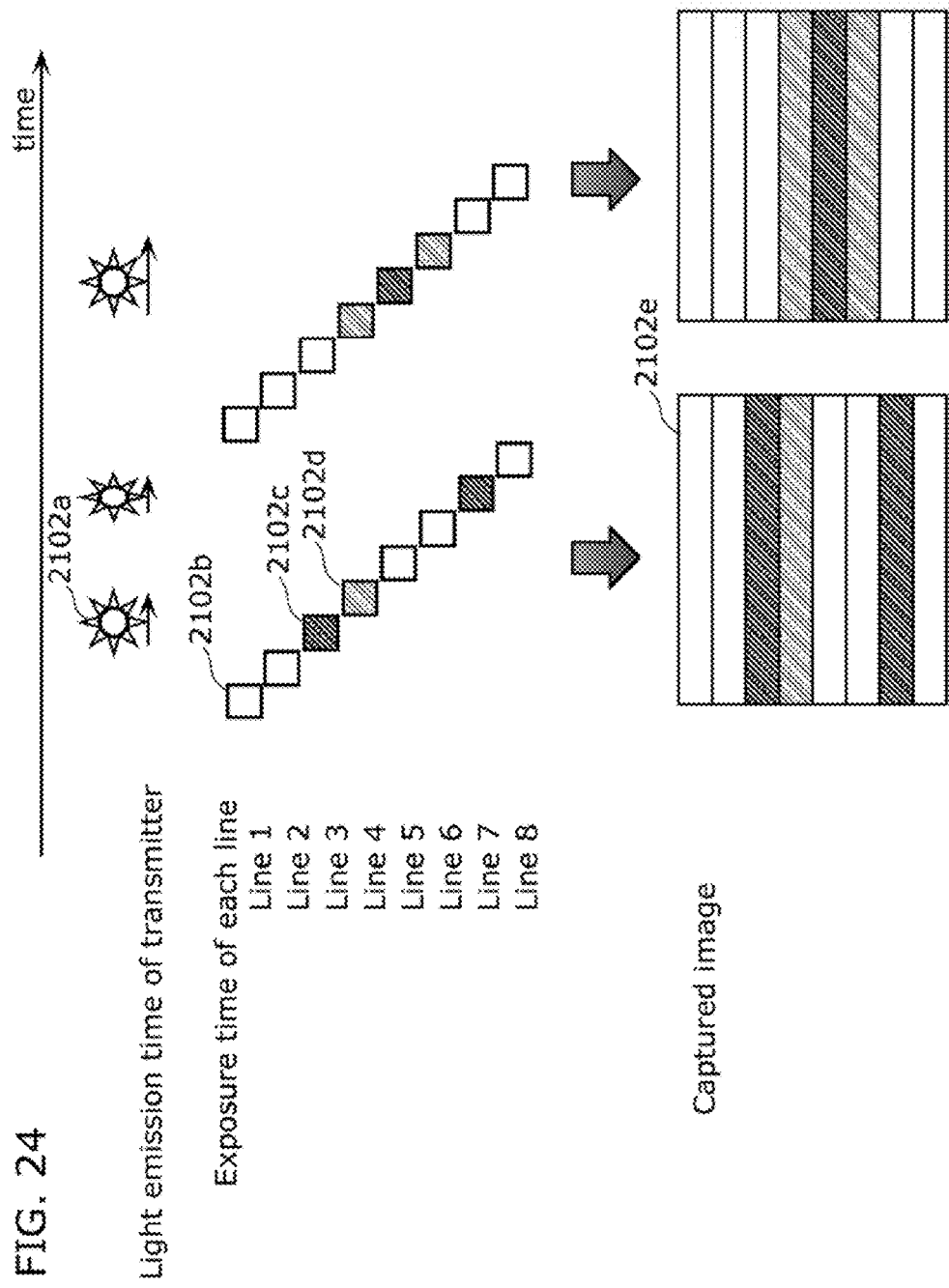
FIG. 24 is a diagram illustrating an example of a method of observing luminance of a light emitting unit in Embodiment 2.

If the exposure state of each exposure line caused by the light emission of the light emitting unit is recognizable in a plurality of levels as illustrated in FIG. 24, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

FIG. 25A illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

FIG. 25B illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 25C:
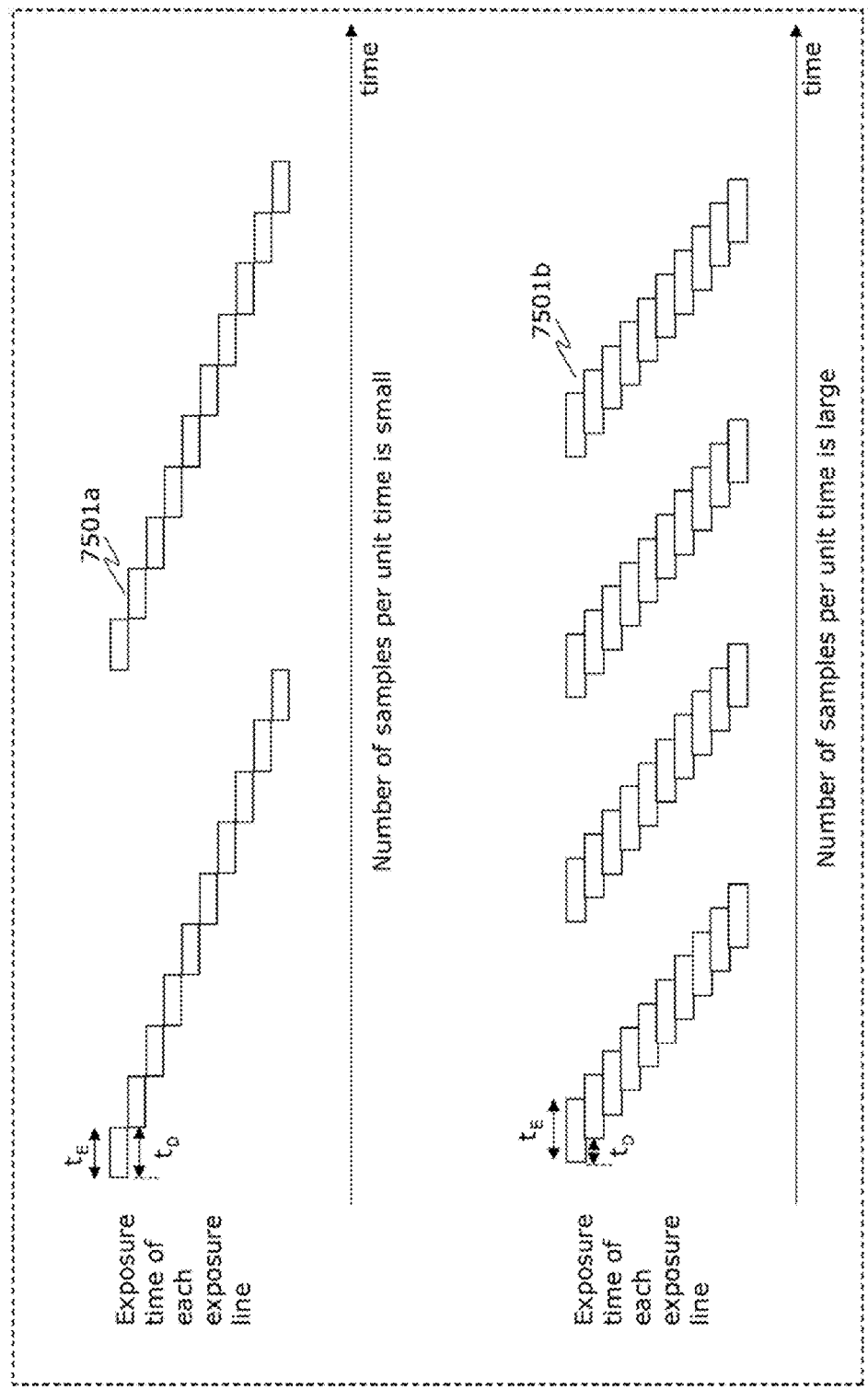
FIG. 25C is a diagram illustrating an example of a method of observing luminance of a light emitting unit in Embodiment 2.

FIG. 25C illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 25B and 25C, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to $\frac{1}{480}$ second enables an appropriate bright line pattern to be generated. Here, it is necessary to set (exposure time)<$\frac{1}{8}$×f, where f is the frame frequency. Blanking during imaging is half of one frame at the maximum. That is, the blanking time is less than or equal to half of the imaging time. The actual imaging time is therefore $\frac{1}{2}$f at the shortest. Besides, since 4-value information needs to be received within the time of ½f, it is necessary to at least set the exposure time to less than 1/(2f×4). Given that the normal frame rate is less than or equal to 60 frames per second, by setting the exposure time to less than or equal to ¹⁄₄₈₀ second, an appropriate bright line pattern is generated in the image data and thus fast signal transmission is achieved.

Figure 25D:
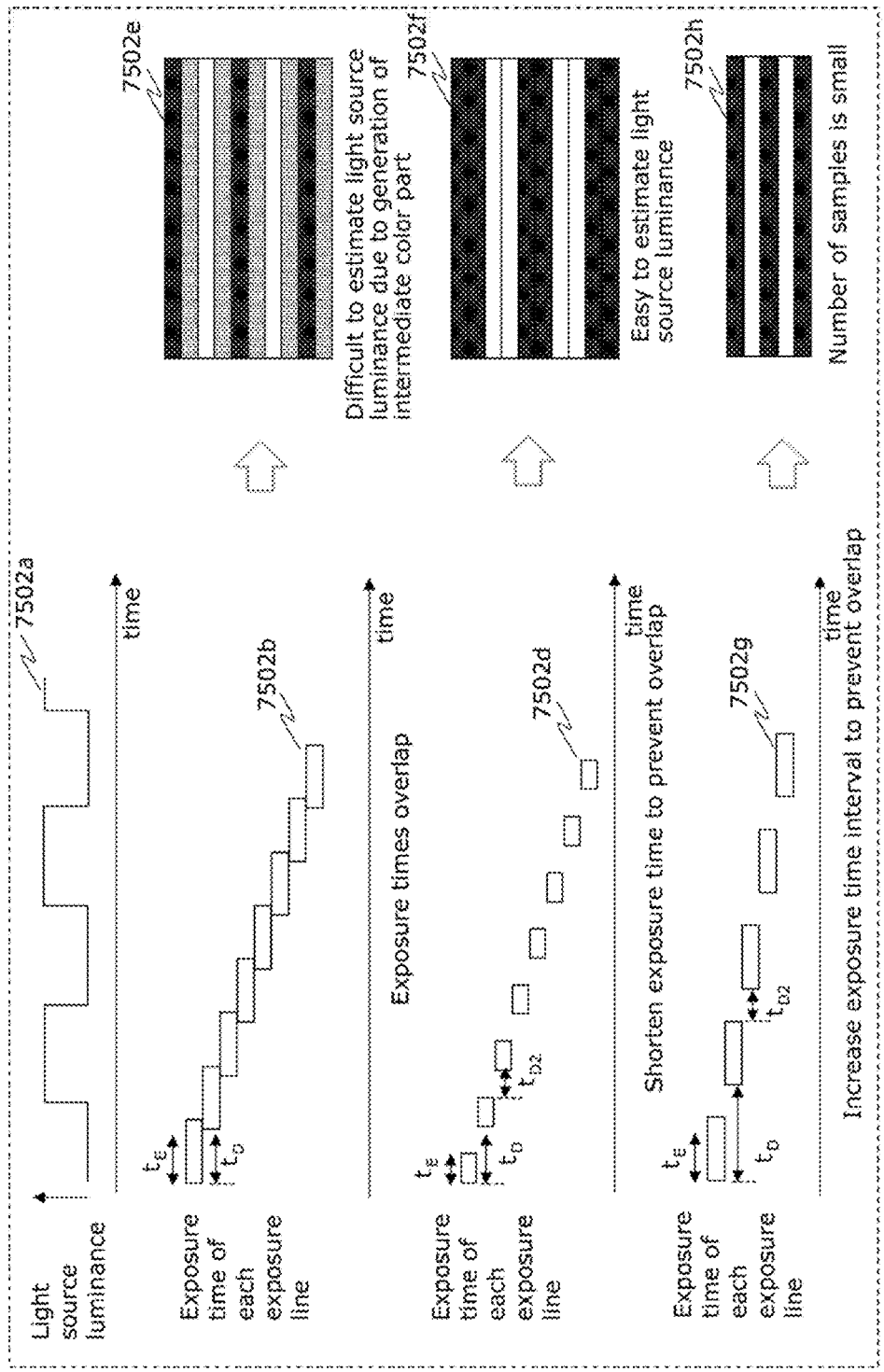
FIG. 25D is a diagram illustrating an example of a method of observing luminance of a light emitting unit in Embodiment 2.

FIG. 25D illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure vacant time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure vacant time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures.

FIG. 25E illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E>t_S$, a bright line pattern different from the luminance change of the light source might be obtained, making it difficult to recognize the luminance change of the light source from the captured image.

FIG. 25F illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

FIG. 25G illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 25H:
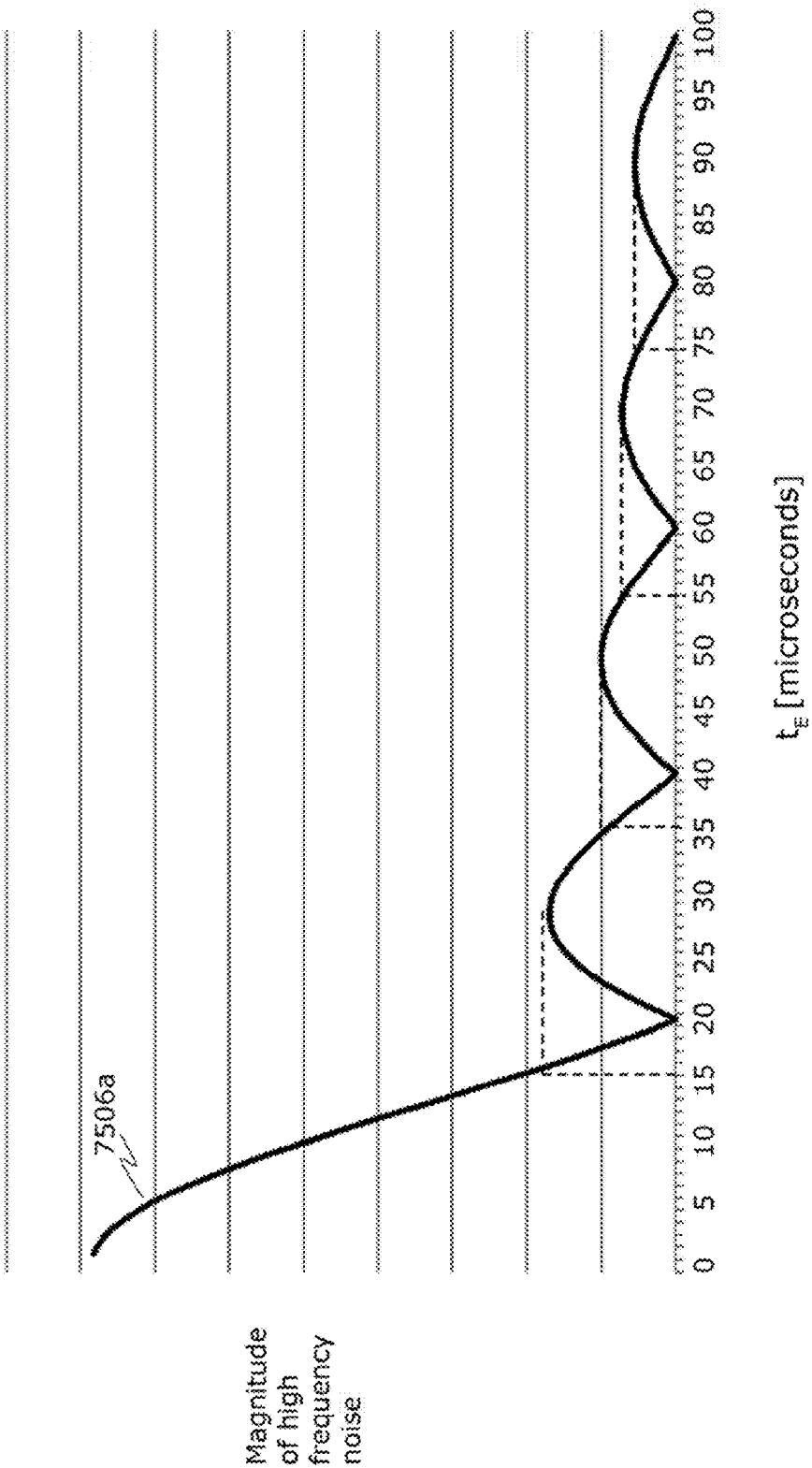
FIG. 25H is a diagram illustrating an example of a method of observing luminance of a light emitting unit in Embodiment 2.

FIG. 25H is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

FIG. 25I illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507*c*, it increases again at 7507*d*, 7507*e*, and 7507*f*. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 26.

Figure 27:
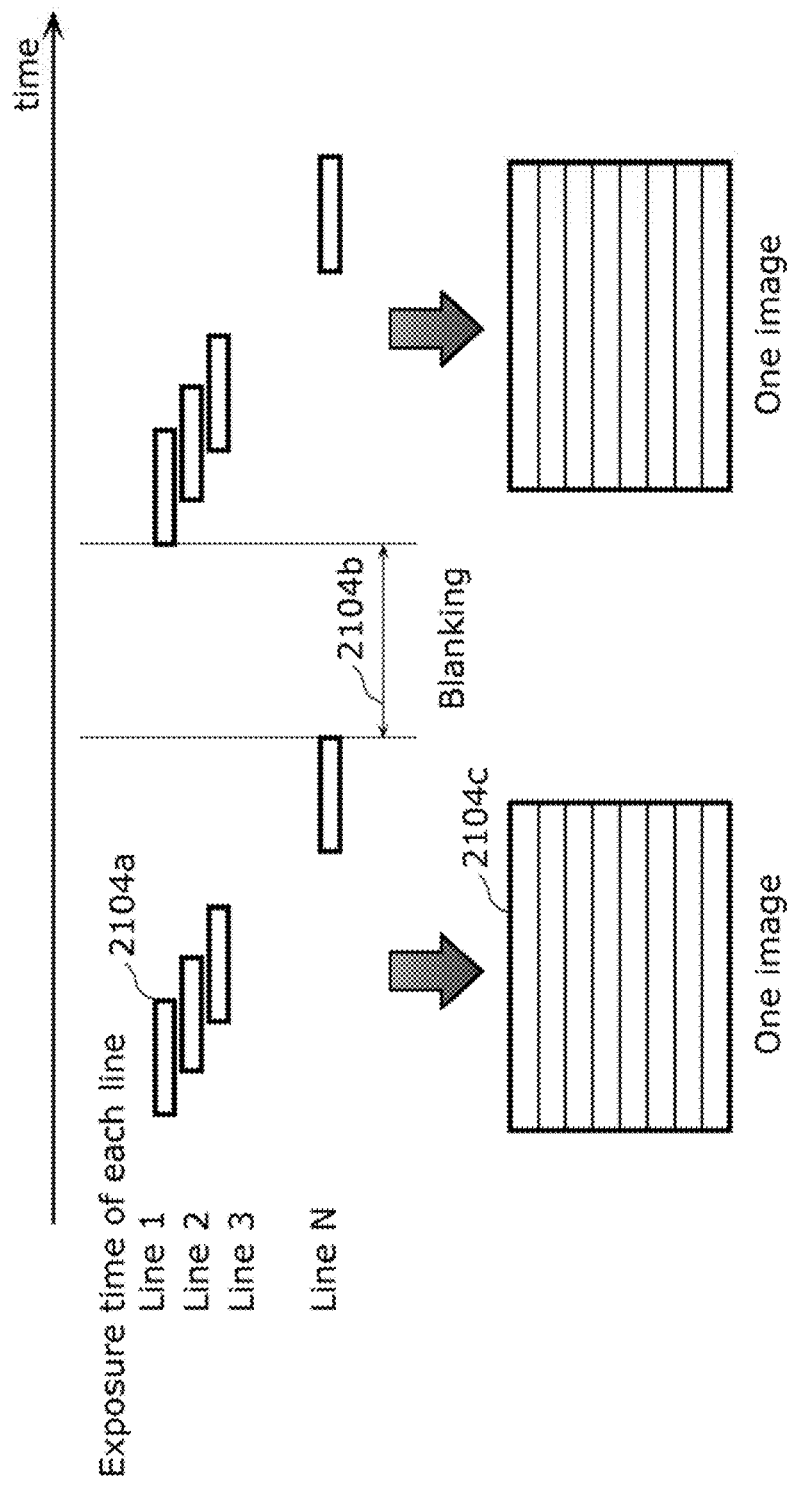
FIG. 27 is a diagram illustrating an example of a method of observing luminance of a light emitting unit in Embodiment 2.

Depending on imaging devices, there is a time (blanking) during which no exposure is performed, as illustrated in FIG. 27.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 4

Figure 28:
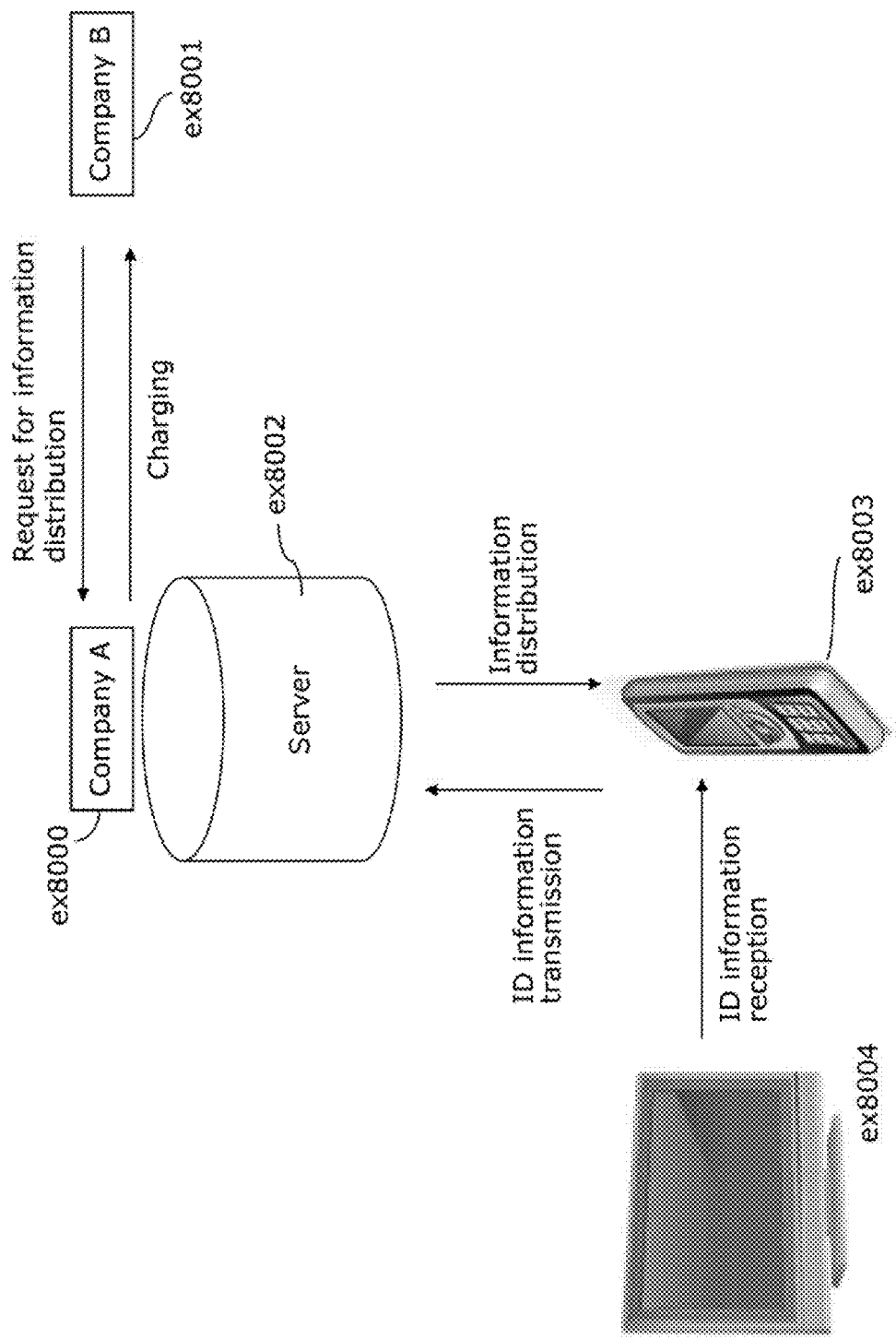
FIG. 28 is a diagram illustrating a service provision system using a display method and a reception method described in the foregoing embodiments.

FIG. 28 is a diagram illustrating a service provision system using the display method and reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 29:
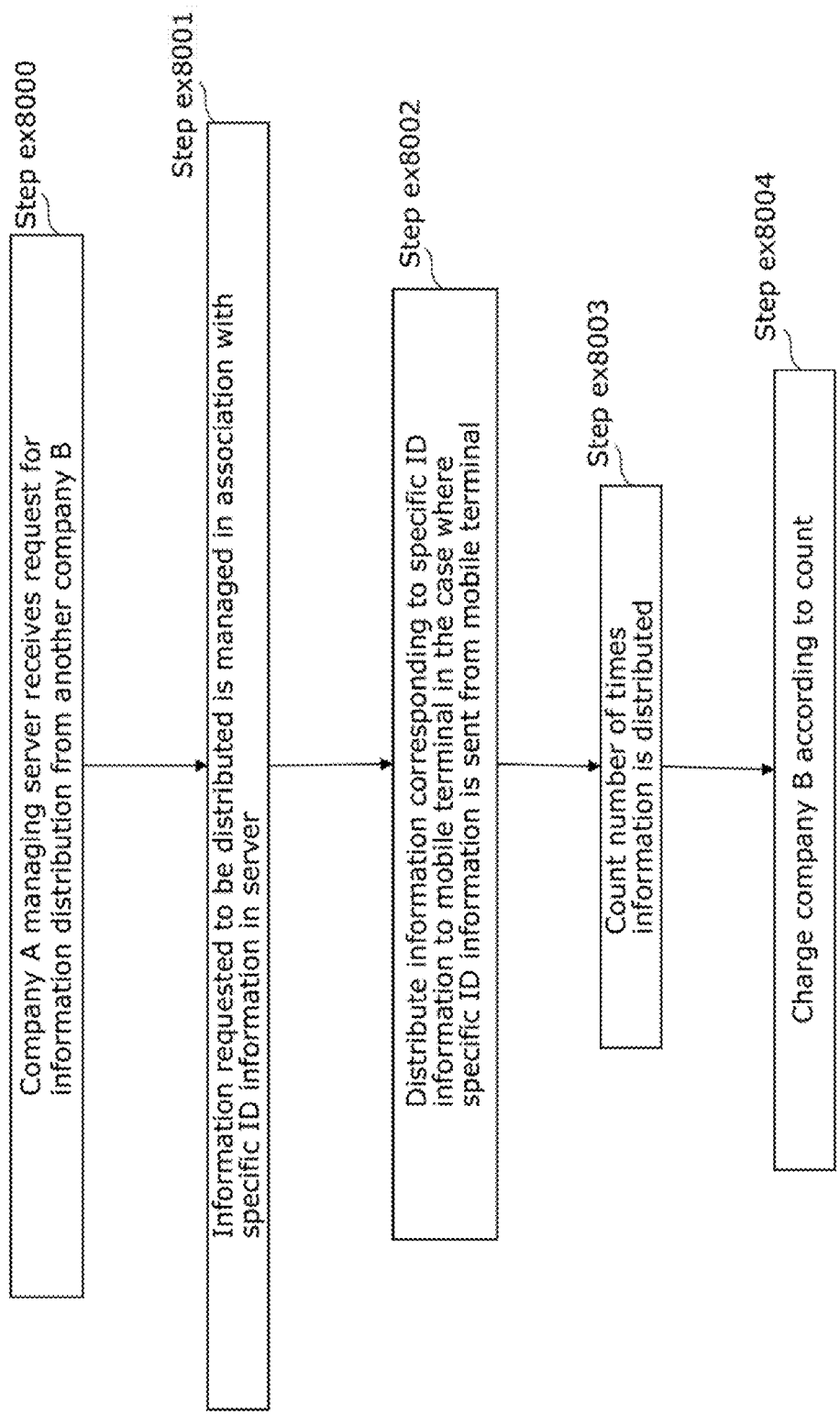
FIG. 29 is a flowchart illustrating flow of service provision.

FIG. 29 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 30:
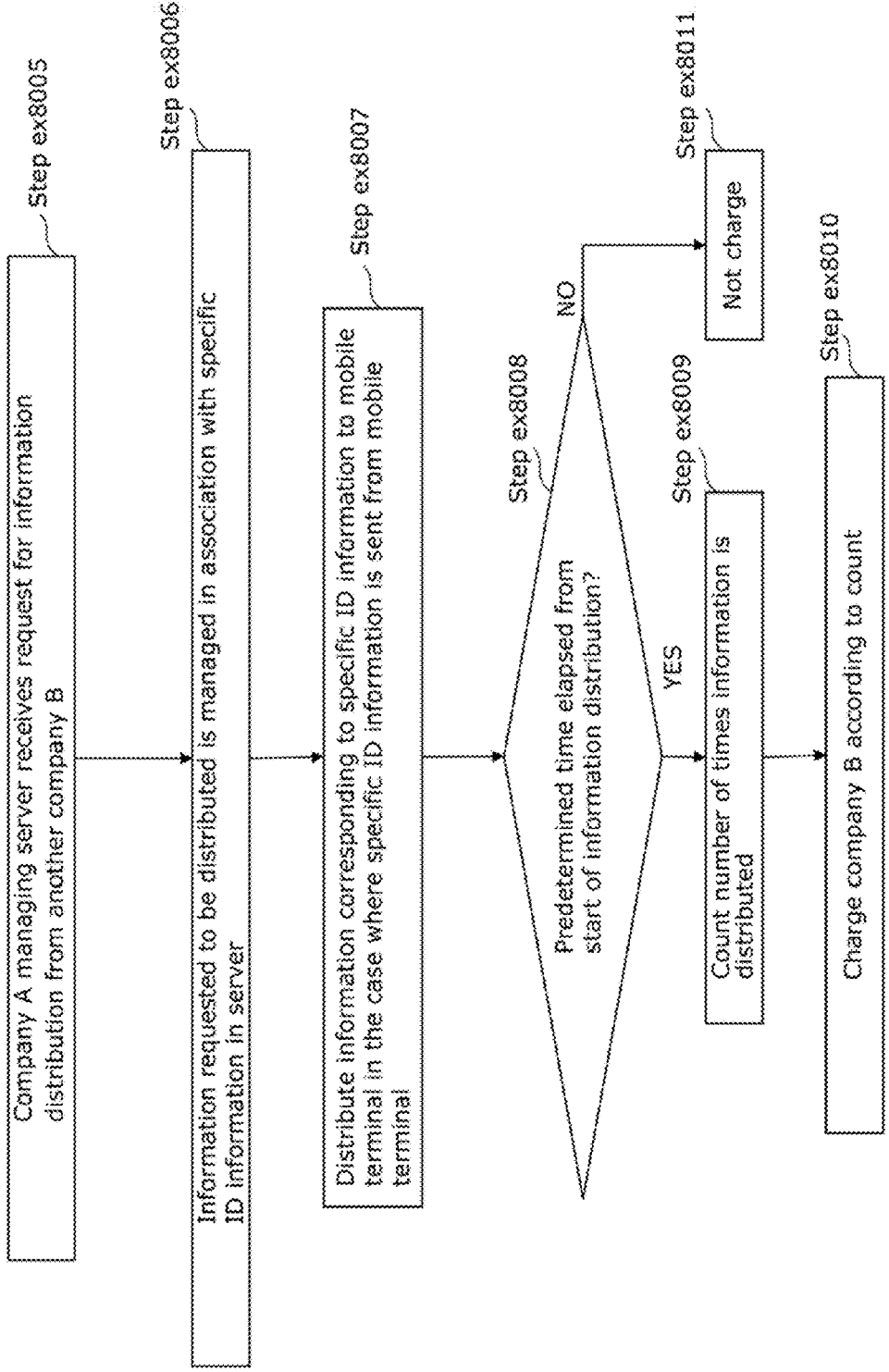
FIG. 30 is a flowchart illustrating service provision in another example.

FIG. 30 illustrates the flow of service provision in another example. The description of the same steps as those in FIG. 29 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 31:
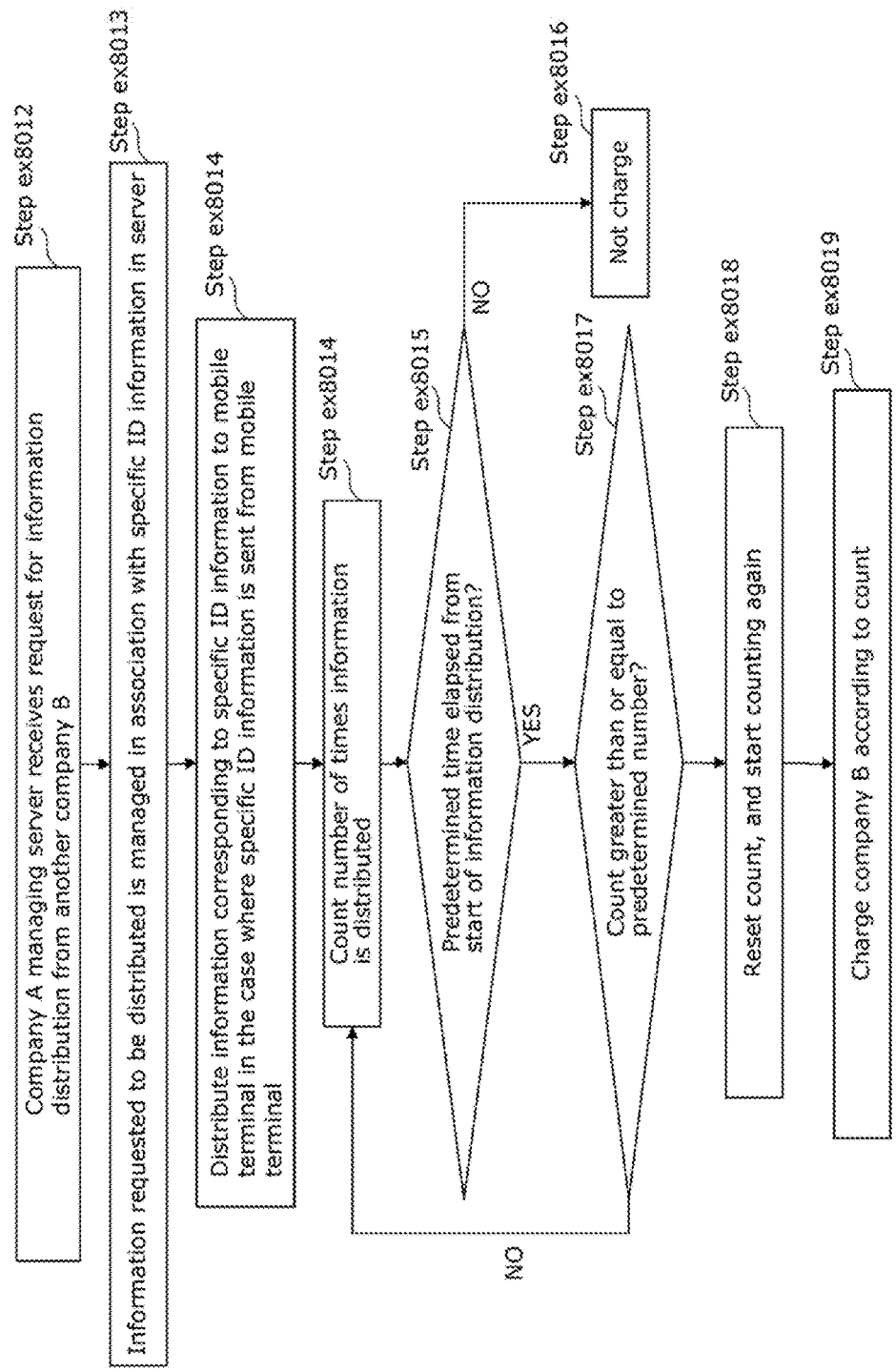
FIG. 31 is a flowchart illustrating service provision in another example.

FIG. 31 illustrates the flow of service provision in another example. The description of the same steps as those in FIG. 30 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

As described above, an embodiment perceived by the Applicant as the best mode and other embodiments are provided using drawings and detailed descriptions. These are provided to exemplify the subject matter recited in the Claims to a person of ordinary skill in the art by referring to a particular embodiment. Therefore, the constituent elements in the enclosed drawings and detailed description may include, not only constituent elements essential to solving the problem, but also other constituent elements as well. As such, although such non-essential constituent elements are included in the enclosed drawings or detailed descriptions, such non-essential constituent elements should not be construed as being essential. Therefore, various changes, substitutions, additions, omissions, and so on, can be performed on the above-described embodiments within the scope of the Claims or equivalents thereof.

Though the display method according to one or more aspects has been described by way of the embodiments, the present disclosure is not limited to these embodiments. Other embodiments realized by application of modifications conceivable by those skilled in the art to the embodiments and any combination of the structural elements in the embodiments are also included in the scope of one or more aspects without departing from the subject matter of the present disclosure.

A display method according to an aspect of the present disclosure is a display method for representing, when an image included in a video signal is displayed on a per frame basis, a tone level of luminance of the image by controlling a light emission period in a frame, the light emission period being a period in which light emission is performed, the display method including steps SL21 and SL22.

Specifically, the display method includes: a light emission period specifying step SL21 of specifying, as a specified light emission period, a light emission period in which light emission is performed for greater than or equal to a time required for transmitting a signal unit included in a visible light communication signal, out of one or more light emission periods in which light emission is performed for displaying the image included in the video signal; and a transmitting step SL22 of transmitting the signal unit included in the visible light communication signal by luminance changing in the specified light emission period.

Figure 32B:
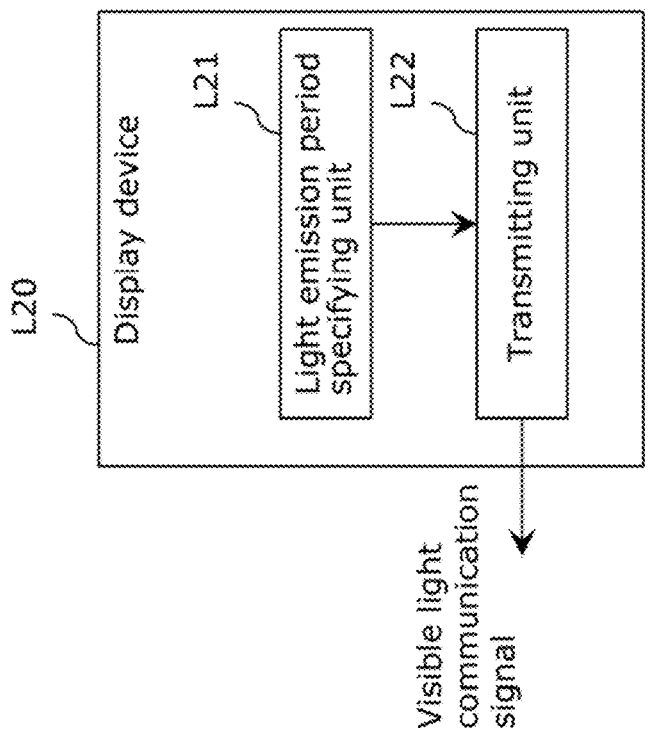
FIG. 32B is a block diagram of a display device according to an aspect of the present disclosure.

FIG. 32B is a block diagram of a display device according to an aspect of the present disclosure.

A display device L20 according to an aspect of the present disclosure is a display device which represents, when an image included in a video signal is displayed on a per frame basis, a tone level of luminance of the image by controlling a light emission period in a frame, the light emission period being a period in which light emission is performed, the display device including constituent elements L21 and L22.

Specifically, the display device L20 includes: a light emission period specifying unit L21 configured to specify, as a specified light emission period, a light emission period in which light emission is performed for greater than or equal to a time required for transmitting a signal unit included in a visible light communication signal, out of one or more light emission periods in which light emission is performed for displaying the image included in the video signal; and a transmitting unit L22 configured to transmit the signal unit included in the visible light communication signal by luminance changing in the specified light emission period. It should be noted that the light emission period specifying unit L21 is implemented through, for example, the light source control unit 4180 illustrated in FIG. 10, and the transmitting unit L22 is implemented through, for example, the light source control unit 4180 and the light source 4190.

Figure 32A:
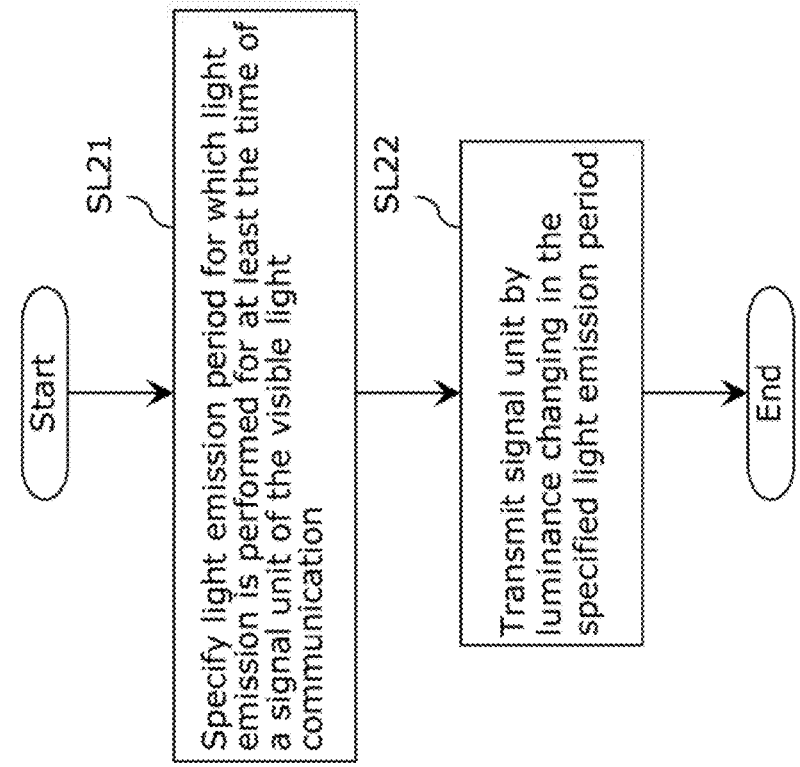
FIG. 32A is a flowchart of a display method according to an aspect of the present disclosure.

With such a display method and display device L20 illustrated in FIG. 32A and FIG. 32B, a specified light emission period longer than or equal to the time (period) required for the transmission of a signal unit (a block, for example) of the visible light communication signal is specified out of a light emission period which is several subframes for example, and the signal unit is superimposed on the image displayed in this specified light emission period. Therefore, the block is not divided and the signal included in such block can be transmitted continuously, and the probability of communication error can be reduced. In addition, even if luminance changing is performed in the specified light emission period for transmitting the signal unit, it is possible to suppress the changing of the light emission period required for displaying the image within the frame, and thus significant picture quality deterioration can be prevented.

It should be noted that in the above embodiments, each of the constituent elements may be constituted by dedicated hardware, or may be realized by executing a software program suitable for the constituent element. Each constituent element may be realized by a program execution unit such as a CPU or a processor reading and executing a software program stored in a recording medium such as a hard disk or semiconductor memory. For example, the program causes a computer to execute the display method illustrated in the flowchart of FIG. 32A.

INDUSTRIAL APPLICABILITY

The display method, display device, receiver, and communication method according to the present disclosure enable safe and active acquisition of information other than images, and are, thus, usable in various applications such as the transfer of image-attached information and information transmission in various scenes, in the sense that due to such activeness, as much necessary information can be obtained as needed not only from televisions or devices such as personal computers, or tablets in homes, but also from signage, information terminals, or information display devices away from home.

The invention claimed is:
1. A display method, comprising:
  displaying an image included in a video signal on a per frame basis;
  representing a tone level of luminance of the image by controlling a light emission period in a frame, the light emission period being a period in which light emission is performed;
  specifying, as a specified light emission period, a light emission period in which light emission is performed for greater than or equal to a time required for transmitting a separate signal that conveys communication information included in a visible light communication signal, out of one or more light emission periods in which light emission is performed for displaying the image included in the video signal, the separate signal, which conveys communication information, being transmitted by repeatedly changing in luminance from a high luminance value to a low luminance value, and from the low luminance value to the high luminance value, during the time required for transmitting; and transmitting the separate signal, which conveys communication information, included in the visible light communication signal by superimposing the separate signal onto a portion of the video signal corresponding to the specified light emission period of the video signal and repeatedly changing in luminance from the high luminance value to the low luminance value, and from the low luminance value to the high luminance value, during the specified light emission period, wherein, in the transmitting, in a case where the specified light emission period is greater than or equal to a time required for transmitting a plurality of separate signals including the separate signal, the plurality of separate signals of the visible light communication signal are transmitted by luminance changing in the specified light emission period.

2. The display method according to claim 1, further comprising:

calculating a whole number in a quotient obtained by dividing each of the one or more light emission periods by the time required for transmitting the separate signal, wherein, in the specifying, a light emission period for which the whole number portion of the quotient is 1 or more is specified as the specified light emission period, and in the transmitting, separate signals equivalent in number to the whole number are transmitted in the specified light emission period.

3. The display method according to claim 1, wherein, in a case where the luminance of the image is controlled through each of colors for representing the image, the transmitting for a first color among the colors and the transmitting for a second color among the colors are performed in parallel.

4. The display method according to claim 1, wherein, in a case where the luminance of the image is controlled for each of colors for representing the image:

in the specifying, a period which is greater than or equal to the time required for transmitting the separate signal is specified as the specified light emission period, the period including a light emission period for a first color among the colors and a light emission period for a second color among the colors consecutive to the light emission period for the first color; and in the transmitting, part of the separate signal is transmitted by luminance changing in the light emission period for the first color, and the remaining part of the separate signal is transmitted by luminance changing in the light emission period for the second color.

5. The display method according to claim 4, further comprising:

changing a light emission timing for the first color or the second color to make the light emission period for the first color and the light emission period for the second color consecutive, when the light emission period for the first color and the light emission period for the second color are not consecutive.

6. The display method according to claim 1, further comprising:

matching, in a case where the luminance is controlled for each of pixels for representing the image, a start point of a light emission period for a first pixel among the pixels and a start point of a light emission period for a second pixel adjacent to the first pixel among the pixels, when the start points do not match, wherein, in the specifying, a period in which the light emission period for the first pixel and the light emission period for the second pixel overlap is specified as the specified light emission period, and in the transmitting, the separate signal is transmitted by luminance changing by the first pixel and the second pixel in the specified light emission period.

7. The display method according to claim 1, wherein, when the frame consists of sub-frames, in the specifying, a period including two consecutive sub-frames in which light emission is performed is created by moving at least one of two non-consecutive sub-frames in which light emission is performed for displaying the image included in the video signal, and the period is specified as the specified light emission period.

8. The display method according to claim 1, further comprising:

in a case where the frame consists of sub-frames, and each of the one or more light emission periods is any one sub-frame among the sub-frames, causing light emission in a sub-frame in which light emission is not performed for displaying the image included in the video signal, and which has a period corresponding to a duty ratio of the separate signal.

9. The display method according to claim 1, further comprising:

lengthening the specified light emission period for as long as a period in which light emission is suppressed for transmitting the separate signal.

10. A display device, comprising:

a display that represents, when an image included in a video signal is displayed on a frame basis, a tone level of luminance of the image by controlling a light emission period in a frame, the light emission period being a period in which light emission is performed;

a light emission period specifier that specifies, as a specified light emission period, a light emission period in which light emission is performed for greater than or equal to a time required for transmitting a separate signal that conveys communication information included in a visible light communication signal, out of one or more light emission periods in which light emission is performed for displaying the image included in the video signal, the separate signal, which conveys communication information, being transmitted by repeatedly changing in luminance from a high luminance value to a low luminance value, and from the low luminance value to the high luminance value, during the time required for transmitting; and a transmitter that transmits the separate signal, which conveys communication information, included in the visible light communication signal by superimposing the separate signal onto a portion of the video signal corresponding to the specified light emission period of the video signal and repeatedly changing in luminance from the high luminance value to the low luminance value, and from the low luminance value to the high luminance value, during the specified light emission period, wherein, in the transmitting, in a case where the specified light emission period is greater than or equal to a time required for transmitting a plurality of separate signals including the separate signal, the plurality of separate signals of the visible light communication signal are transmitted by luminance changing in the specified light emission period.

* * * * *

UNITED STATES PATENT AND TRADEMARK OFFICE
CERTIFICATE OF CORRECTION

PATENT NO. : 9,646,568 B2  
APPLICATION NO. : 14/141829  
DATED : May 9, 2017  
INVENTOR(S) : Mitsuaki Oshima et al.

Page 1 of 1

It is certified that error appears in the above-identified patent and that said Letters Patent is hereby corrected as shown below:

On the Title Page

Page 4 Other Publications (Column 2, Line 47), the term "investigation" should read -- Investigation --.

In the Claims

At Column 31, Line 63 (Claim 6, Line 4), the expression "each of pixels for representing the image" should read -- each pixel of pixels representing the image --.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*